(12) United States Patent
Fernando

(10) Patent No.: US 9,999,228 B2
(45) Date of Patent: Jun. 19, 2018

(54) PANS FOR BAKING AND/OR COOKING PIZZA PIES, BREAD, OTHER DOUGH RELATED PRODUCTS, AND/OR LIKE FOOD PRODUCTS, AND METHODS FOR MAKING THE SAME

(71) Applicant: Champa Fernando, Dublin, OH (US)

(72) Inventor: Champa Fernando, Dublin, OH (US)

( * ) Notice: Subject to any disclaimer, the term of this patent is extended or adjusted under 35 U.S.C. 154(b) by 200 days.

(21) Appl. No.: 14/311,452

(22) Filed: Jun. 23, 2014

(65) Prior Publication Data

US 2015/0265095 A1     Sep. 24, 2015

Related U.S. Application Data

(60) Provisional application No. 61/969,087, filed on Mar. 22, 2014.

(51) Int. Cl.

| *A47J 37/07* | (2006.01) |
| *A21B 3/13* | (2006.01) |
| *A47J 36/34* | (2006.01) |
| *A47J 37/01* | (2006.01) |

(52) U.S. Cl.
CPC ............... *A21B 3/13* (2013.01); *A47J 36/34* (2013.01); *A47J 37/01* (2013.01)

(58) Field of Classification Search
CPC .............. A47J 37/01; A47J 36/34; A21B 3/13
USPC ..... 220/573.1, 574, 912; 206/557, 559, 565; 99/450; 426/502, 512, 496, 499
See application file for complete search history.

(56) References Cited

U.S. PATENT DOCUMENTS 5,484,984 A * 1/1996 Gics ................... B65D 81/3453
                                                                         219/730
2006/0230949 A1* 10/2006 Iakossavas ....................... 99/450

FOREIGN PATENT DOCUMENTS

FR              2732577       * 10/1996    ............. A47J 36/02

* cited by examiner

*Primary Examiner* — J. Gregory Pickett
*Assistant Examiner* — Elizabeth Volz
(74) *Attorney, Agent, or Firm* — Porter, Wright, Morris & Arthur, LLP

(57) ABSTRACT

Conventional pans used for baking pizza pies, bread, and other dough related products have only a few shapes. Almost all such pans are limited to geometric shapes such as circular, rectangular, or square. The limited number of shapes is primarily due to the nature of the dough which shrinks when cooking. Disclosed are pans which include a frame having a bottom wall, an outer wall upwardly extending from the bottom wall, and a rim outwardly extending from the outer wall. A support surface is configured to support the food product within the outer wall of the frame. A plurality of holding elements upwardly extend from the support surface within the outer wall and are configured to at least partially pierce and hold the food product on the support surface, substantially against shrinkage, in a desired shape. Such pans can be designed to produce food product in essentially any desired shape.

20 Claims, 46 Drawing Sheets

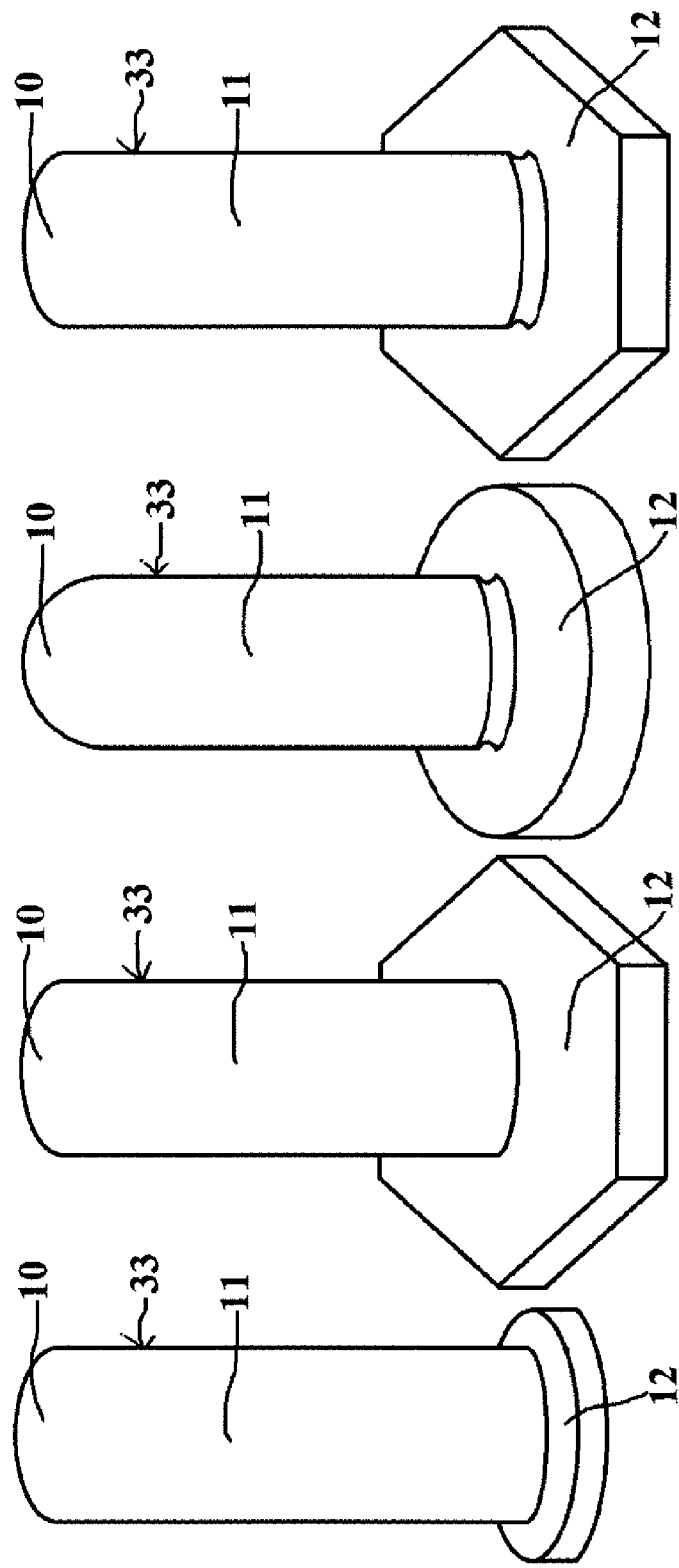

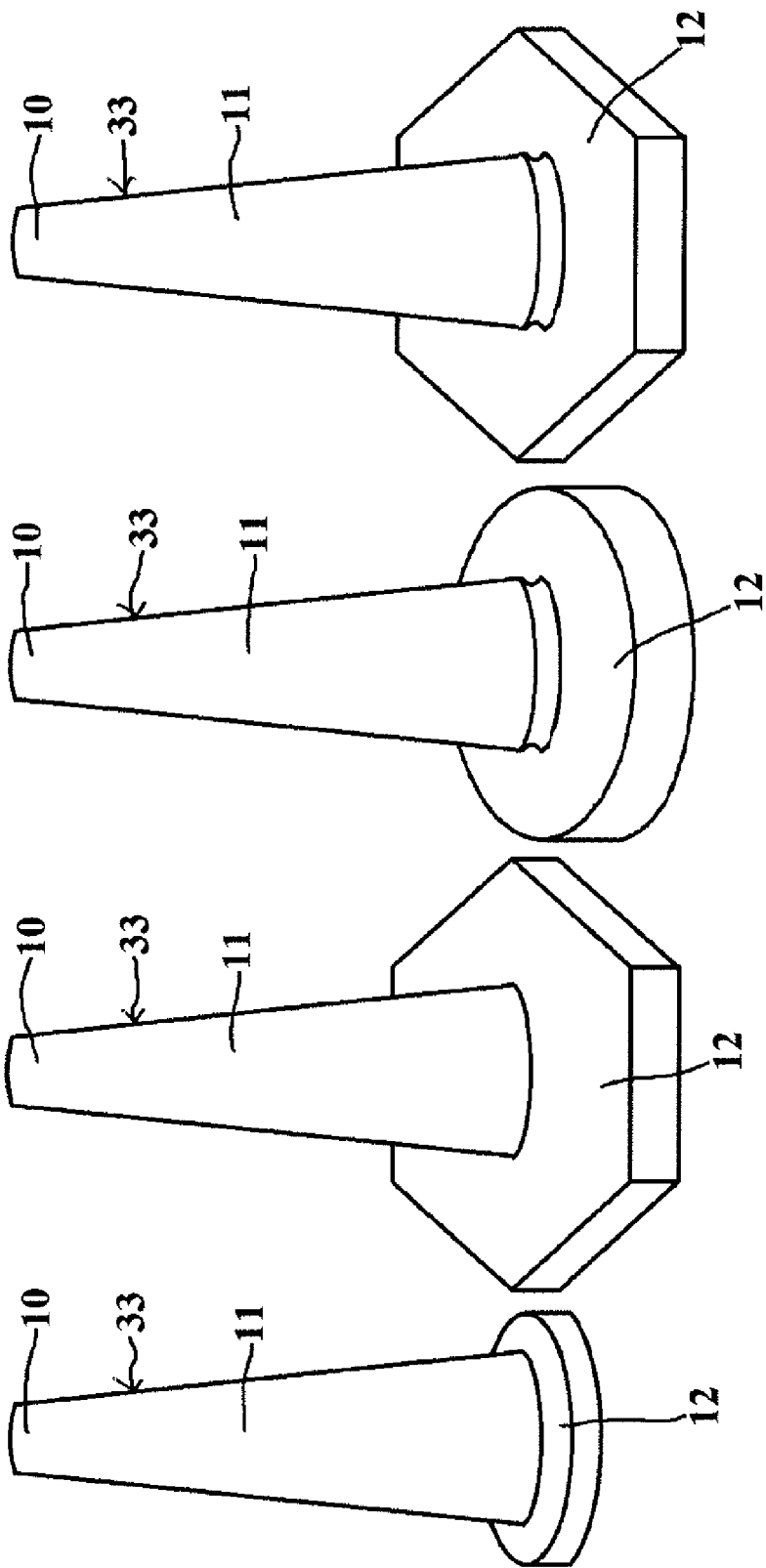

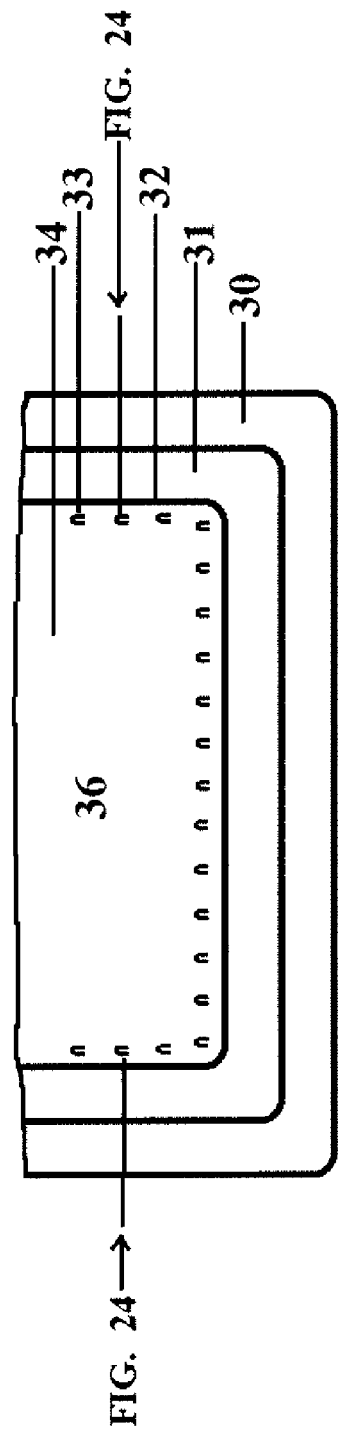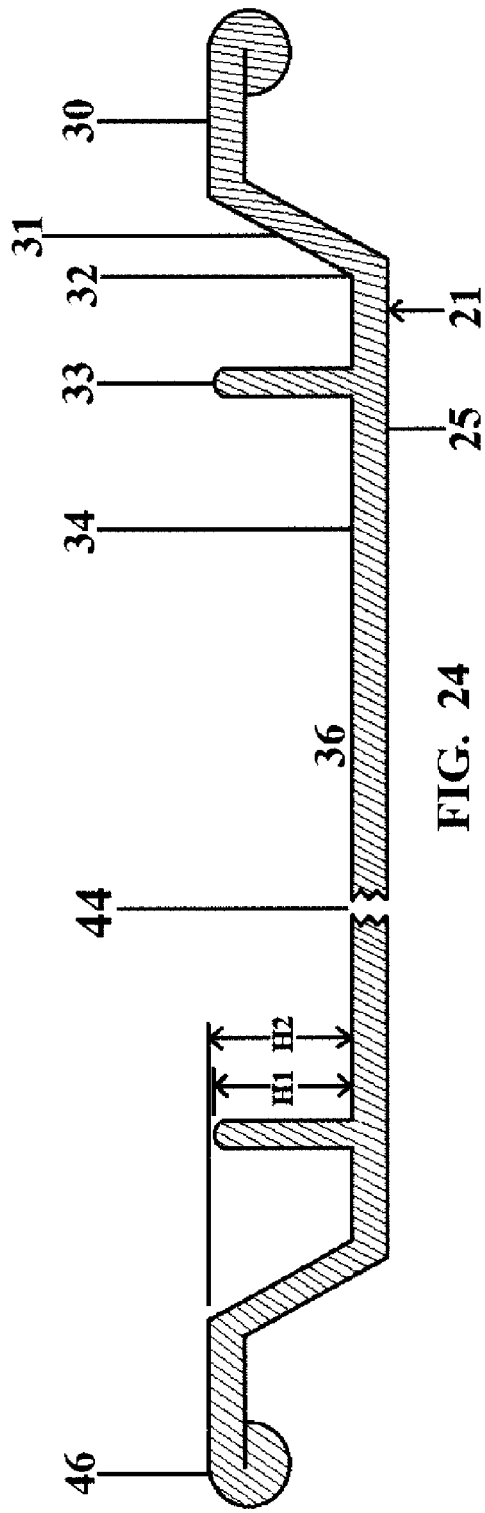
FIG. 23
FIG. 24

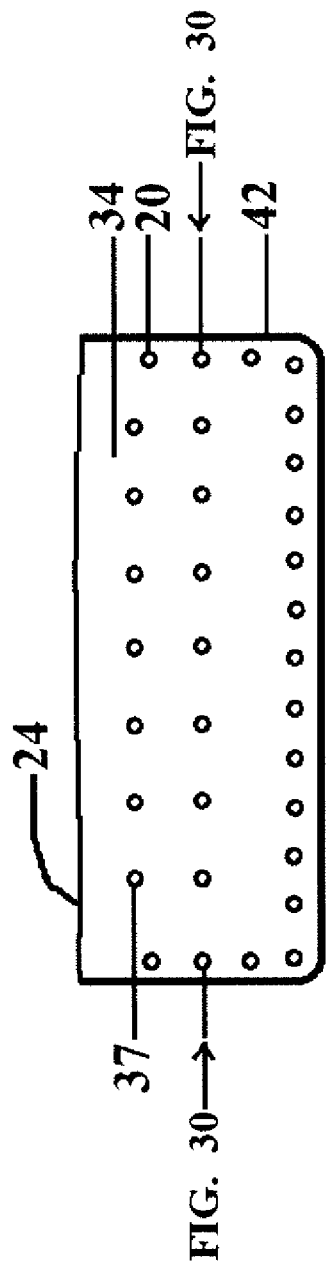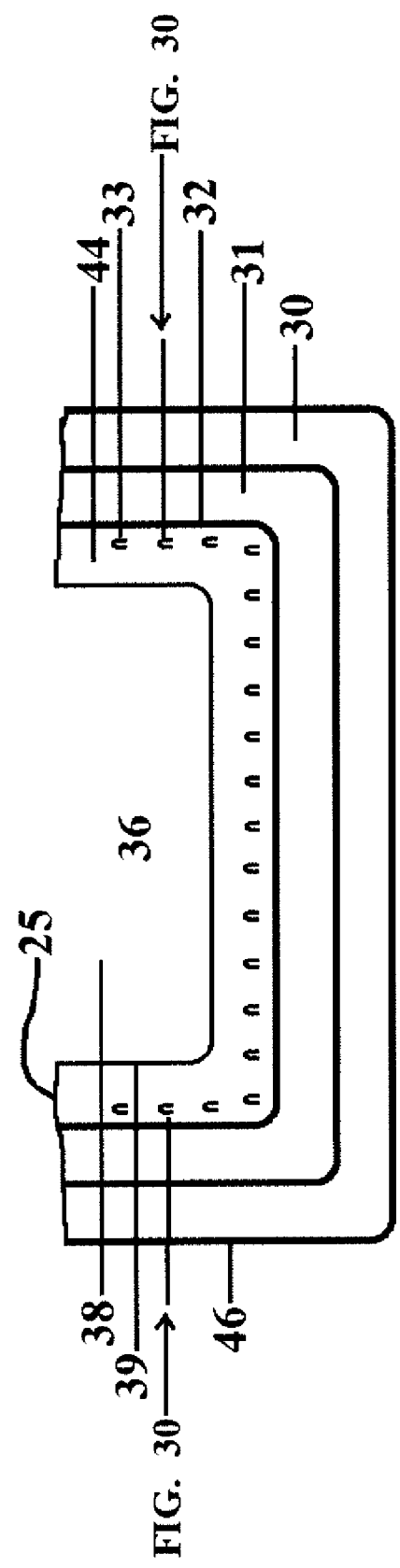
FIG. 29

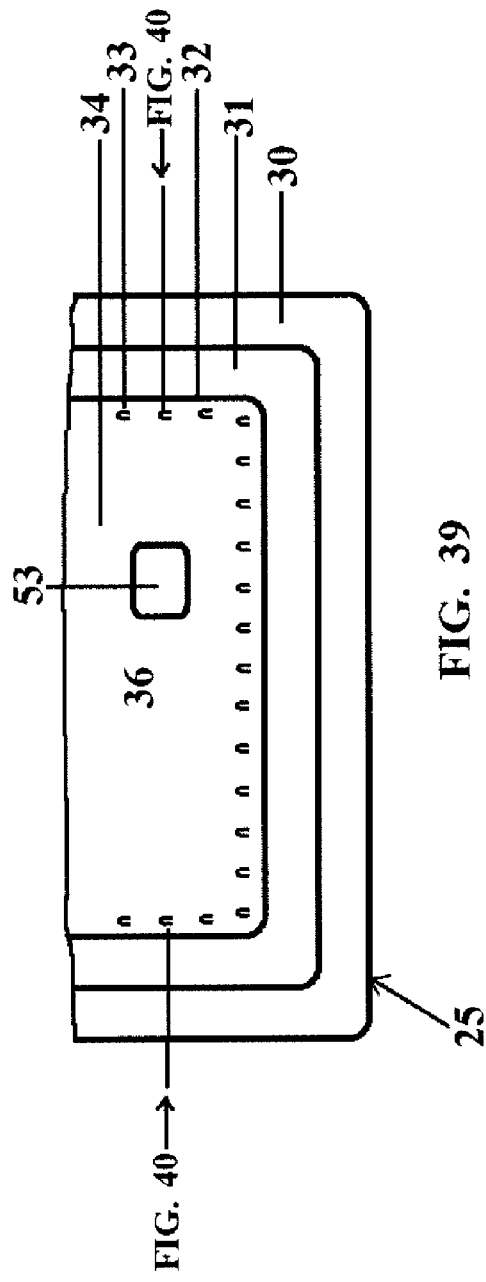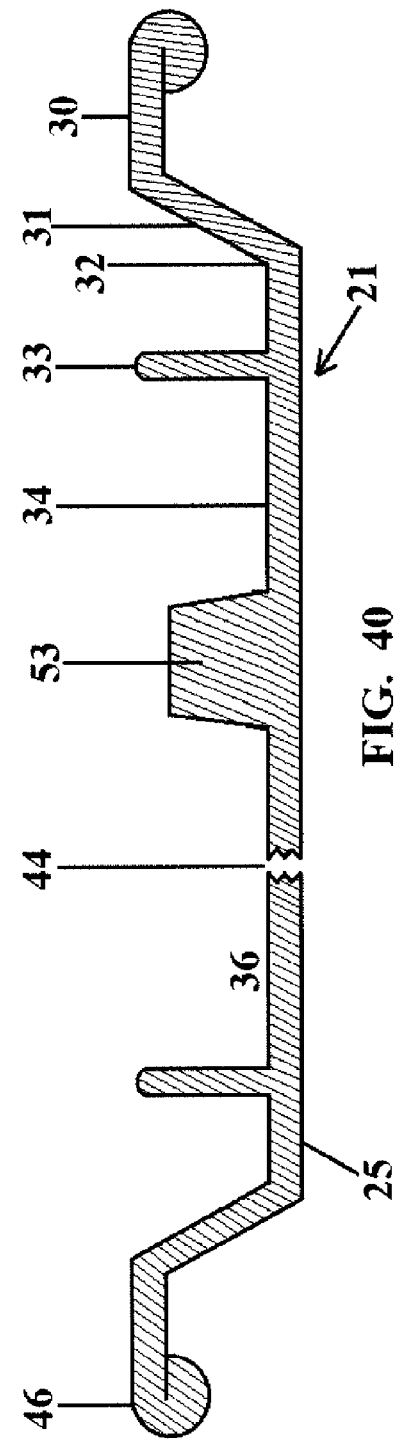

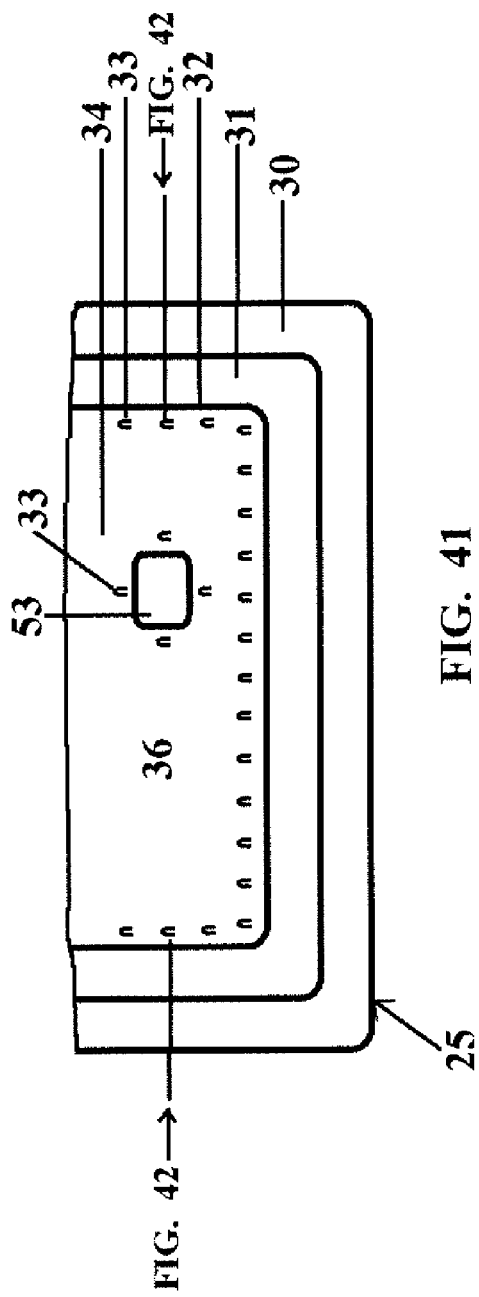
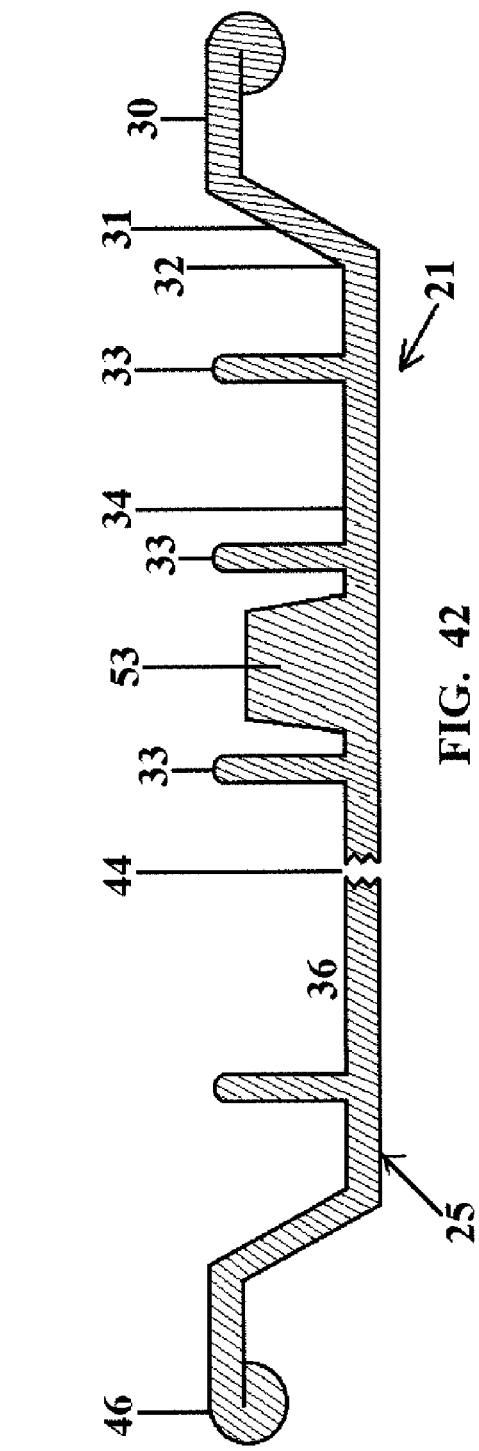
FIG. 41
FIG. 42

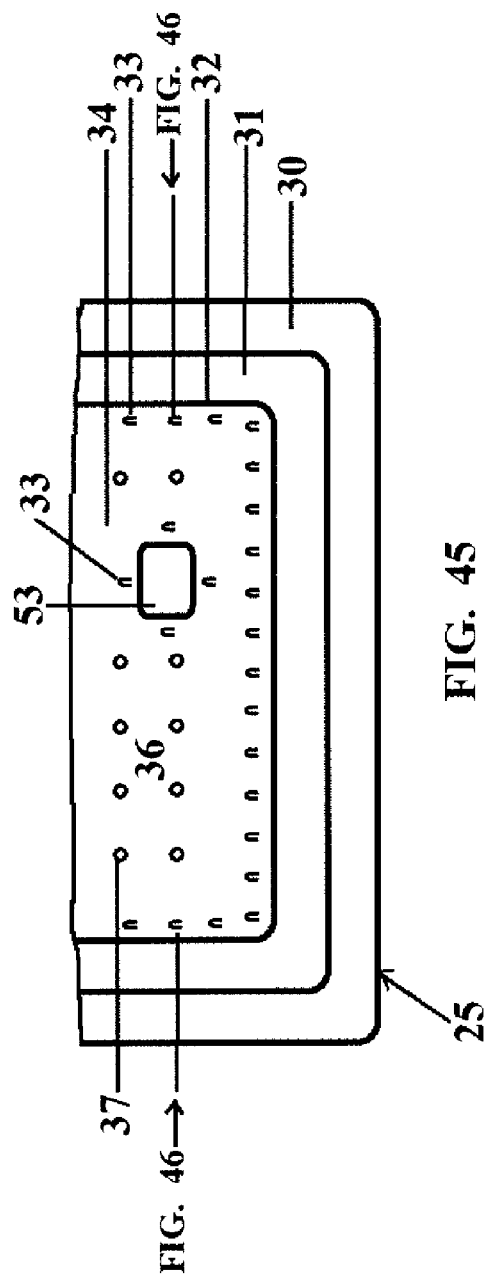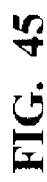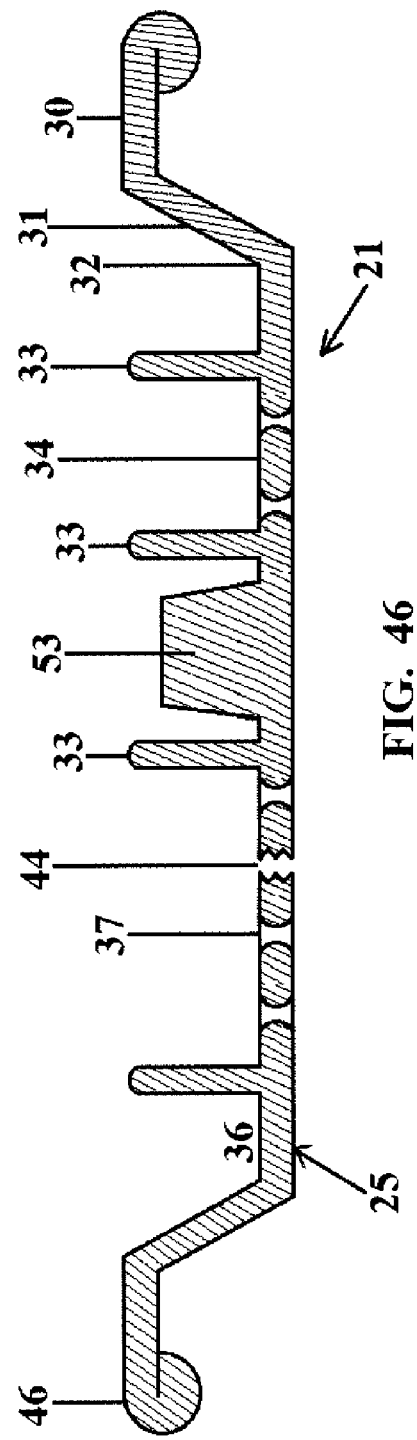
FIG. 45
FIG. 46

PANS FOR BAKING AND/OR COOKING PIZZA PIES, BREAD, OTHER DOUGH RELATED PRODUCTS, AND/OR LIKE FOOD PRODUCTS, AND METHODS FOR MAKING THE SAME

CROSS-REFERENCE TO RELATED APPLICATIONS

This patent application claims the priority benefit of U.S. Provisional Patent Application No. 61/969,087 filed on Mar. 22, 2014, the disclosure of which is expressly incorporated herein in its entirety by reference.

STATEMENT REGARDING FEDERALLY SPONSORED RESEARCH

Not Applicable

PARTIES TO A JOINT RESEARCH AGREEMENT

Not Applicable

REFERENCE TO APPENDIX

Not Applicable

FIELD OF THE INVENTION

The field of the invention generally relates to cooking utensils for food items, and more particularly, but not by way of limitation, to pans adapted for baking and/or cooking pizza pies, bread, other dough related products, and/or like food products.

BACKGROUND OF THE INVENTION

There are currently very few shapes available when purchasing pizza pans or any baking and/or cooking pans that are used for baking and/or cooking pizza pies, bread, and like food products made with dough. Almost all the current baking and/or cooking pans that are used for pizza pies, bread, other dough related products, and/or like food products are limited to geometric shapes such as circular, rectangular, or square shapes. The main reason for the limited quantity of available shapes of these conventional pizza pans or baking and/or cooking pans for dough related food products is due to the nature of the dough.

Dough is typically made by mixing flour with a small amount of water and/or other liquid. Since dough is a thick, malleable, sometimes elastic paste, the process of shaping dough by hand is difficult. Also it is very difficult to bake dough related food products in baking and/or cooking pans that have shapes other than simple geometric shapes because the dough shrinks back during preparing and also cooking. When dough is stretched flat on a baking and/or cooking pan to a specific desired shape, it tends to pull back, roll, and shrink. It is time consuming and also difficult to maintain a steady desired shape when you bake the same dough related food product over and over again. As a result, pizza and bread lovers are limited to only a few shapes of pizza pans and any baking and/or cooking pans used for dough related food products unless the shape is made by hand and baked without a readymade baking and/or cooking pan. Accordingly, there is a need in the art for improved pans for baking and/or cooking pizza pies, bread, dough related products, and/or like food products

SUMMARY OF THE INVENTION

Disclosed herein are pans for baking and/or cooking which overcome at least one of the above-noted deficiencies of the prior art. Disclosed systems and methods allow baking and/or cooking pans to hold dough in any shape until the food is completely ready. The disclosed systems and methods also allow any shape of a baking and/or cooking pan that you desire, including non-geometric shapes, to bake (or cook) pizza dough or any like food products made with dough.

Disclosed are baking and/or cooking pans with a plurality of spaced-apart holding elements which extend upward to hold the dough in place in order to obtain a desired shape for the dough. This plurality of spaced-apart holding elements upwardly extend from a support surface within an outer wall and are configured to at least partially pierce and hold the food product on the support surface. These holding elements are manufactured into the baking and/or cooking pans and can be made in any shape as long as they extend upward in a manner to hold the dough in a desired position. These holding elements can be pins, spikes, tabs and/or any other suitable type of holding element and also can be manufactured into the baking and/or cooking pans in any suitable way to hold the dough in a desired position.

The disclosed baking and/or cooking pans include holding elements near edges of the baking and/or cooking pans close to outer walls and also anywhere inside the baking and/or cooking pans needed to maintain the desired shape. These holding elements are used in the baking and/or cooking pan to hold the dough until the food is prepared. These holding elements are typically unthreaded (no thread) metal elements for easy removal of the cooked food and are installed during the manufacturing process of the baking and/or cooking pan. The holding elements can have varying sizes—different shapes, sizes, heights, and strengths and also can be made of any suitable durable material. Typically, these holding elements are shorter than the baking and/or cooking pan's height. The holding elements should not be too thick or too high since it would make noticeably larger holes or deeper holes on the bottom side of the cooked food.

Depending on the type of manufacturing method used, these holding elements can be installed or welded to the baking and/or cooking pan in different methods. Disclosed are examples of different methods of manufacturing the holding elements with the baking and/or cooking pans and different locations for the holding elements in the baking and/or cooking pans. Even though the illustrated holding elements mostly are located around the edge of the baking and/or cooking pans, when there is a hole or an open area inside the baking and/or cooking pans, the holding elements can be used inside the baking and/or cooking pans around the open area in order to hold the dough to maintain the desired shape of the food.

Depending on the shape of the baking and/or cooking pan, the pan can have one or more raised area(s) extending upward from the support surface within the outer wall with or without holding elements next to it. Therefore, depending on the shape of the baking and/or cooking pan, the holding elements can be installed or welded not only around the edge of the baking and/or cooking pan close to the outer wall but also anywhere on the support surface within the outer wall of the baking and/or cooking pan. The holding elements can also be located next to a raised area and/or next to an open area of the baking and/or cooking pan. Alternatively, the baking and/or cooking pans can have a raised area in any part of the baking and/or cooking pan without having holding elements located adjacent to it.

The disclosed systems and methods not only allow having any unique shape for a baking and/or cooking pan, but also allow the baking and/or cooking pan to have a non-perforated or perforated support surface. A perforated support surface provides a crispy bottom to the pizza pies or any baked (or cooked) food products. The baking and/or cooking pans with non-perforated support surfaces are the traditional type of baking and/or cooking pans. The baking and/or cooking pans with perforated support surfaces have a plurality of holes in the support surface. A pizza pie, bread, and like food products made with dough that is cooked on a baking and/or cooking pan with the perforated support surface, browns evenly on both top and bottom sides and also cooks quickly compared to when cooked on the non-perforated support surface. The perforated support surface includes a plurality of small spaced apart openings configured to provide a crispy bottom to the pizza pies or any baked (or cooked) food products.

The disclosed systems and methods not only allow having any shape for the baking and/or cooking pans with non-perforated or perforated support surfaces, but also allow having a removable bottom plate. There are several advantages to having the removable bottom plate. When there are holding elements around the baking and/or cooking pan within the outer wall, the dough tends to firmly hold onto the holding elements during baking. This tends to cause the baked (or cooked) food product to break close to the holding elements when removed from the holding elements. However, when there is a removable bottom plate, the baked (or cooked) food can be easily removed from the holding elements by pushing the removable bottom plate upward by hand from the bottom of the baking and/or cooking pan or by using a bottom plate remover which is designed specifically to remove the removable bottom plate from the frame in order to avoid getting burnt from the hot baking and/or cooking pan. Disclosed bottom plate removers has one or more upwardly extending legs configured to support the removable bottom plate with the baked (or cooked) food and to separate removable bottom plate from the frame of the hot baking and/or cooking pan. Another advantage of having a removable bottom plate is that it allows interchangeable use a non-perforated removable support surface or perforated removable support surface depending on what type of cooked food with crispy bottom they want to prepare at any given time. Additionally, pizza pans are notorious for greasy, baked on messes. Cleaning gets somewhat challenging when the baking and/or cooking pans do not have simple geometric shapes. However, they are easier to clean when having a removable bottom plate.

Disclosed are eight different basic embodiments of baking and/or cooking pans: (1) a baking and/or cooking pan with a fixed non-perforated support surface with holding elements; (2) a baking and/or cooking pan with a fixed perforated support surface with holding elements; (3) a baking and/or cooking pan with a non-perforated removable bottom plate with holes for the holding elements, and a frame with holding elements; (4) a baking and/or cooking pan with a perforated removable bottom plate with holes for the holding elements, and a frame with holding elements; (5) a baking and/or cooking pan with a non-perforated removable bottom plate with holes for the holding elements, a frame with holes for the holding elements, and a removable non-perforated holding element plate with holding elements and handles to hold the holding element plate; (6) a baking and/or cooking pan with a non-perforated removable bottom plate with holes for the holding elements, a frame with holes for the holding elements, and a removable perforated holding element plate with holding elements and handles to hold the holding element plate; (7) a baking and/or cooking pan with a perforated removable bottom plate with holes for the holding elements, a frame with holes for the holding elements, and a removable non-perforated holding element plate with holding elements and handles to hold the holding element plate; and (8) a baking and/or cooking pan with a perforated removable bottom plate with holes for the holding elements, a frame with holes for the holding elements; and a removable perforated holding element plate with holding elements and handles to hold the holding element plate. Each of these baking and/or cooking pans can have any desired shape including geometric shapes and non-geometric shapes.

From the foregoing disclosure and the following more detailed description of various preferred embodiments, it will be apparent to those skilled in the art that the present invention provides a significant advance in the technology and art of pans for baking and/or cooking pizza pies, bread, dough related products, and/or like food products. Particularly significant in this regard is the potential the invention affords for providing reliable and relatively low cost pans for cooking and/or baking dough related products of any desired shape including non-geometric shapes. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 3 is a perspective view of another type of holding element for a baking and/or cooking pan of the present invention that can be referred to as a unthreaded pill or stud with a cylindrically-shaped pin stick, a pin tip having a small radius rounded end, and a circularly-shaped pin head or flange, wherein the holding element is manufactured separately from the pan and is secured to the pan during the manufacturing process.

FIG. 4 is a perspective view of another type of holding element for a baking and/or cooking pan of the present invention that can be referred to as a unthreaded pin or stud with a cylindrically-shaped pin stick, a pin tip having small radius rounded end, and a hexagonally-shaped pin head or flange, wherein the holding element is manufactured separately from the pan and is secured to the pan during the manufacturing process.

FIG. 5 is a perspective view of another type of holding element for a baking and/or cooking pan of the present invention that can be referred to as a unthreaded pin or stud with a cylindrically-shaped pin stick, a pin tip having a small radius rounded end, a circularly-shaped pin head or flange, and a very small radius groove or undercut at the intersection of the pin stick and the flange, wherein the holding element is manufactured separately from the pan and is secured to the pan during the manufacturing process.

FIG. 6 is a perspective view of another type of holding element for a baking and/or cooking pan of the present invention that can be referred to as a unthreaded pin or stud with a cylindrically-shaped pin, a pin tip having a small radius rounded end, a hexagonally-shaped pin head or flange, and a very small radius groove or undercut at the intersection of the pin stick and the flange, wherein the holding element is manufactured separately from the pan and is secured to the pan during the manufacturing process.

FIG. 7 is a perspective view of another type of holding element for a baking and/or cooking pan of the present invention that can be referred to as a unthreaded pin or stud with a pointedly-shaped or sharp pin stick, a pin tip having a small radius rounded end, and a circularly-shaped pin head or flange, wherein the holding element is manufactured separately from the pan and is secured to the pan during the manufacturing process.

FIG. 8 is a perspective view of another type of holding element for a baking and/or cooking pan of the present invention that can be referred to as a unthreaded pin or stud with a pointedly-shaped or sharp pin stick, a pin tip having a small radius rounded end, and a hexagonally-shaped pin head or flange, wherein the holding element is manufactured separately from the pan and is secured to the pan during the manufacturing process.

FIG. 9 is a perspective view of another type of holding element for a baking and/or cooking pan of the present invention that can be referred to as a unthreaded pin or stud with a pointedly-shaped or sharp pin stick, a pin tip having a small radius rounded end, and a circularly-shaped pin head, and a very small radius groove or undercut at the intersection of the pin stick and the flange, wherein the holding element is manufactured separately from the pan and is secured to the pan during the manufacturing process.

FIG. 10 is a perspective view of another type of holding element for a baking and/or cooking pan of the present invention that can be referred to as a unthreaded pin or stud with a pointedly-shaped or sharp pin stick, a pin tip having a small radius rounded end, and a hexagonally-shaped pin head, and a very small radius groove or undercut at the intersection of the pin stick and the flange, wherein the holding element is manufactured separately from the pan and is secured to the pan during the manufacturing process.

FIG. 23 is a fragmented top view of a baking and/or cooking pan according to a first embodiment of the present invention, wherein the pan includes a frame forming a fixed non-perforated support surface for food product with holding elements upwardly extending therefrom.

FIG. 24 is an enlarged cross sectional view of the baking and/or cooking pan of FIG. 23 taken along line 24-24 of FIG. 23.

FIG. 29 is a fragmented, exploded top view a baking and/or cooking pan according to a fourth embodiment of the present invention, wherein the pan includes a frame with holding elements upwardly extending therefrom, and a removable bottom plate forming a perforated support surface for food product with holes for passage of the holding elements therethrough.

FIG. 39 is a fragmented top view a baking and/or cooking pan according to a ninth embodiment of the present invention, wherein a frame includes a raised area upwardly extending from a non-perforated support surface for food products without holding elements adjacent to the raised area.

FIG. 40 is an enlarged cross-sectional view of the baking and/or cooking pan of FIG. 39 taken along line 40-40 of FIG. 39.

FIG. 41 is a fragmented top view a baking and/or cooking pan according to a tenth embodiment of the present invention, wherein a frame includes a raised area upwardly extending from a non-perforated support surface for food products with holding elements adjacent to the raised area.

FIG. 42 is an enlarged cross-sectional view of the baking and/or cooking pan of FIG. 41 taken along line 42-42 of FIG. 41.

FIG. 45 is a fragmented top view a baking and/or cooking pan according to a twelfth embodiment of the present invention, wherein a frame includes a raised area upwardly extending from a perforated support surface for food products with holding elements adjacent to the raised area.

FIG. 46 is an enlarged cross-sectional view of the baking and/or cooking pan of FIG. 45 taken along line 46-46 of FIG. 45.

Figure 2:
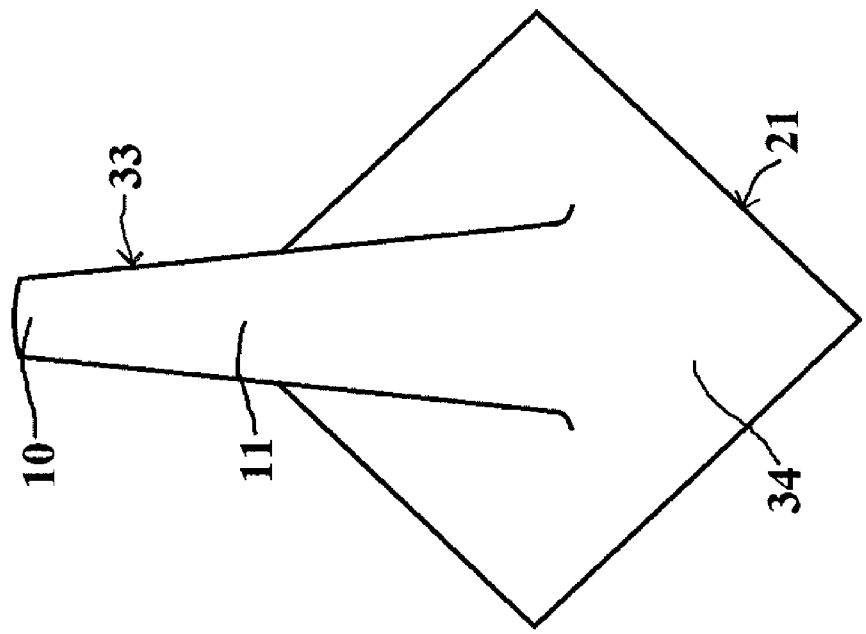
FIG. 2 is a perspective view of another type of holding element for a baking and/or cooking pan of the present invention that can be referred to as a unthreaded pin or stud with a pointedly-shaped or sharp pin stick and a pin tip having small radius rounded end, wherein the holding element is manufactured with the pan so that it is integrally formed with the pan.

It should be understood that the appended drawings are not necessarily to scale, presenting a somewhat simplified representation of various preferred features illustrative of the basic principles of the invention. The specific design features of the pans as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the pans illustrated in the drawings.

DETAILED DESCRIPTION OF CERTAIN EMBODIMENTS OF THE INVENTION

It will be apparent to those skilled in the art, that is, to those who have knowledge or experience in this area of technology that many uses and design variations are possible for the improved cooking utensils disclosed herein. The following detailed discussion of various alternative and preferred embodiments will illustrate the general principles of the invention with regard to various pans for baking and/or cooking pizza pies and like food products. While multiple embodiments of the invention will be described hereinafter with respect to pizza pies, the invention is not limited to these embodiments. The pan has wide application for use in cooking other foods, including pies, cookies, pastries, breads and numerous other food products. Other embodiments suitable for other applications will be apparent to those skilled in the art given the benefit of this disclosure.

FIGS. 23 and 24 illustrate a pan 21 for baking and/or cooking pizza pies and like food products according to a first embodiment of the invention. The illustrated pan 21 includes a frame 25 having a substantially horizontal bottom wall 44, an outer wall 31 upwardly extending from an outer periphery or edge 32 of the bottom wall 44, and a rim 30 outwardly extending from the outer wall 31, a substantially horizontal support surface 34 configured to support the food product within the outer wall 31 of the frame 25, and a plurality of spaced-apart holding elements 33, 14 upwardly extending from the support surface 34 within the outer wall 31 and configured to at least partially pierce and hold the food product on the support surface 34 in a desired shape. The illustrated pan 21 forms an interior cavity 36 for holding the food product that is rectangular shaped to provide a cooked food product that is rectangular shaped. However, as described in more detail hereinbelow, the pan 21 can alternatively have any suitable shape for providing any desired shape for the cooked food product including geometric shapes such as, for example, a circle, a square, a rectangle, and the like, and non-geometric shapes such as, for example, a trophy cup, an alphabetic or numeric character, a football, and the like. The term "geometric shape" is used in this specification and claims to mean shapes with regular contours and straight edges such as squares, triangles, an circles. The term "non-geometric shape" is used in this specification and claims to mean shapes with irregular contours, the edges of which are often rugged and/or asymmetrical.

The illustrated frame 25 includes the substantially horizontal bottom wall 44 which is free of openings and perforations. The illustrated outer wall 31 upwardly and outwardly extends from an outer periphery 32 of the bottom wall 44 at an obtuse angle of about 120 degrees. It is noted that the outer wall 31 can alternatively extend from the bottom wall 44 at any other suitable angle including acute angles, a right angle, and other obtuse angles. The illustrated outer wall 31 is integral with the bottom wall 44, that is, they are formed or fixed together as a one-piece component. The illustrated rim 30 is substantially horizontal and outwardly extends from an upper end of the outer wall 31. It is noted that the rim 30 can alternatively extend from the outer wall 31 at any other suitable angle. It is also noted that the rim 30 can be eliminated if desired. The illustrated rim 30 is integral with the outer wall 31, that is, they are formed or fixed together as a one-piece component. The illustrated outer edge 46 of the rim 30 forms the outer edge of the pan 21 and is bent back on itself to eliminate sharp edges but it is noted that the rim 30 can be alternatively formed in any other suitable shape.

The illustrated support surface 34 is substantially horizontal and configured to support the food product within the outer wall 31 of the frame 25. The illustrated support surface 34 is formed by the upper side of the bottom wall 44. It is noted, however, that the support surface 34 can alternatively be formed in any other suitable manner.

The illustrated holding elements 33, 14 upwardly extend from the support surface 34 within the outer wall 31 and are configured to at least partially pierce and hold the food product on the support surface 34 in a desired shape (rectangular in the illustrated embodiment). The illustrated holding elements 33, 14 are located along the outer edge 32 of the support surface 34 near the outer wall 31 so that the dough is held in place near the outer wall 31. It is noted that any other suitable location for the holding elements 33, 14 can alternatively or additionally be utilized. The illustrated holding elements 33, 14 are integral with the bottom wall 44, that is, they are formed together as a one-piece component but it is noted that the holding elements can be manufactured in any other suitable way and/or fixed to any other suitable component.

The illustrated holding elements 33, 14 upwardly extend from the support surface 34 at a 90 degree or right angle with the support surface 34 which makes it easier to take the baked (or cooked) food off of the holding elements 33 without breaking the food or the holding elements 33. It is noted, however, that the holding elements 33, 14 can alternatively extend from the support surface 34 at any other suitable angle. The illustrated holding elements 33, 14 have a height H1 that is less than an interior height H2 of the pan 21 so that the holding elements 33 do not pierce entirely through the food product. The smaller height H1 also reduces exposure of the holding elements 33, 14 to reduce accidental breakage. The illustrated holding elements 33, 14 have a height H1 that is slightly less than the interior height H2 of the pan 21 but it is noted that any other suitable height can alternatively be utilized including heights greater or much less than the interior height H2 of the pan 21.

The illustrated holding elements 33, 14 are formed integral with the frame 25, that is, as a one-piece component. In mass production, pressure die casting is one of the common methods that can form the holding elements 33 integral with the frame 25. Die casting is a manufacturing process that can produce complex metal parts through the use of reusable molds, called dies. The die casting process involves the use of a furnace, metal, die casting machine, and die. The metal, typically is a non-ferrous alloy that is melted in the furnace and then injected into the dies in the die casting machine. It is noted, however, that the frame 25 and holding elements 33, 14 can be formed by in any other suitable manner such as separate components fixed together, by any other suitable process, and/or with any other suitable material.

Figure 1:
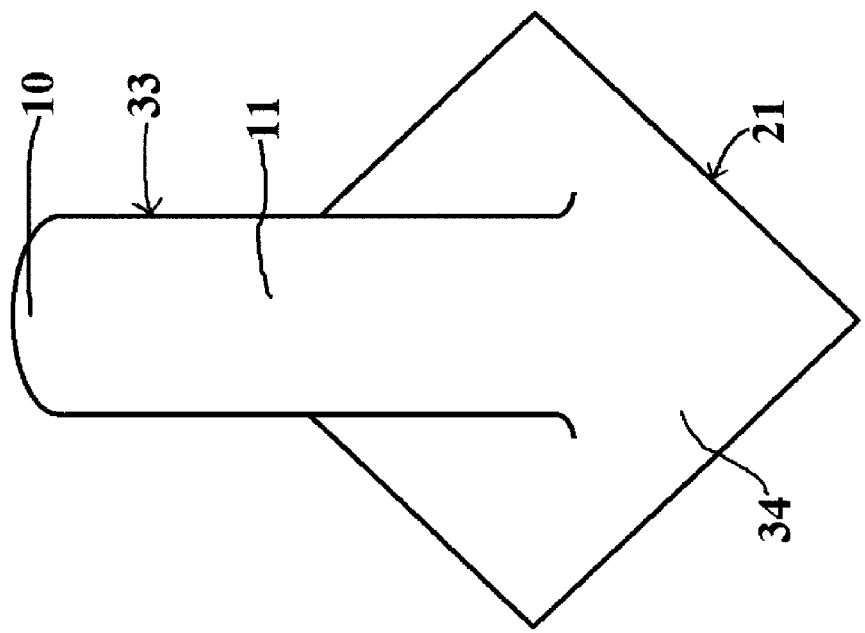
FIG. 1 is a perspective view of one type of holding element for a baking and/or cooking pan of the present invention that can be referred to as a unthreaded pin or stud with a cylindrically-shaped pin stick and a pin tip having a small radius rounded end, wherein the holding element is manufactured with the pan so that it is integrally formed with the pan.

As shown in FIGS. 1 and 2, the holding elements 33, 14 can be formed integral with the pan 21 during manufacturing of the pan 21 by a manufacturing process such as, for example, casting, molding, or the like. FIG. 1 illustrates a holding element 33, 14 in the form of an unthreaded pin or stud 33 with a cylindrically-shaped pin stick 11 and a pin tip 10 having a small radius rounded end. The illustrated pin or stud 33 is manufactured with the baking and/or cooking pan 21 so that the pin or stud 33 is integrally formed therewith. It is noted that these unthreaded pins or studs 33 can alternatively have any other suitable shape, size, and/or strength.

FIG. 2 illustrates a holding element 33, 14 in the form of an unthreaded pin or stud 33 with a pointedly-shaped or sharp pin stick 11 and a pin tip 10 having small radius rounded end. The illustrated pin or stud 33 is manufactured with the baking and/or cooking pan 21 so that the pin or stud 33 is integrally formed therewith. The pointedly-shaped pin stick 11 of the pin or stud of FIG. 2 is less desirable than the pin or stud 33 of FIG. 1 due to less durability. It is noted that these unthreaded pins or studs 33 can alternatively have any other suitable shape, size, and/or strength.

As shown in FIGS. 3 to 10, the pin or stud 33 can be formed separate from the remainder of the pan 21 and secured or attached to the pan 21 during manufacturing of the pan 21 by a manufacturing process such as, for example, welding, brazing, bonding, or the like. It is noted that the pointedly-shaped pin sticks 11 of the pin or stud 33 of FIGS. 7 to 10 are less desirable than the pin or stud of FIGS. 3 to 6 due to less durability.

FIG. 3 illustrates a holding element 33, 14 in the form of a unthreaded pin or stud 33 with a cylindrically-shaped pin stick 11, a pin tip 10 having a small radius rounded end, and a circular-shaped pin head or flange 12. The illustrated pin or stud 33 is manufactured separately and secured to the baking and/or cooking pan 21 during its manufacturing process. It is noted that these unthreaded pins or studs 33 can alternatively have any other suitable shape, size, and/or strength.

FIG. 4 illustrates a holding element 33, 14 in the form of a unthreaded pin or stud 33 with a cylindrically-shaped pin stick 11, a pin tip 10 having a small radius rounded end, and a hexagonally-shaped pin head or flange 12. The illustrated pin or stud 33 is manufactured separately and secured to the baking and/or cooking pan 21 during its manufacturing process. It is noted that these unthreaded pins or studs 33 can alternatively have any other suitable shape, size, and/or strength.

FIG. 5 illustrates a holding element 33, 14 in the form of a unthreaded pin or stud 33 with a cylindrically-shaped pin stick 11, a pin tip 10 having a small radius rounded end, a cylindrically-shaped pin head or flange 12, and a very small radius groove or undercut at the intersection of the pin stick 11 and the flange 12. The illustrated pin or stud 33 is manufactured separately and secured to the baking and/or cooking pan 21 during its manufacturing process. It is noted that these unthreaded pins or studs 33 can alternatively have any other suitable shape, size, and/or strength.

FIG. 6 illustrates a holding element 33, 14 in the form of a unthreaded pin or stud 33 with a cylindrically-shaped pin stick 11, a pin tip 10 having a small radius rounded end, a hexagonally-shaped pin head or flange 12, and a very small radius groove or undercut at the intersection of the pin stick 11 and the flange 12. The illustrated pin or stud 33 is manufactured separately and secured to the baking and/or cooking pan 21 during its manufacturing process. It is noted that these unthreaded pins or studs 33 can alternatively have any other suitable shape, size, and/or strength.

FIG. 7 illustrates a holding element 33, 14 in the form of a unthreaded pin or stud with a pointedly-shaped pin stick 11, a pin tip 10 having a small radius rounded end, and a circular-shaped pin head or flange 12. The illustrated pin or stud 33 is manufactured separately and secured to the baking and/or cooking pan 21 during its manufacturing process. It is noted that these unthreaded pins or studs 33 can alternatively have any other suitable shape, size, and/or strength.

FIG. 8 illustrates a holding element 33, 14 in the form of a unthreaded pin or stud 33 with a pointedly-shaped pin stick 11, a pin tip 10 having a small radius rounded end, and a hexagonally-shaped pin head or flange 12. The illustrated pin or stud 33 is manufactured separately and secured to the baking and/or cooking pan 21 during its manufacturing process. It is noted that these unthreaded pins or studs 33 can alternatively have any other suitable shape, size, and/or strength.

FIG. 9 illustrates a holding element 33, 14 in the form of a unthreaded pin or stud 33 with a pointedly-shaped pin stick 11, a pin tip 10 having a small radius rounded end, a cylindrically-shaped pin head or flange 12, and a very small radius groove or undercut at the intersection of the pin stick 11 and the flange 12. The illustrated pin or stud 33 is manufactured separately and secured to the baking and/or cooking pan 21 during its manufacturing process. It is noted that these unthreaded pins or studs 33 can alternatively have any other suitable shape, size, and/or strength.

FIG. 10 illustrates a holding element 33, 14 in the form of a unthreaded pin or stud 33 with a pointedly-shaped pin stick 11, a pin tip 10 having a small radius rounded end, a hexagonally-shaped pin head or flange 12, and a very small radius groove or undercut at the intersection of the pin stick 11 and the flange 12. The illustrated pin or stud 33 is manufactured separately and secured to the baking and/or cooking pan 21 during its manufacturing process. It is noted that these unthreaded pins or studs 33 can alternatively have any other suitable shape, size, and/or strength.

As shown in FIGS. 11 to 18, the holding elements 33, 14 can be formed integral with the remainder of the pan 21 during manufacturing of the pan 21 by a manufacturing process such as, for example, lancing, stamping, forming, or the like. The holding element 33, 14 can be in the form of a tab or spike 14 that is cut from the pan 21 and pulled or bent out from the pan 21. The illustrated tabs or spikes 14 have a bent or attached end 13, a free or raised end opposed to the attached end, a curved or angled portion 15 near the attached end 13, and an opening or open area 16 in the support surface 34 or other wall in which the tab or spike 14 is formed. These tabs or spikes 14 can be formed in any suitable shape, size, and/or strength.

One sheet metal cutting process that can be utilized to form the tabs or spikes 14 is lancing. Lancing is a metal cutting operation in which the metal is sliced or slit to free up metal without separating it from the original sheet. Unlike other metal cutting processes, lancing does not create a slug. This process can save material and eliminate the need for expensive scrap removal systems. These tabs or spikes 14 are highly recommended as the holding elements 33, 14 because they are very durable, strong, save materials, and eliminate the need for expensive scrap removal systems compared to the other examples given in the application as holding elements 33, 14.

Figure 13:
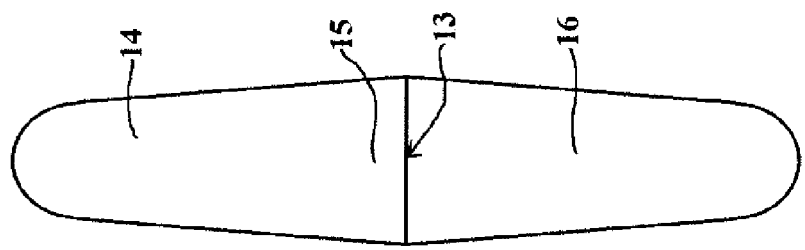
FIG. 13 is a front view of the holding element of FIGS. 11 and 12.
Figure 12:
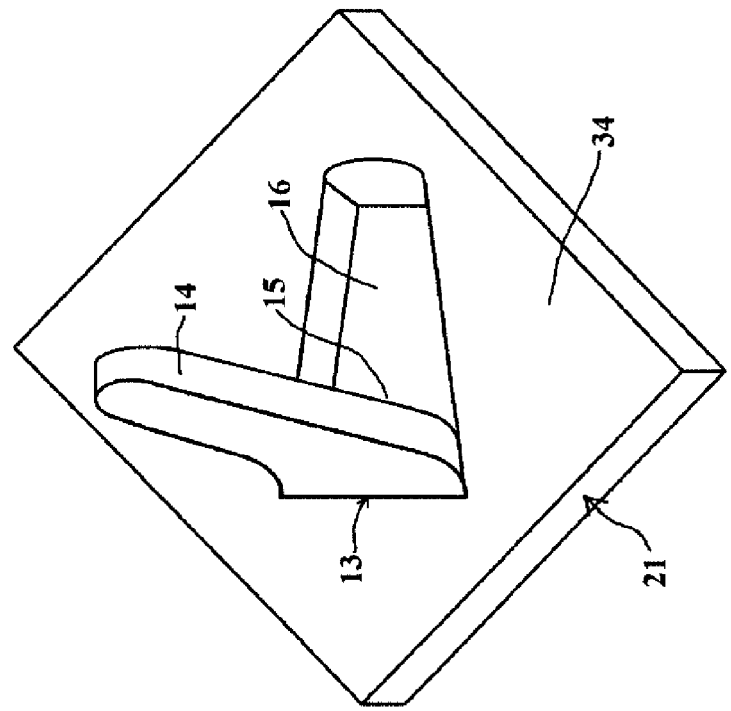
FIG. 12 is a perspective view of the holding element of FIG. 11.
Figure 11:
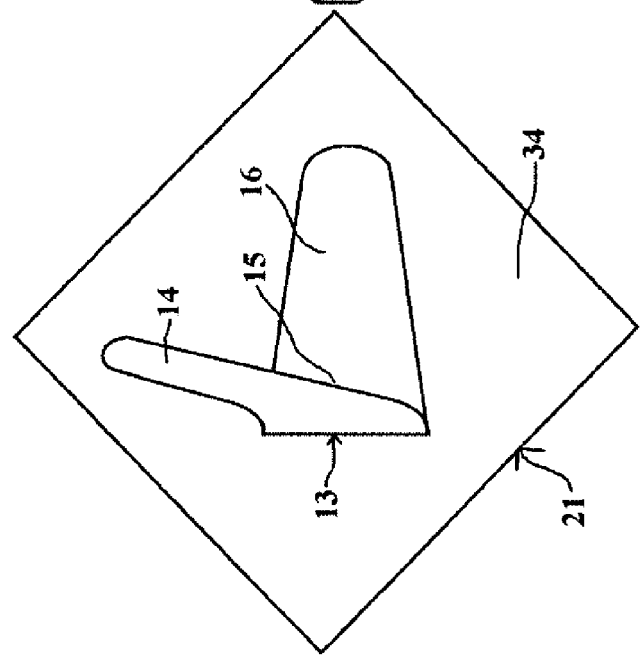
FIG. 11 is a two dimensional view of another type of holding element for a baking and/or cooking pan of the present invention that can be referred to as a tab or spike that is bent from the pan with a small radius rounded end, wherein the holding element is manufactured with the pan so that it is integrally formed with the pan.

FIGS. 11 to 13 illustrate a holding element 33, 14 in the form of a tab or spike 14 having a bent or attached end 13, a free or raised end opposed to the attached end and having a small radius rounded end, a curved or angled portion 15 near the attached end 13, and an opening or open area 16 in the support surface 34. It is noted that these tabs or spikes 14 can alternatively be formed in any other suitable shape, size, and/or strength.

Figure 16:
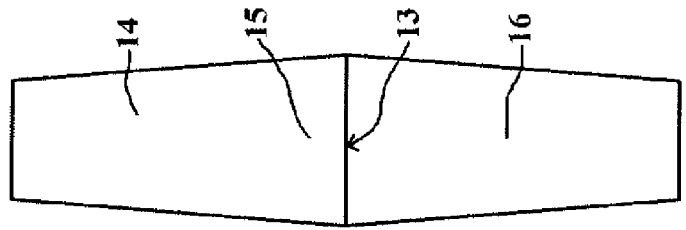
FIG. 16 is a front view of the holding element of FIGS. 14 and 15.
Figure 15:
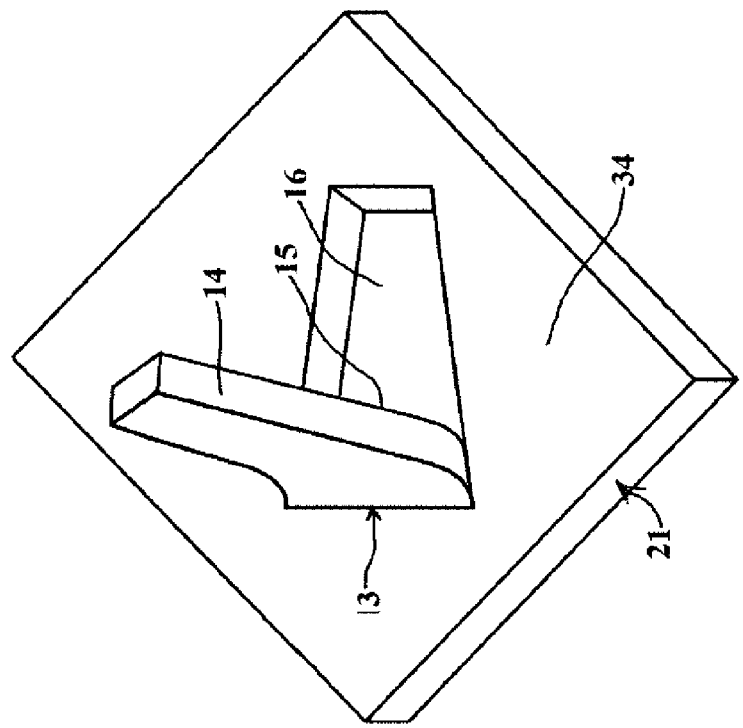
FIG. 15 is a perspective view of the holding element of FIG. 14.
Figure 14:
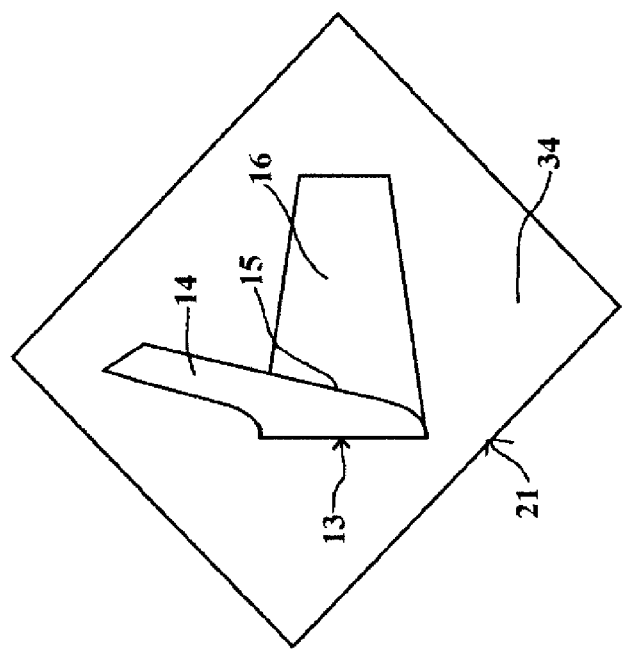
FIG. 14 is a two dimensional view of another type of holding element for a baking and/or cooking pan of the present invention that can be referred to as a tab or spike that is a bent from the pan with a flat end, wherein the holding element is manufactured with the pan so that it is integrally formed with the pan.

FIGS. 14 to 16 illustrate a holding element 33, 14 in the form of a tab or spike 14 having a bent or attached end 13, a free or raised end 14 opposed to the attached end and having a flat end, a curved or angled portion 15 near the attached end 13, and an opening or open area 16 in the support surface 34. It is noted that these tabs or spikes can alternatively be formed in any other suitable shape, size, and/or strength.

Figure 18:
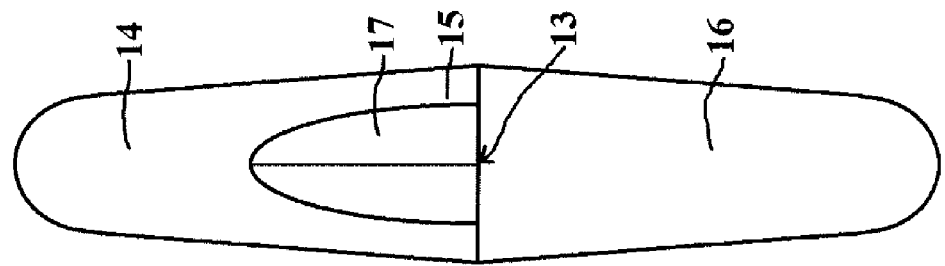
FIG. 18 is a front view of the holding element of FIG. 17.
Figure 17:
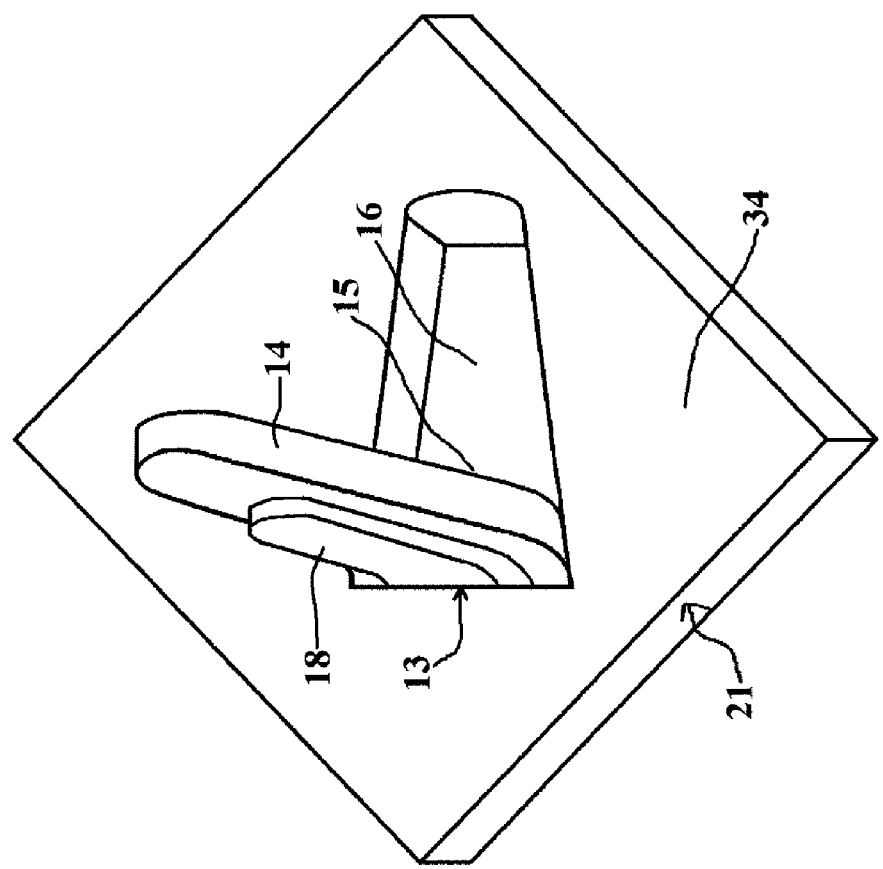
FIG. 17 is a perspective view of another type of holding element or a baking and/or cooking pan of the present invention that can be referred to as a tab or spike that is a bent from the pan with a small radius rounded end and a half oval inward push or indentation from the front side, wherein the holding element is manufactured with the pan so that it is integrally formed with the pan.

FIGS. 17 and 18 illustrate that the tabs or spikes 14 can be made with a half oval inward push or indentation 18 from the front side 17 in order to make the tabs or spikes stronger than tabs or spikes without the indentation (shown in FIGS. 11 to 16). The half oval inward push or indentation 18 from the front side acts as a gusset to the tab or spike 14 and improves the strength of the tabs or spikes 14. It is noted that these pushes or indentations 18 and/or the tabs or spikes can alternatively be formed in any other suitable shape, size, and/or strength.

Figure 20:
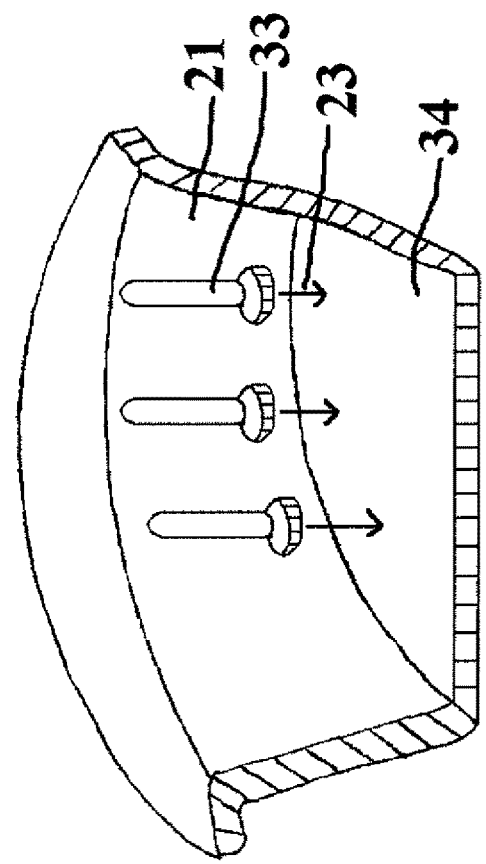
FIG. 20 is a fragmented perspective view of a baking and/or cooking pan of the present invention having holding elements in the form of unthreaded pins or studs which are manufactured separately from a frame of the pan, a wherein the holding elements are welded to a top of the frame.
Figure 19:
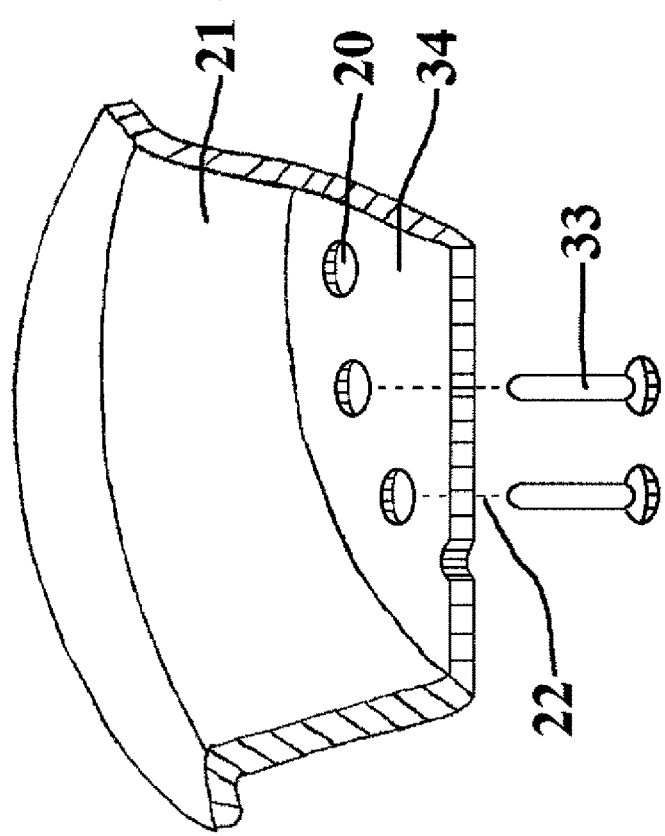
FIG. 19 is a fragmented perspective view of a baking and/or cooking pan of the present invention having holding elements in the form of unthreaded pins or studs which are manufactured separately from a frame of the pan, wherein the holding elements extend through openings in the frame and are welded to a bottom of the frame.

FIGS. 19 and 20 illustrate examples of baking and/or cooking pans 21 having pins or studs 33 which are manufactured separately (shown in FIGS. 3 to 10) and then attached to the support surface 34 or other desired wall. FIG. 19 illustrates that the pins or studs 33 can be upwardly inserted 22 through holes or openings 20 in the support surface 34 so that the heads or flanges 12 of the pins or studs 33 are located below the bottom wall 44. FIG. 20 illustrates that the heads or flanges 12 of the pins or studs 33 can inserted downward 23 to engage the support surface 34 so that the heads or flanges 12 of the pins or studs 33 are located above the bottom wall 44. The pins or studs 33 of FIG. 19 are welded from the bottom to the baking and/or cooking pan 21 and the pins or studs of FIG. 20 are welded to top to the baking and/or cooking pan 21. It is noted that the pins or studs 33 can alternatively be attached to the pan 21 by any other suitable attachment means.

Figure 22:
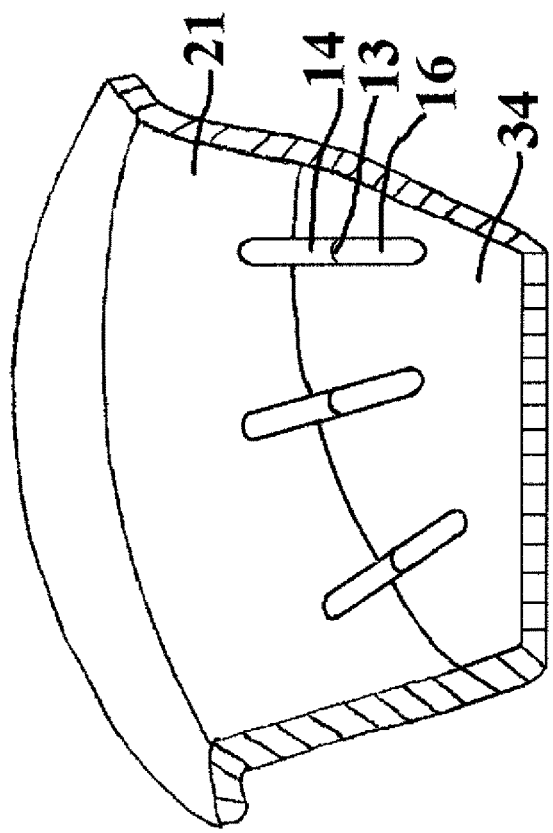
FIG. 22 is a fragmented perspective view of a baking and/or cooking pan of the present invention having holding elements in the form of tabs or spikes which are bent from a frame of the pan.
Figure 21:
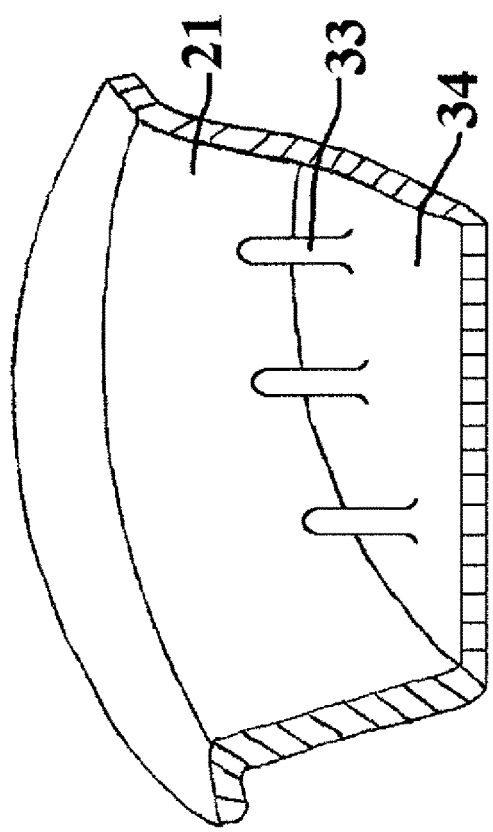
FIG. 21 is a fragmented perspective view of a baking and/or cooking pan of the present invention having holding elements in the form of unthreaded pins or studs which are manufactured integrally with a frame of the pan.
Figure 25:
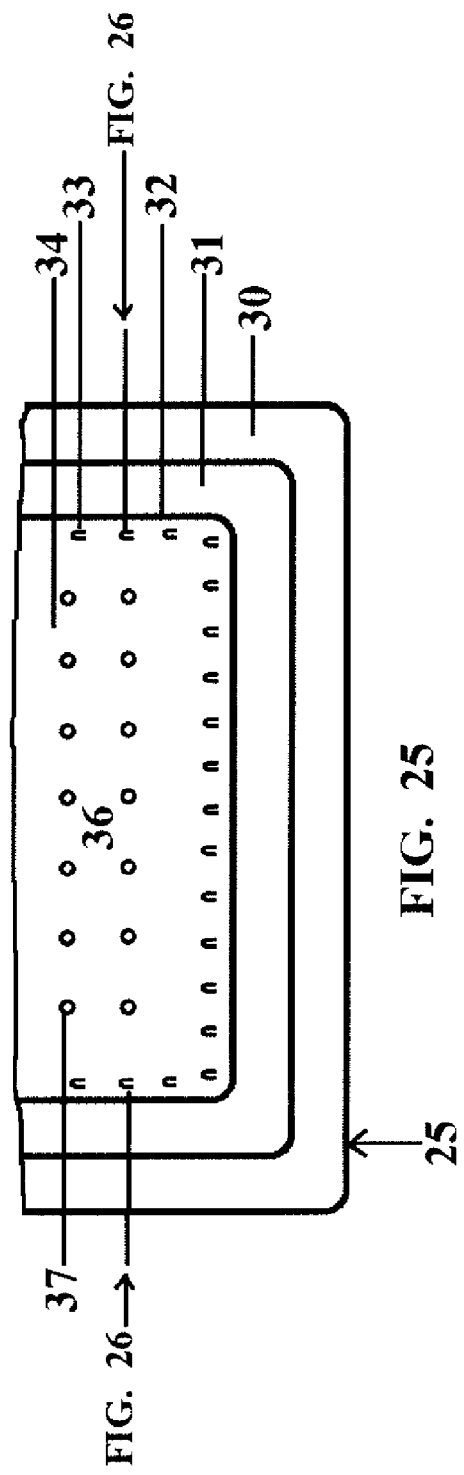
FIG. 25 is a fragmented top view of a baking and/or cooking pan according to a second embodiment of the present invention, wherein the pan includes a frame forming a fixed perforated support surface for food product with holding elements upwardly extending therefrom.
Figure 26:
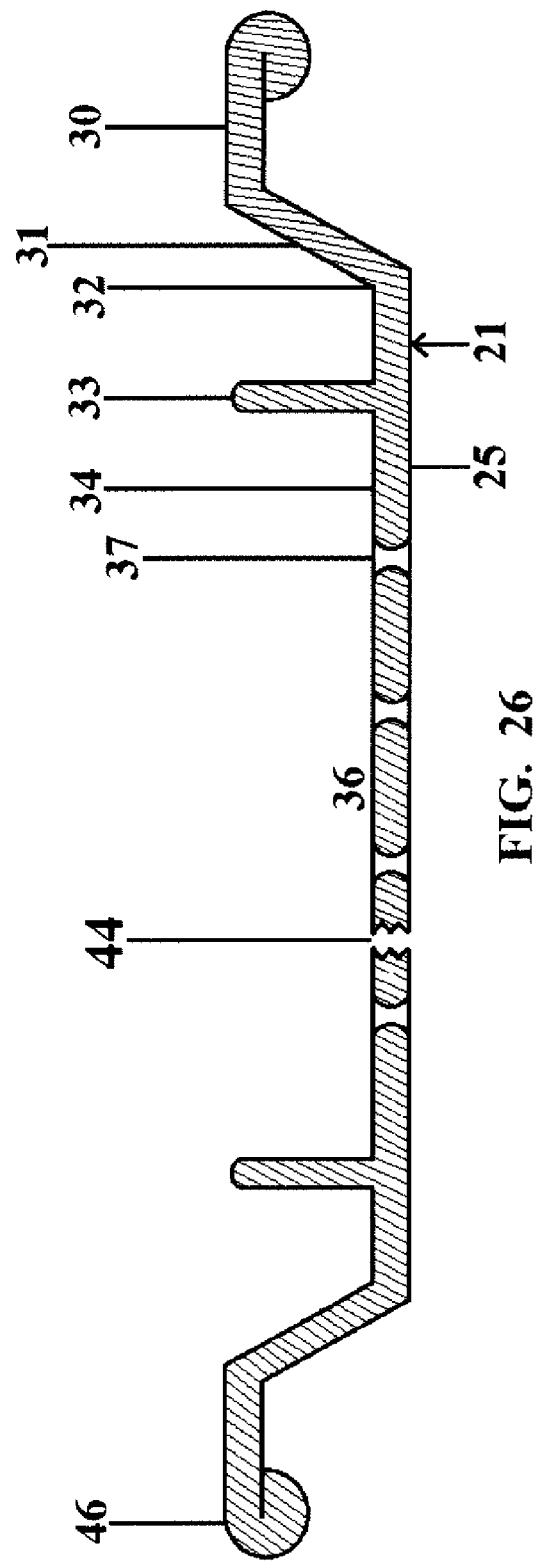
FIG. 26 is an enlarged cross-sectional view of the baking and/or cooking pan of FIG. 25 taken along line 26-26 of FIG. 25.
Figure 27:
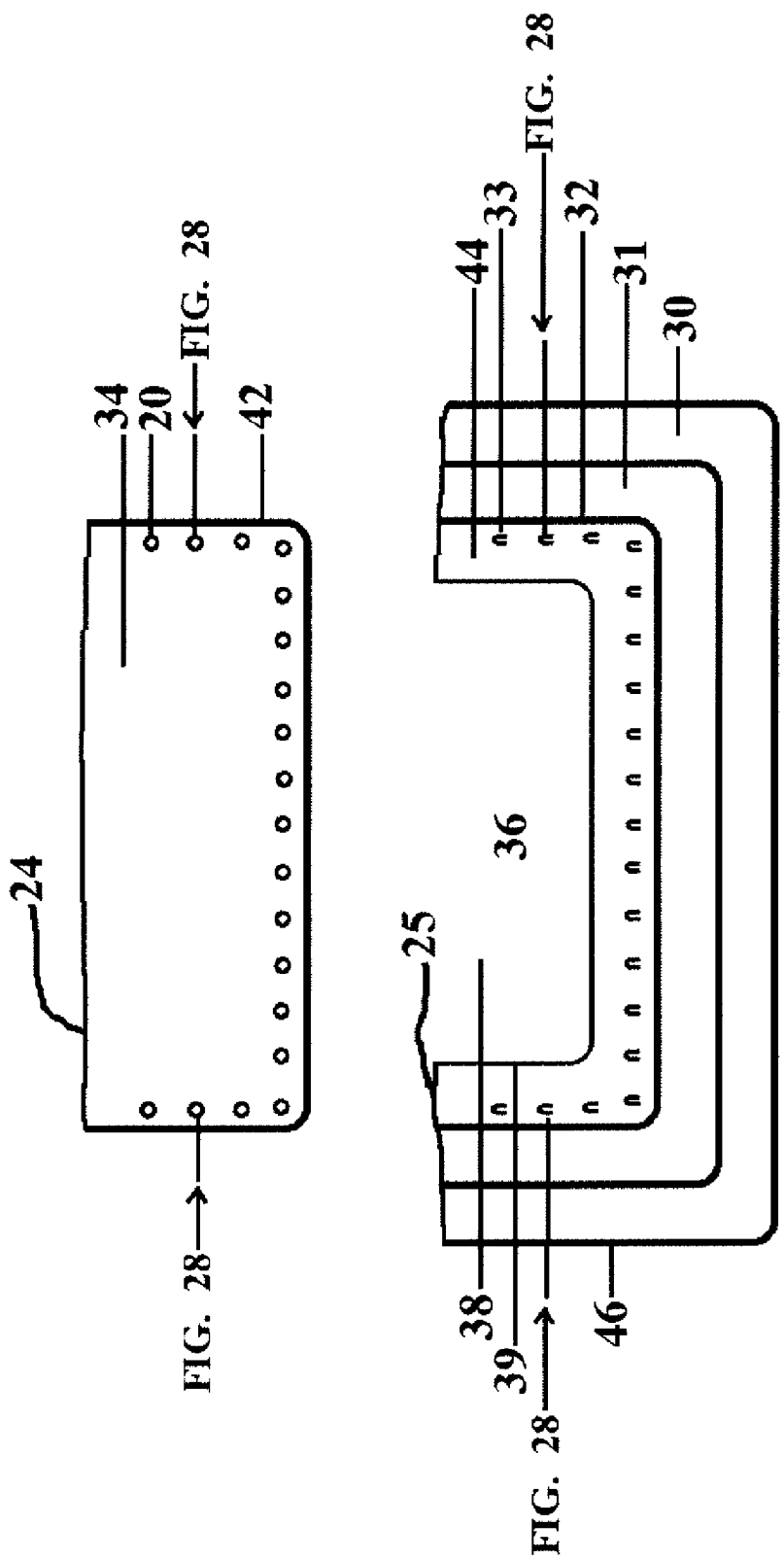
FIG. 27 is a fragmented, exploded top view a baking and/or cooking pan according to a third embodiment of the present invention, wherein the pan includes a frame with holding elements upwardly extending therefrom, and a removable bottom plate forming a non-perforated support surface for food product with holes for passage of the holding elements therethrough.
Figure 28:
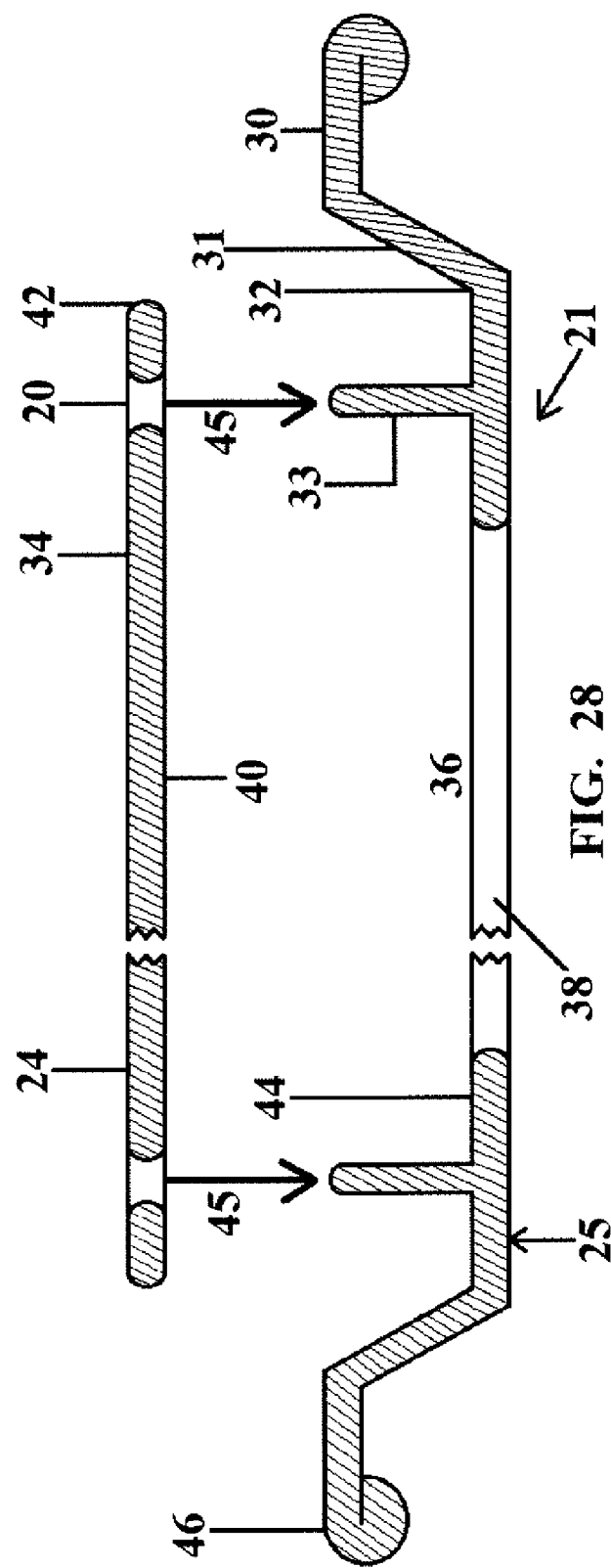
FIG. 28 is an enlarged cross-sectional view of the baking and/or cooking pan of FIG. 27 taken along line 28-28 of FIG. 27.
Figure 30:
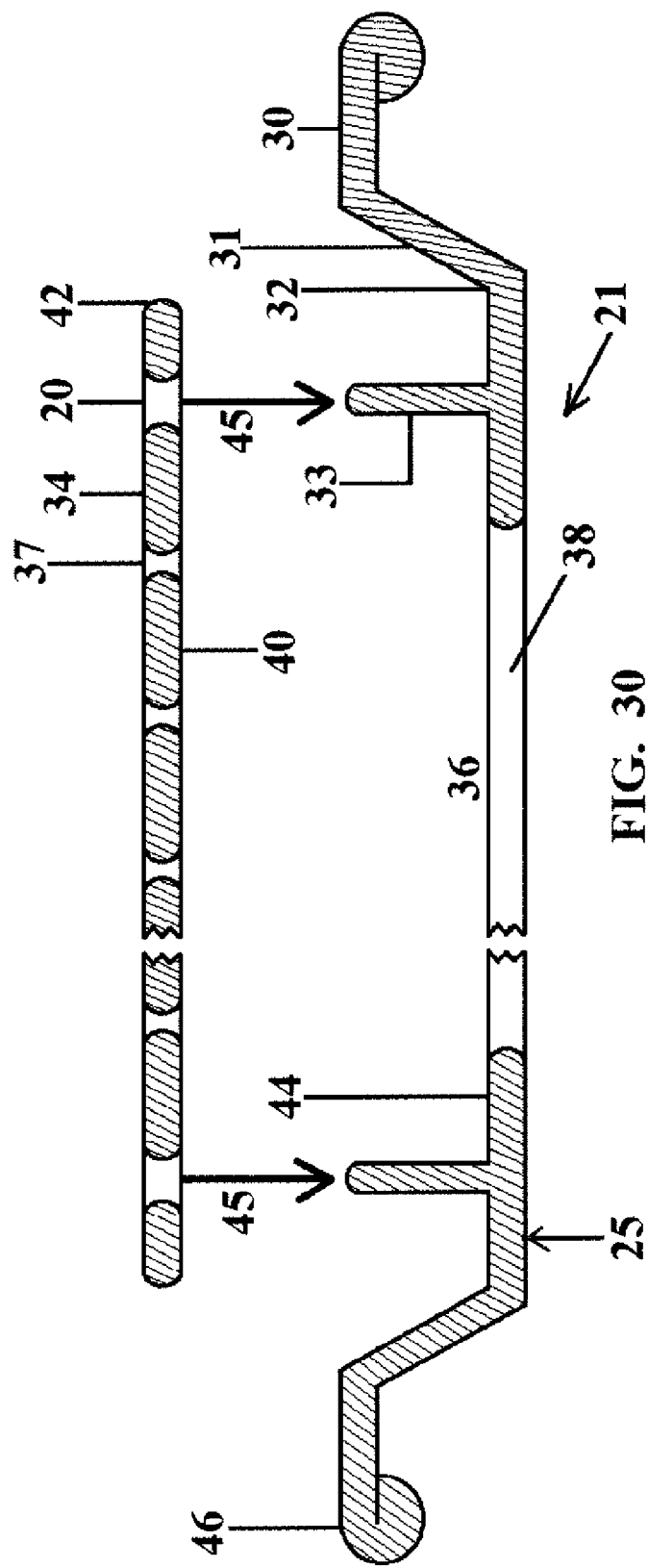
FIG. 30 is an enlarged cross-sectional view of the baking and/or cooking pan of FIG. 29 taken along line 30-30 of FIG. 29.
Figure 31:
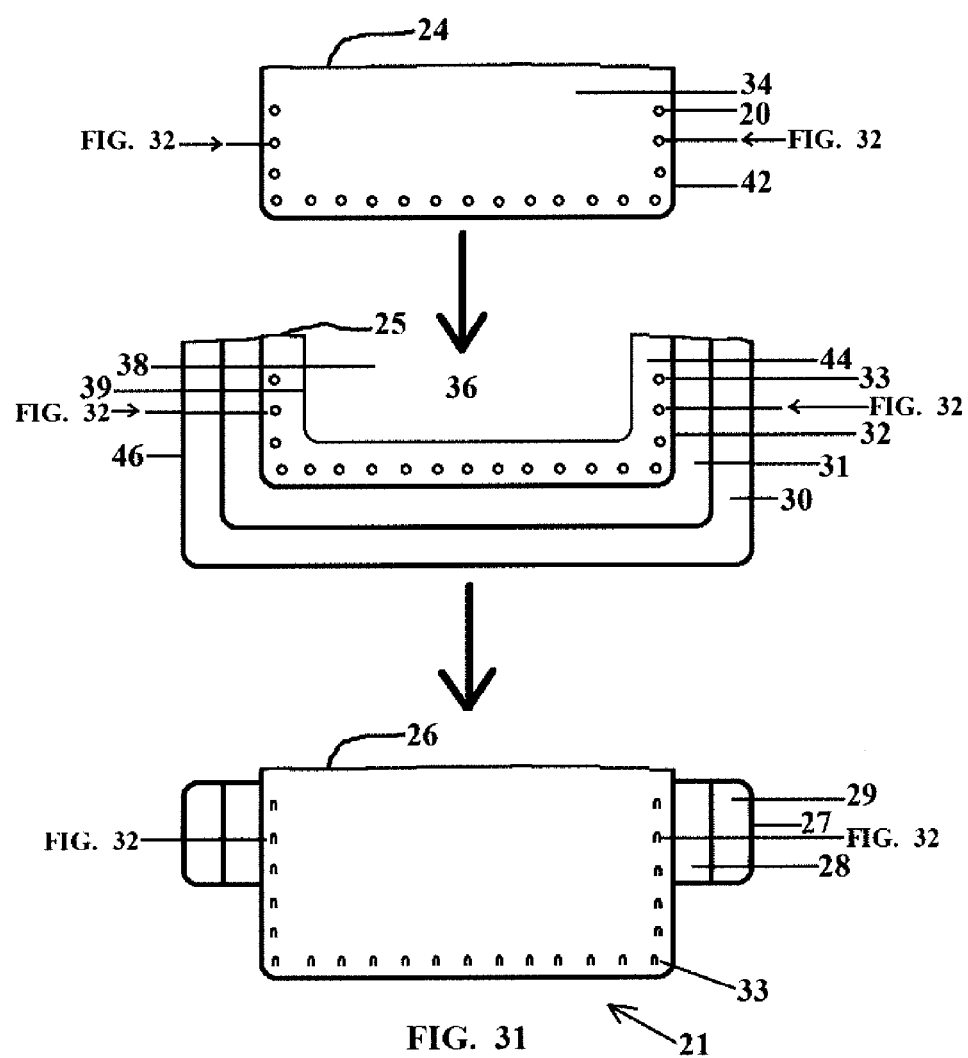
FIG. 31 is a fragmented, exploded top view a baking and/or cooking pan according to a fifth embodiment of the present invention, wherein the pan includes a non-perforated removable holding element plate with holding elements upwardly extending therefrom, a frame with holes for passage of the holding elements therethrough, and a removable bottom plate forming a non-perforated support surface for food product with holes for passage of the holding elements therethrough.
Figure 32:
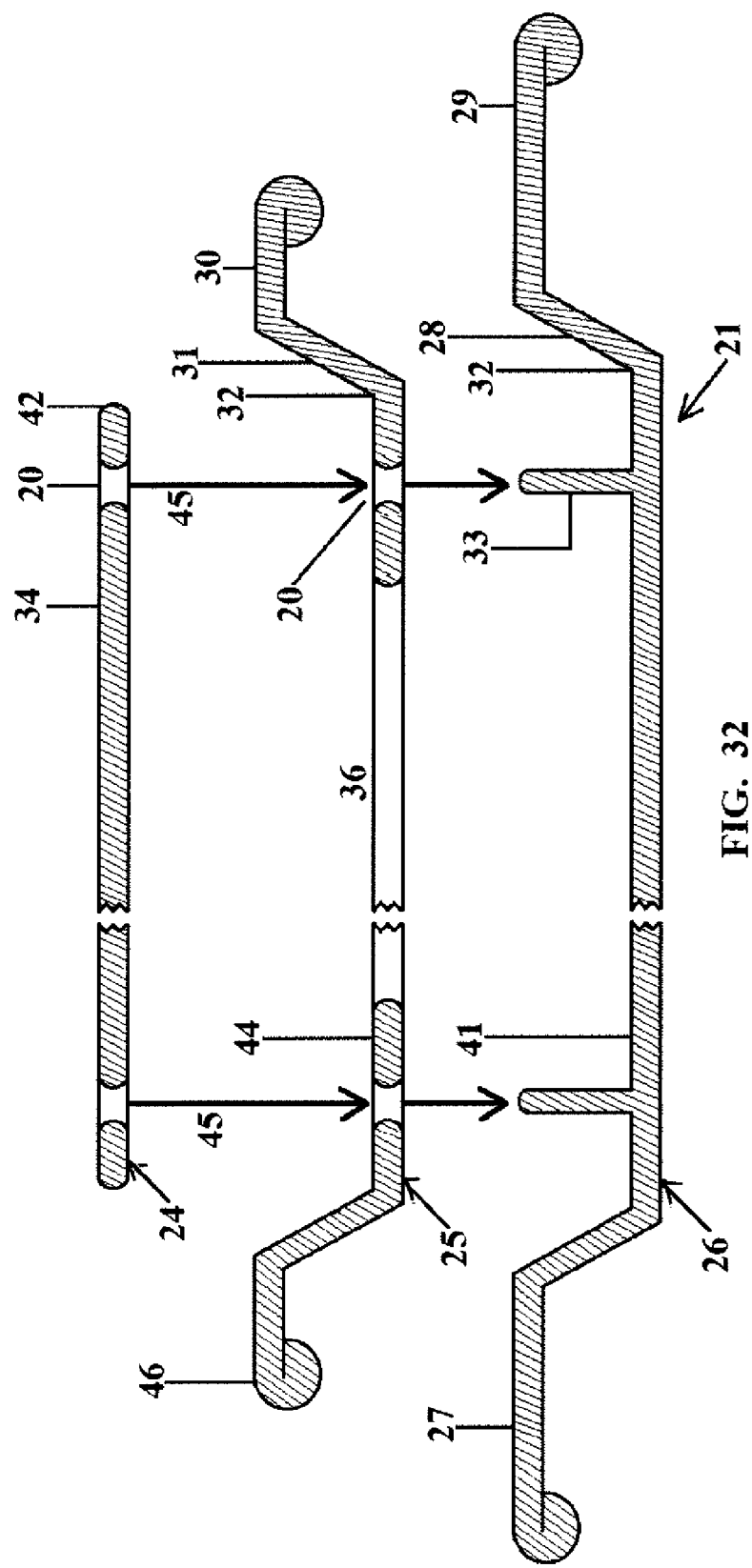
FIG. 32 is an enlarged cross-sectional view of the baking and/or cooking pan of FIG. 31 taken along line 32-32 of FIG. 29.
Figure 33:
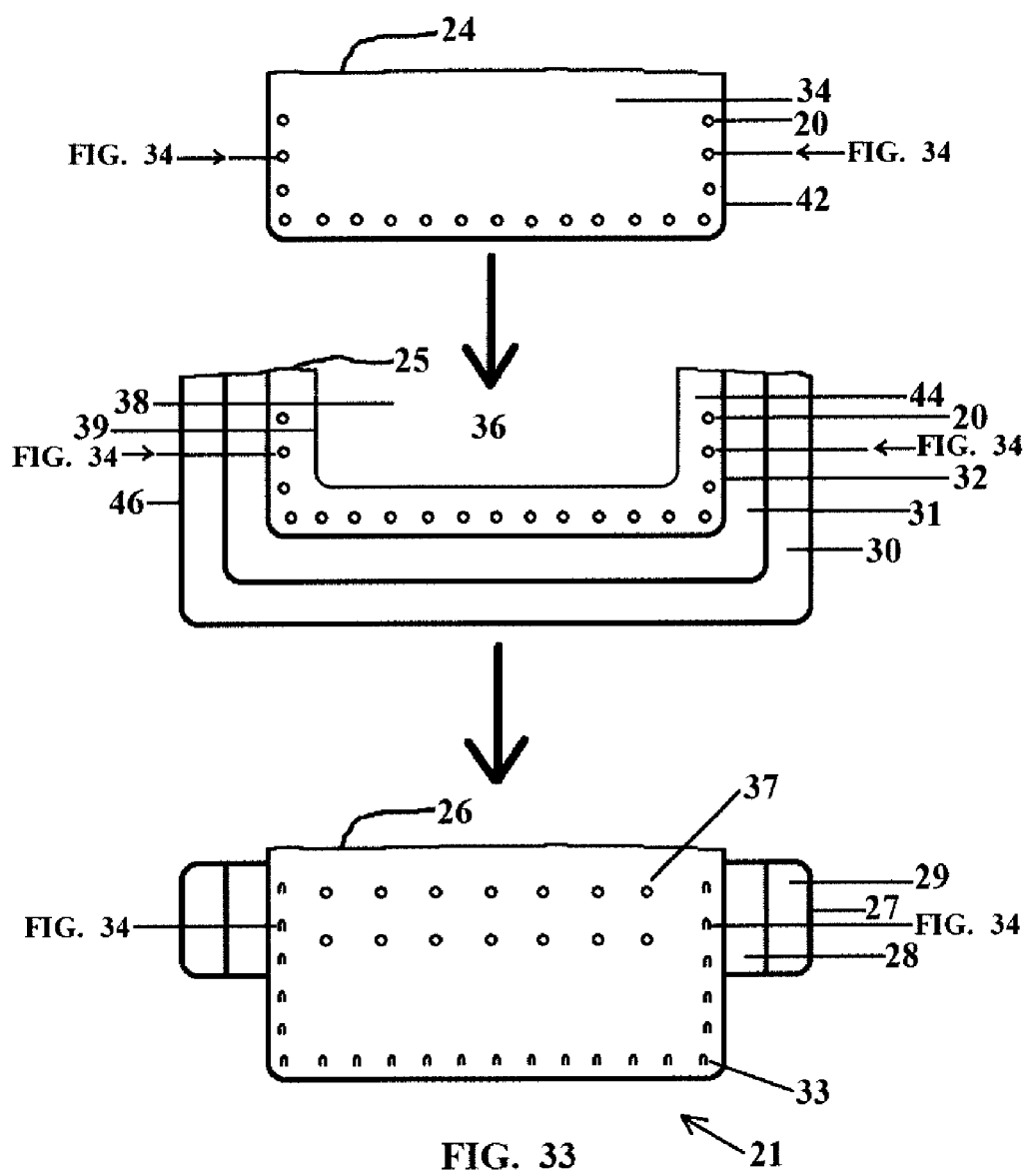
FIG. 33 is a fragmented, exploded top view a baking and/or cooking pan according to a sixth embodiment of the present invention, wherein the pan includes a perforated removable holding element plate with holding elements upwardly extending therefrom, a frame with holes for passage of the holding elements therethrough, and a removable bottom plate forming a non-perforated support surface for food product with holes for passage of the holding elements therethrough.
Figure 34:
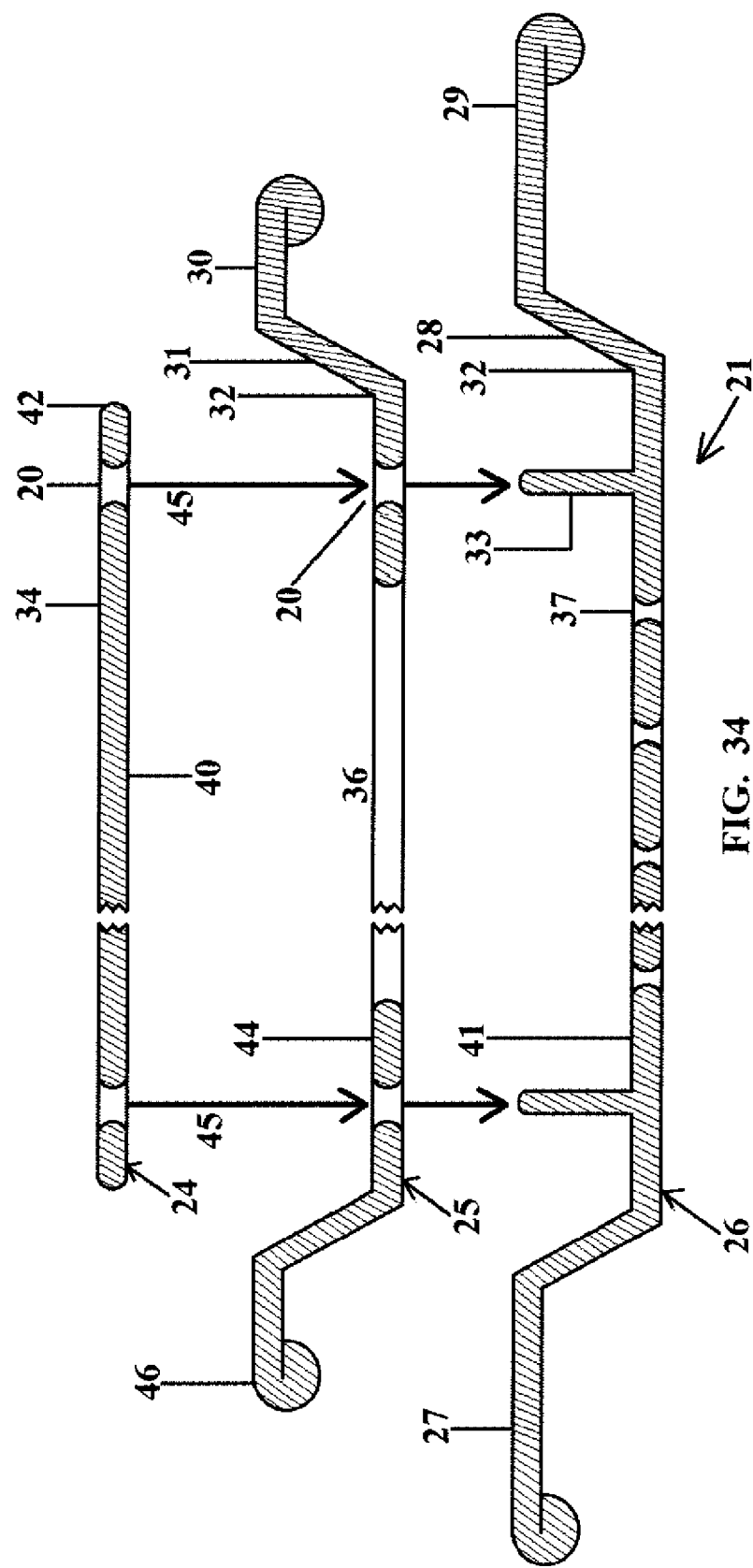
FIG. 34 is an enlarged cross-sectional view of the baking and/or cooking pan of FIG. 33 taken along line 34-34 of FIG. 33.
Figure 35:
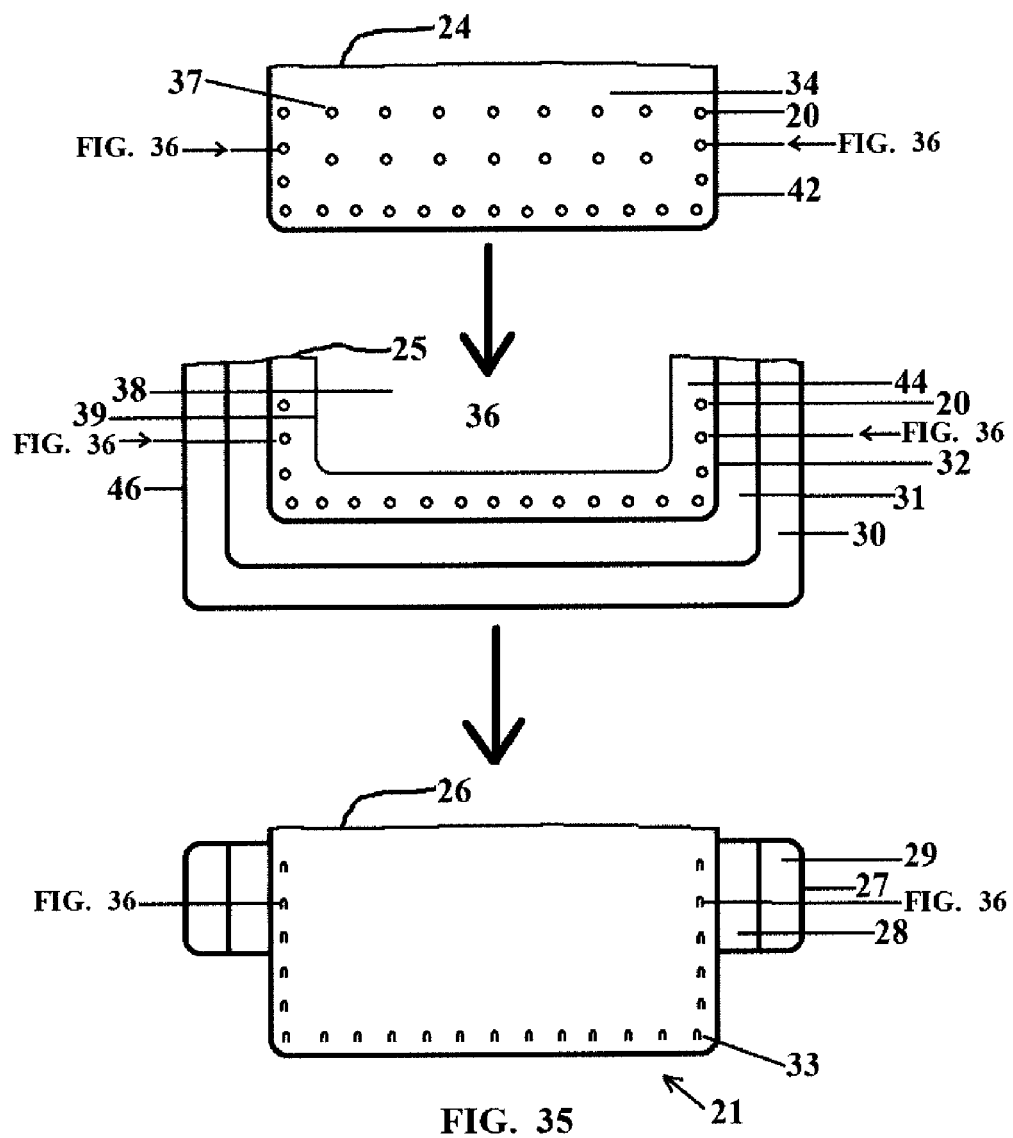
FIG. 35 is a fragmented, exploded top view a baking and/or cooking pan according to a seventh embodiment of the present invention, wherein the pan includes a non-perforated removable holding element plate with holding elements upwardly extending therefrom, a frame with holes for passage of the holding elements therethrough, and a removable bottom plate forming a perforated support surface for food product with holes for passage of the holding elements therethrough.
Figure 36:
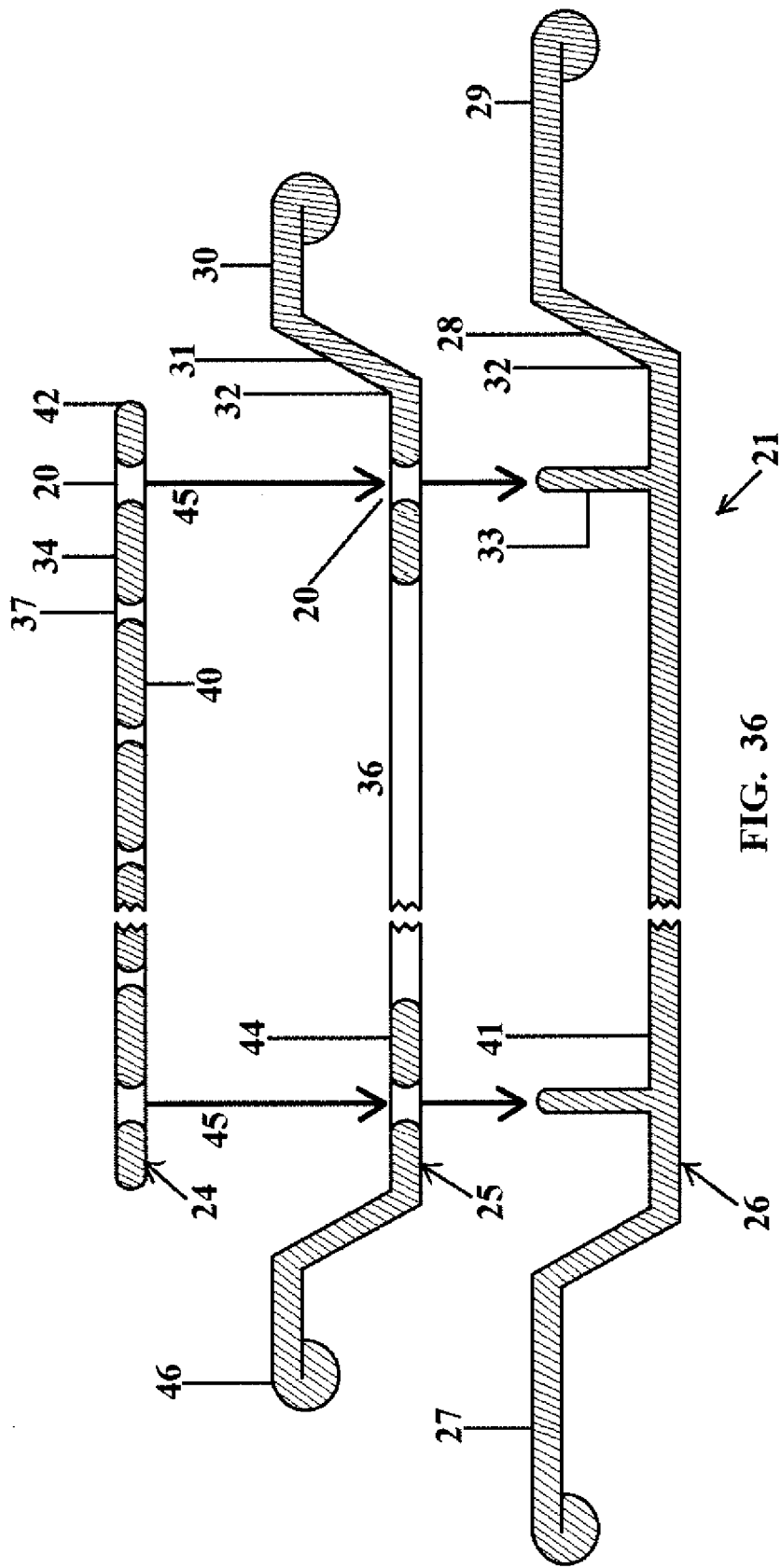
FIG. 36 is an enlarged cross-sectional view of the baking and/or cooking pan of FIG. 35 taken along line 36-36 of FIG. 35.
Figure 37:
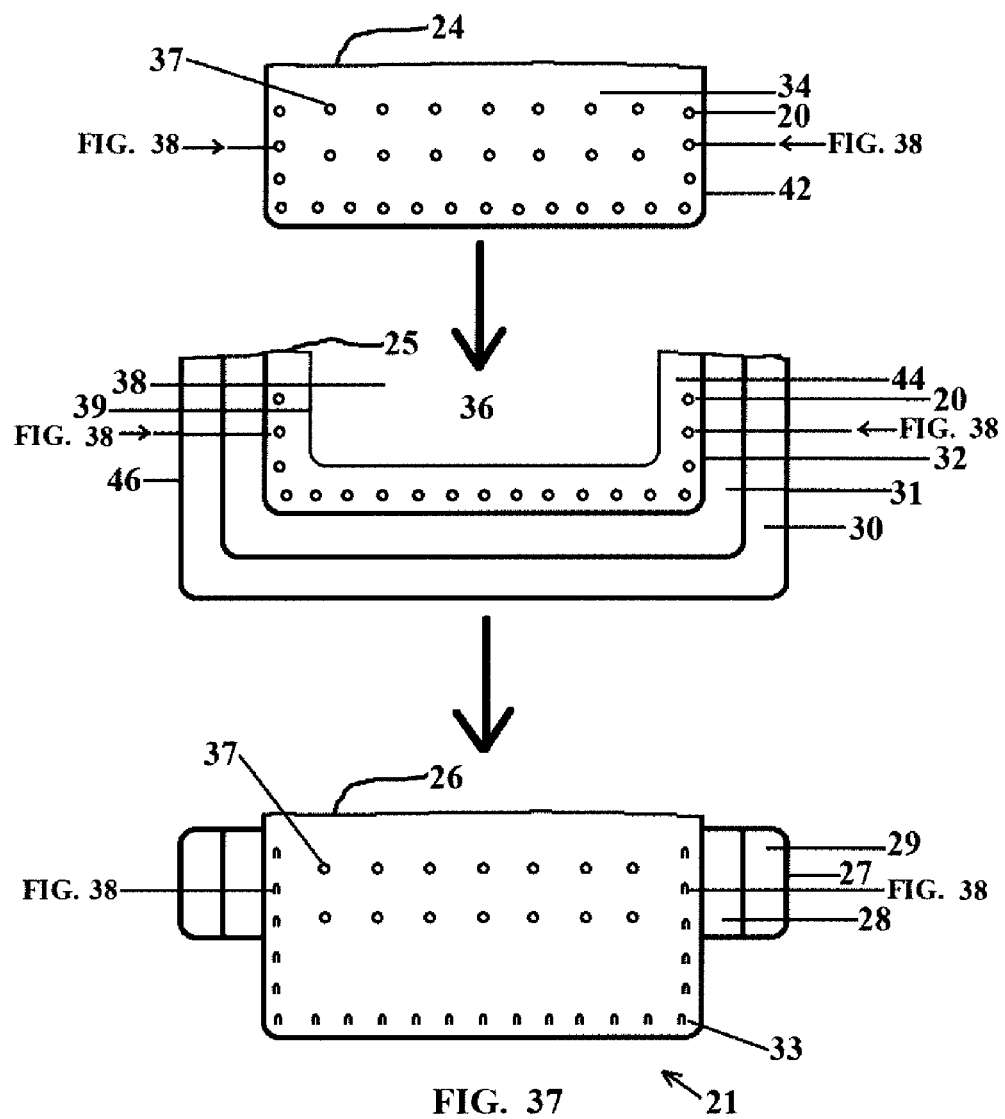
FIG. 37 is a fragmented, exploded top view a baking and/or cooking pan according to an eighth embodiment of the present invention, wherein the pan includes a perforated removable holding element plate with holding elements upwardly extending therefrom, a frame with holes for passage of the holding elements therethrough, and a removable bottom plate forming a perforated support surface for food product with holes for passage of the holding elements therethrough.
Figure 38:
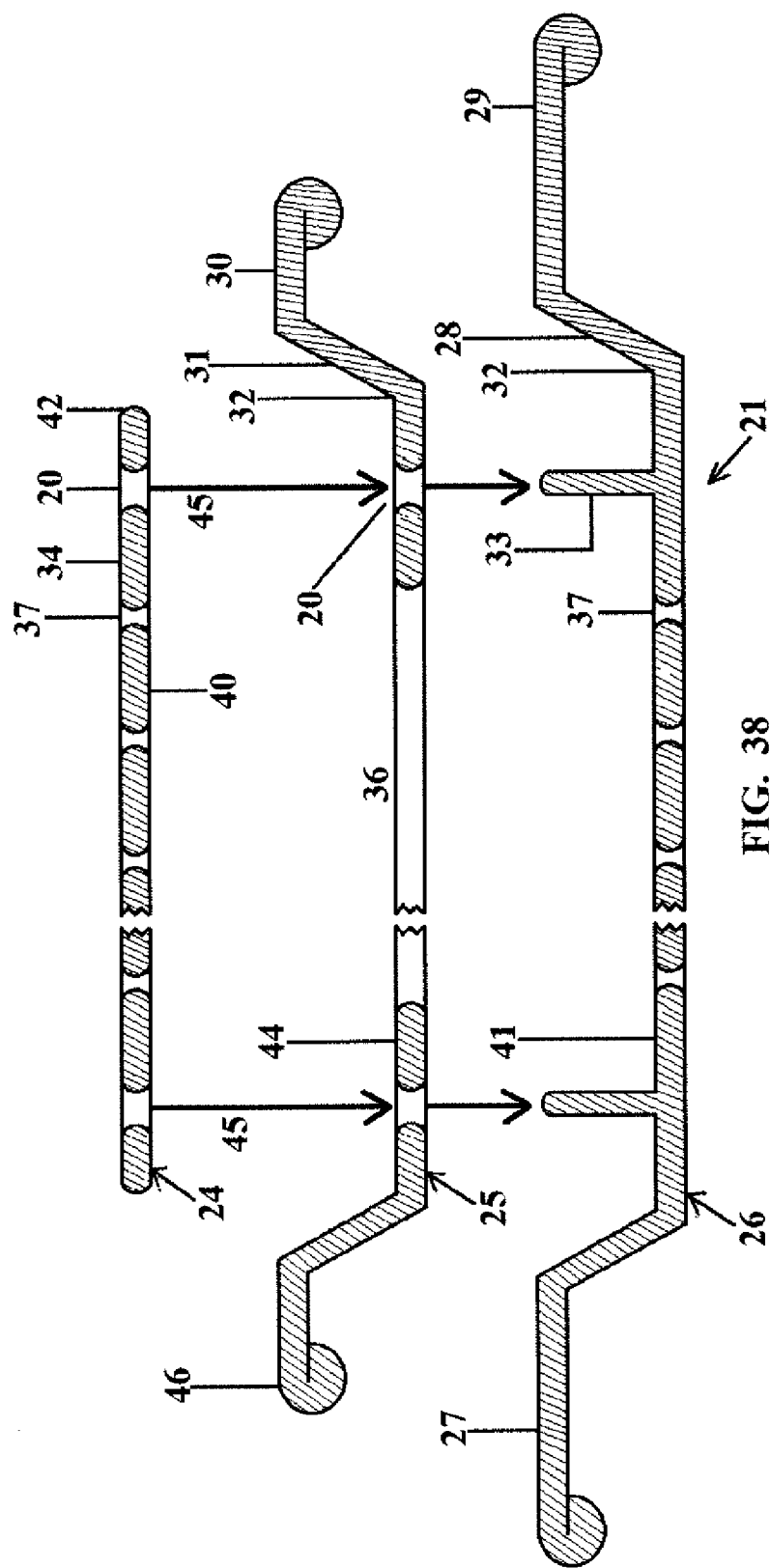
FIG. 38 is an enlarged cross-sectional view of the baking and/or cooking pan of FIG. 37 taken along line 38-38 of FIG. 37.

FIGS. 21 and 22 illustrate examples of baking and/or cooking pans 21 having integrally formed holding elements 33, 14 (shown in FIGS. 1 to 2 and 11 to 18). FIG. 21 illustrates a baking and/or cooking pan 21 having pins or studs 33 which were die cast or the like with the baking and/or cooking pan 21. FIG. 22 illustrates a baking and/or cooking pan 21 having tabs or spikes which were lanced or the like from the baking and/or cooking pan 21.

FIGS. 23 to 38 illustrates eight different exemplary embodiments or variations of the baking and/or cooking pans 21 according to the present invention. Each of these illustrated embodiments include holding elements 33, 14 in the form of the integral unthreaded pins or studs 33 of FIG. 1 but it is noted that any other suitable form of the holding elements 33, 14 can alternatively be utilized with each of the illustrated embodiments of the baking and/or cooking pans.

As discussed above, the first illustrated embodiment of the baking and/or cooking pans 21 according to the present invention (shown in FIGS. 23 and 24) is one piece unit. The second illustrated embodiment of the baking and/or cooking pans 21 according to the present invention (shown in FIGS. 25 and 26) is also a one piece unit. The second illustrated embodiment of the baking and/or cooking pans 21 according to the present invention is substantially the same as the first embodiment except that the support surface 34 and the bottom wall 44 of the frame 25 is perforated. The perforated support surface 34 includes a plurality of relatively small and spaced-apart openings 37 configured to allow air to circulate evenly and efficiently during baking to brown and/or crisp a bottom of the pizza pies or other baked (or cooked) food product on the support surface 34.

The third and the fourth embodiments of the baking and/or cooking pans 21 according to the present invention (shown in FIGS. 27 to 30) are substantially the same as the first and second embodiments except that they are two piece units. The illustrated baking and/or cooking pans 21 according to the second and third embodiments include the frame 25 and a separate removable bottom plate 24 supportable on an upper side of the bottom wall 44 of the frame 25 within the outer wall 31. The illustrated removable bottom plate 24 is a flat plate having planar and parallel upper and lower surfaces and is configured to cooperate with the frame 25 so that is can be supported on the bottom wall 44 of the frame 25 within the outer wall 31 of the frame 25. The outer periphery or edge 42 of the removable bottom plate 24 is sized and shaped to cooperate with the frame 25 to conform with and fit closely within the peripheral edge of the bottom wall 44 of the frame 25. The frame 25 has at least one centrally located opening 38 so that air freely circulates to the bottom surface of the removable bottom plate 24. The illustrated frame 25 has a single central opening 38 formed by edge 39 and sized to expose the majority of the lower surface 40 of the removable bottom plate 24. The support surface 34 is formed by an upper side of the removable bottom plate 24 and thus is removable and separate from the frame 25. The holding elements 33, 14 are fixed to the frame 25 and the removable bottom plate 24 is provided with a plurality of openings 20 for passage of the holding elements 33, 14 therethrough when the removable bottom plate 24 is moved downward 45 to be supported on the frame 25 so that the holding elements extend upwardly from the support surface 34. As a result of having the removable bottom plate 24, it can be easier to take the baked (or cooked) food out of the baking and/or cooking pan 21 after the food is baked. The fourth illustrated embodiment of the baking and/or cooking pans 9 according to the present invention is substantially the same as the third embodiment except that the support surface 34 and removable bottom plate 24 is perforated rather than unperforated. The perforated support surface 34 includes a plurality of small spaced apart openings 37 configured to allow air to circulate evenly and efficiently during baking to brown and/or crisp a bottom of the pizza pies or other baked (or cooked) food product on the support surface 34.

The fifth to eighth embodiments of the baking and/or cooking pans 21 according to the present invention (shown in FIGS. 31 to 38) are substantially the same as the third and fourth embodiments except that they are three piece units. The illustrated baking and/or cooking pans 21 according to the fourth to eighth embodiments include the frame 25, the removable bottom plate 24, and a removable holding element plate 26 that can support the frame 25 on an upper side thereof. The holding elements 33, 14 are fixed to the holding element plate 36 and both the removable bottom plate 24 and the frame 25 are provided with a plurality of openings 20 for passage of the holding elements 33, 14 therethrough when the removable bottom plate 24 is supported on the frame 25 and the frame 25 is supported on the removable holding element plate 26 so that the holding elements 33, 14 extend upwardly from the support surface 34.

The illustrated removable holding element plate 26 includes a substantially horizontal bottom wall 41 which can be perforated or unperforated and a pair of handles 27 that upwardly and outwardly extend from the bottom wall 41. The illustrated bottom wall 41 and handles 27 are configured to cooperated with the frame 27 so that the frame 25 is closely received on the holding element plate 26. The illustrated handles are located on opposite sides of the bottom wall 41 and each have a first or inner portion 28 from an outer periphery 32 of the bottom wall 41 at an obtuse angle of about 120 degrees to cooperate with the outer wall 31 of the frame 25 and a second or outer portion 29 that is substantially horizontal and outwardly extends from an outer end of the inner portion 28. The illustrated handles 27 are configured so that they extend outward beyond the rim 30 of the frame 25 so that the handles can be used to hold the pan 21 when the frame 25 is resting on the holding element plate 26. It is noted that the handles 27 can alternatively have any other suitable configuration or can be eliminated if desired. The illustrated handles 27 are integral with the bottom wall 41, that is, they are formed or fixed together as a one-piece component.

The fifth to eighth illustrated embodiments of the baking and/or cooking pans 21 according to the present invention are substantially the same except that the fifth embodiment (FIGS. 31 and 32) has an unperforated removable bottom plate 24 and an unperforated removable holding element plate 26, the sixth embodiment (FIGS. 33 and 34) has an unperforated removable bottom plate 24 and a perforated removable holding element plate 26, the seventh embodiment (FIGS. 35 and 36) has a perforated removable bottom plate 24 and an unperforated removable holding element plate 26, and the eighth embodiment (FIGS. 37 and 38) has a perforated removable bottom plate 24 and a perforated removable holding element plate 26 . The perforated plates include a plurality of small spaced apart openings 20 configured to allow air to circulate evenly and efficiently during baking to brown and/or crisp a bottom of the pizza pies or other baked (or cooked) food product.

It is preferable that the holding element plate 26 is perforated or otherwise open in some manner to allow air and/or heat to move efficiently in the oven if the user decides to use the removable holding element plate 26 while the food is being baked (or cooked). The removable holding element plate 26 along with the holding elements 30, 14 can be used during the time when the pizza pies, bread, other dough related products, and/or like food products is being prepared on the baking and/or cooking pan 21 and then removed before the food is placed in the oven. At the same time, if one decides to use the removable holding element plate 26 while the food is being baked in the oven, the removable holding element plate 26 is also designed to handle temperature in typical cooking ovens. The illustrated handles 27 of the removable holding element plate 26 to make it easier to move or remove the removable holding element plate 26 from the removable bottom plate 24 and the frame 25. At the same time, the pizza pies, bread, other dough related products, and/or like food products tend to stick to the baking and/or cooking pan 21 after they are baked and difficult to take out from the baking and/or cooking pan 21. The removable bottom plate 24 and the removable holding element plate 26 are included in order to ease the removal of the baked (or cooked) food from the baking and/or cooking pan 21.

It should be appreciated that the above described baking and/or cooking pans 21 can be utilized to prove a wide variety of geometric and non-geometric shapes for the baked (or cooked) food. It is noted, however, that when the baking and/or cooking pans 21 are configured to provide one or more areas of different thickness of the baked (or cooked) food and/or one or more open areas in the baked (or cooked) food, the baking and/or cooking pans 21 can be utilized to prove an even wider variety of geometric and non-geometric shapes for the baked (or cooked) food. This can be accomplished by providing one or more raised areas 53, 54 upwardly extending from the support surface 34 as described in more detail hereinbelow.

Just as the holding elements 33, 14 are utilized to hold the food in a desired shape a perimeter of the support surface 34 as discussed above, the holding elements 33, 14 can be used in any location along the support surface 34 to hold the food in a desired position such as, for example, when desired to hold the food at the raised areas 53, 54. When desired to hold the food at the raised areas 53, 54, the holding elements 33, 14 can be located adjacent to the raised areas 53, 54. It is often preferred to use the holding elements 33, 14 to hold the food at any critical corners or other features of each of the raised areas 53, 54. It should be noted, however, that the raised areas 53, 54 can alternatively be used without any of the holding elements 33, 14 adjacent thereto.

The shape and/or the height of the raised areas 47 can vary depending on the desired shape for the of the pizza pies, bread, other dough related products. Preferably, the height 47 of the raised areas 53, 54 does not exceed the height H2 of the baking and/or cooking pan 21 in order to maintain a standard height to the baking and/or cooking pans with and without the raised areas 53, 54. It is also preferable that a top surface 48 of the raised areas 53, 54 is flat and fully covered or closed, that is, free of openings, in order to prevent the food from going through any openings in the raised areas 53, 54 during the time when the baking and/or cooking pan 21 is used for preparing and baking the food. When it is desired to have an open area or a hole in any part of the desired shape of the pizza pies, bread, other dough related products, and/or like food products, the raised areas 53, 54 have a taller or higher height compared to the height of the baking and/or cooking pan. While preparing the food to bake on the baking and/or cooking pan 21, the food is not placed onto these taller or higher height raised areas 53, 54 but extends around the raised areas 53, 54 to form the desired open area or hole in the food. When it is desired to have a thinner layer of food in any part of the desired shape of the pizza pies, bread, other dough related products, and/or like food products, the raised areas 53, 54 have shorter or lower height compared to the height of the baking and/or cooking pan 21. While preparing the food to bake on the baking and/or cooking pan 21, the food is placed over these shorter or lower height raised areas 53, 54 with a thinner layer of dough on the raised area 53, 54 than around the raised area 53, 54.

As shown in FIGS. 39 to 54, the illustrated raised areas 53, 54 extend upwardly from the support surface 34 and are fixed to the bottom wall 44 of the frame 25 or the removable bottom plate 24. It is noted, however, that the raised areas 53, 54 can alternatively be fixed to any other suitable location or component of the baking and/or cooking pans 21.

FIGS. 39 to 46 illustrate the raised areas 53, 54 when located on the bottom wall 44 of the frame 25. FIGS. 39 and 40 illustrate a ninth embodiment of the baking and/or cooking pans 21 according to the present invention that is substantially the same as the first embodiment described hereinabove except that a raised area 53 is provided. The illustrated raised area 53 is fixed and extends upwardly from the upper surface of the bottom wall 44 of the frame 25 which forms the non-perforated support surface 34 so that the raised area 53 extends upwardly from the non-perforated support surface 34. The illustrated raised area 53 is rectangular shaped but it is noted that any other desired shape can alternatively be utilized.

FIGS. 41 and 42 illustrate a tenth embodiment of the baking and/or cooking pans 21 according to the present invention that is substantially the same as the ninth embodiment described hereinabove except that a plurality of holding elements 33 are provided about the raised area 53. The illustrated raised area 53 has four holding elements 33 about the raised area, wherein one holding elements 33 is located along each side of the rectangular shaped raised area 53 but it is noted that any other suitable quantity and/or locations for the holding elements 33 can alternatively be utilized.

Figure 43:
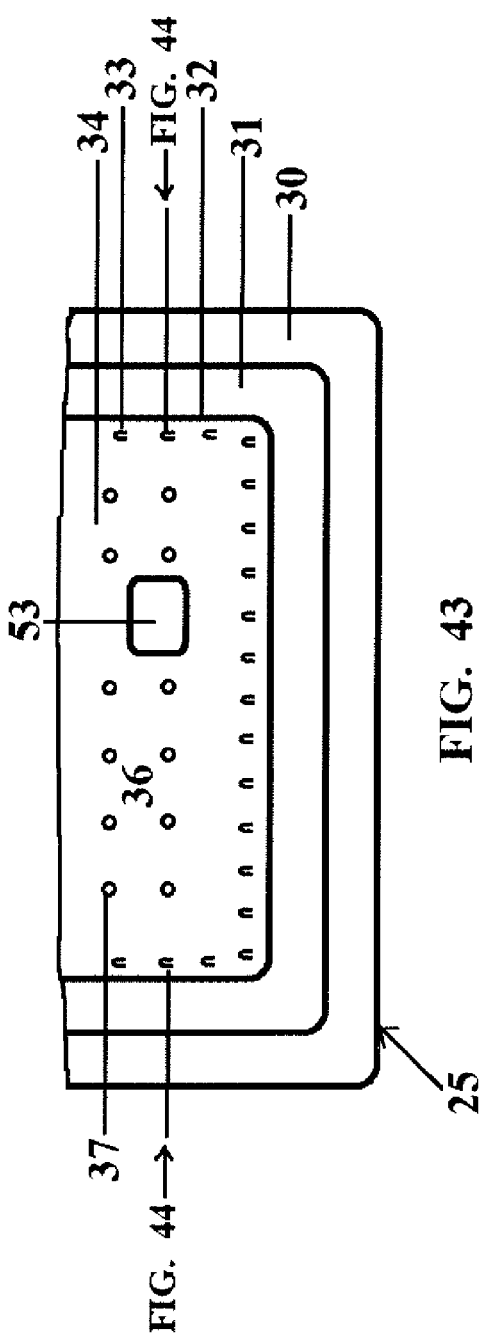
FIG. 43 is a fragmented top view a baking and/or cooking pan according to an eleventh embodiment of the present invention, wherein a frame includes a raised area upwardly extending from a perforated support surface for food products without holding elements adjacent to the raised area.
Figure 44:
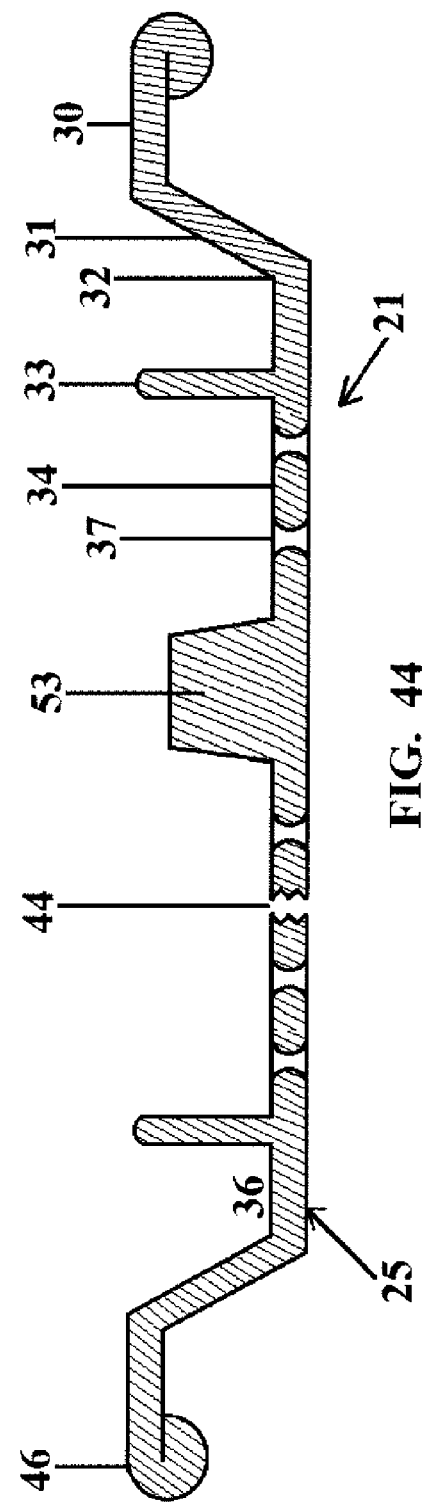
FIG. 44 is an enlarged cross-sectional view of the baking and/or cooking pan of FIG. 43 taken along line 44-44 of FIG. 43.

FIGS. 43 and 44 illustrate an eleventh embodiment of the baking and/or cooking pans 21 according to the present invention that is substantially the same as the second embodiment described hereinabove except that a raised area 53 is provided. The illustrated raised area 53 is fixed and extends upwardly from the upper surface of the bottom wall 44 of the frame 25 which forms the perforated support surface 34 so that the raised area 53 extends upwardly from the perforated support surface 34. The illustrated raised area 53 is rectangular shaped but it is noted that any other desired shape can alternatively be utilized.

FIGS. 45 and 46 illustrate a twelfth embodiment of the baking and/or cooking pans 21 according to the present invention that is substantially the same as the eleventh embodiment described hereinabove except that a plurality of holding elements 33 are provided about the raised area 53. The illustrated raised area 53 has four holding elements 33 about the raised area 53, wherein one holding elements 33 is located along each side of the rectangular shaped raised area 53 but it is noted that any other suitable quantity and/or locations for the holding elements 33 can alternatively be utilized.

Figure 47:
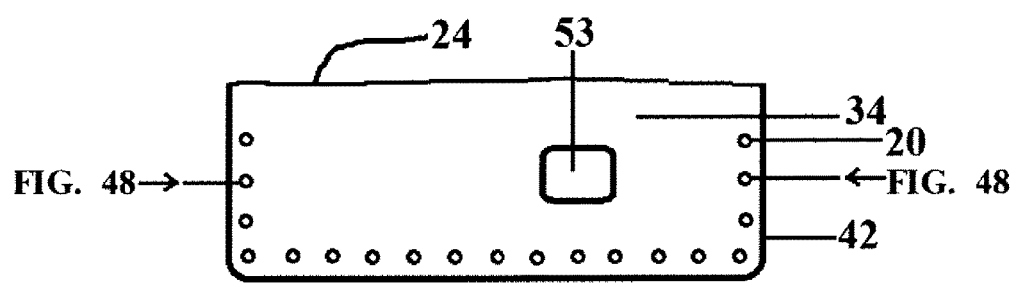
FIG. 47 is a fragmented top view of a removable bottom plate of a baking and/or cooking pan according to a thirteenth embodiment of the present invention, wherein the removable bottom plate includes a raised area upwardly extending from a non-perforated support surface for food products without holding elements adjacent to the raised area.
Figure 48:
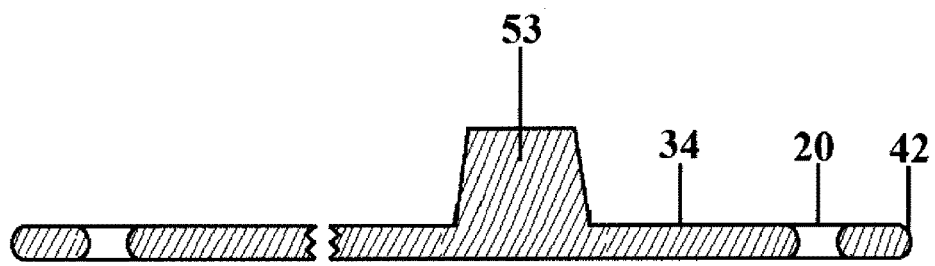
FIG. 48 is an enlarged cross-sectional view of the baking and/or cooking pan of FIG. 47 taken along line 48-48 of FIG. 47.

FIGS. 47 to 54 illustrate the raised areas 53, 54 can be located on the removable bottom plate 24. FIGS. 47 and 48 illustrate a thirteenth embodiment of the baking and/or cooking pans 21 according to the present invention that is substantially the same as the third embodiment described hereinabove except that a raised area 53 is provided. The illustrated raised area 53 is fixed and extends upwardly from the upper surface of the removable bottom plate 24 which forms the non-perforated support surface 34 so that the raised area 53 extends upwardly from the non-perforated support surface 34. The illustrated raised area 53 is rectangular shaped but it is noted that any other desired shape can alternatively be utilized.

Figure 49:
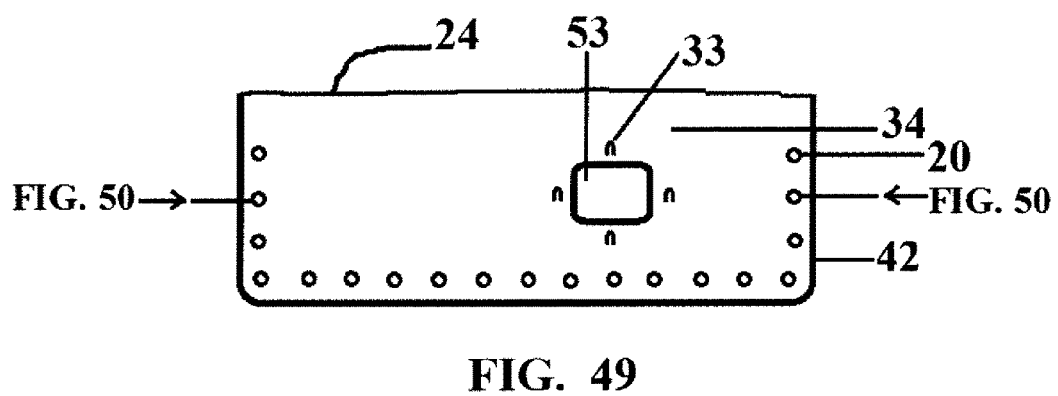
FIG. 49 is a fragmented top view of a removable bottom plate of a baking and/or cooking pan according to a fourteenth embodiment of the present invention, wherein the removable bottom plate includes a raised area upwardly extending from a non-perforated support surface for food products with holding elements adjacent to the raised area.
Figure 50:
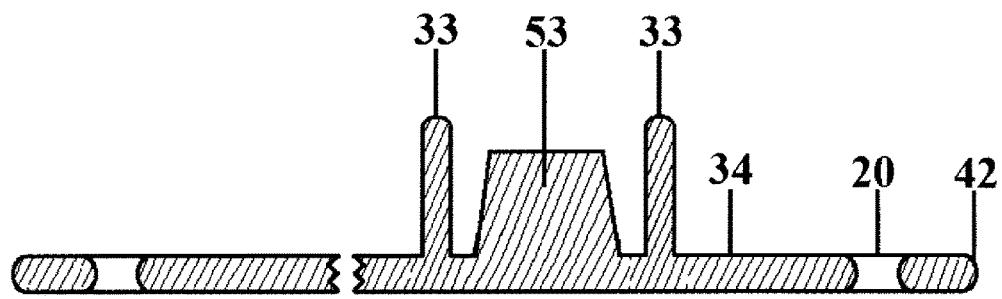
FIG. 50 is an enlarged cross-sectional view of the baking and/or cooking pan of FIG. 49 taken along line 50-50 of FIG. 49.

FIGS. 49 and 50 illustrate a fourteenth embodiment of the baking and/or cooking pans 21 according to the present invention that is substantially the same as the thirteenth embodiment described hereinabove except that a plurality of holding elements 33 are provided about the raised area 53. The illustrated raised area 53 has four holding elements 33 about the raised area 53, wherein one holding elements 33 is located along each side of the rectangular shaped raised area 53 but it is noted that any other suitable quantity and/or locations for the holding elements 33 can alternatively be utilized.

Figure 51:
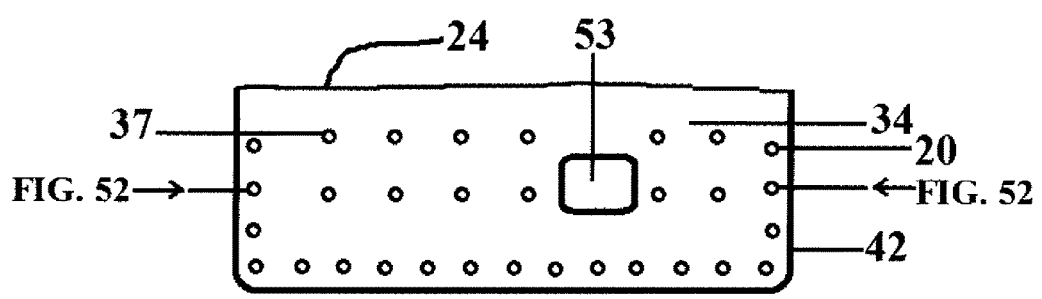
FIG. 51 is a fragmented top view of a removable bottom plate of a baking and/or cooking pan according to a fifteenth embodiment of the present invention, wherein the removable bottom plate includes a raised area upwardly extending from a perforated support surface for food products without holding elements adjacent to the raised area.
Figure 52:
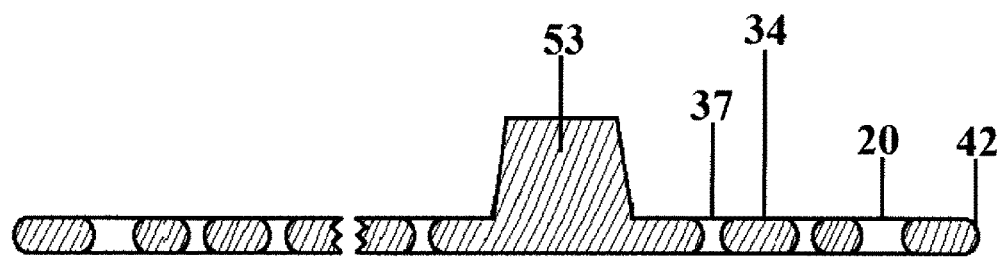
FIG. 52 is an enlarged cross-sectional view of the baking and/or cooking pan of FIG. 51 taken along line 52-52 of FIG. 51.

FIGS. 51 and 52 illustrate an fifteenth embodiment of the baking and/or cooking pans 21 according to the present invention that is substantially the same as the fourth embodiment described hereinabove except that a raised area 53 is provided. The illustrated raised area 53 is fixed and extends upwardly from the upper surface of the removable bottom plate 24 which forms the perforated support surface 34 so that the raised area 53 extends upwardly from the perforated support surface 34. The illustrated raised area 53 is rectangular shaped but it is noted that any other desired shape can alternatively be utilized.

Figure 53:
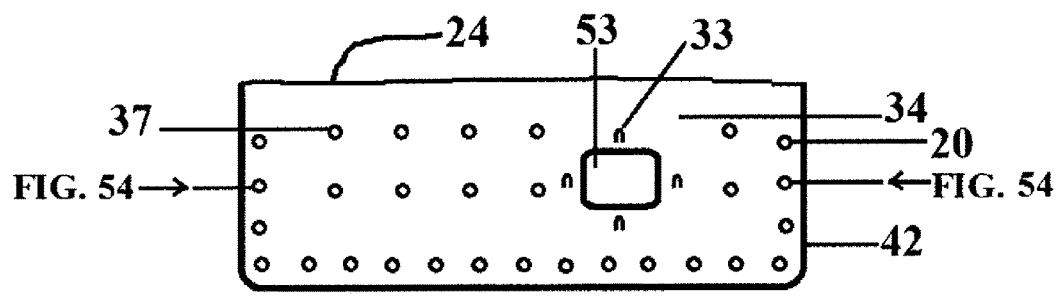
FIG. 53 is a fragmented top view of a removable bottom plate of a baking and/or cooking pan according to a sixteenth embodiment of the present invention, wherein the removable bottom plate includes a raised area upwardly extending from a perforated support surface for food products with holding elements adjacent to the raised area.
Figure 54:
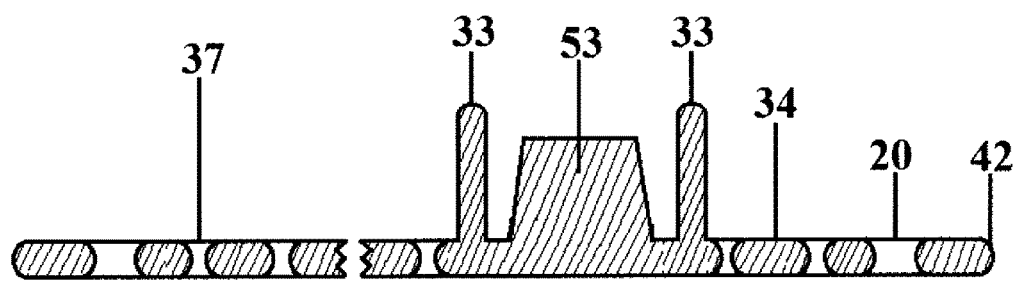
FIG. 54 is an enlarged cross-sectional view of the baking and/or cooking pan of FIG. 53 taken along line 54-54 of FIG. 53.
Figure 55:
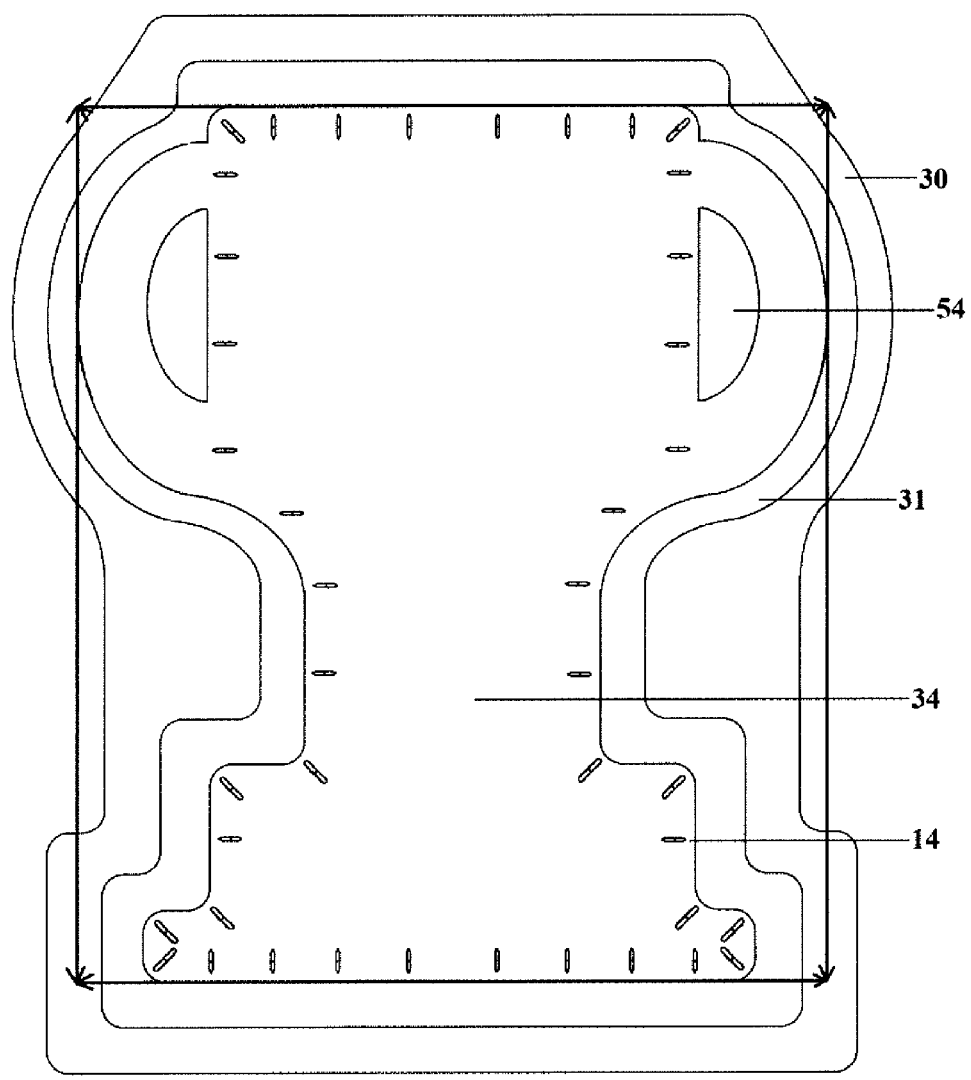
FIG. 55 is a top view of a baking and/or cooking pan having a shape of a trophy cup according to a thirteenth embodiment of the present invention, wherein a frame includes a plurality of raised areas upwardly extending from a non-perforated support surface for food products with holding elements adjacent to the raised area.
Figure 56:
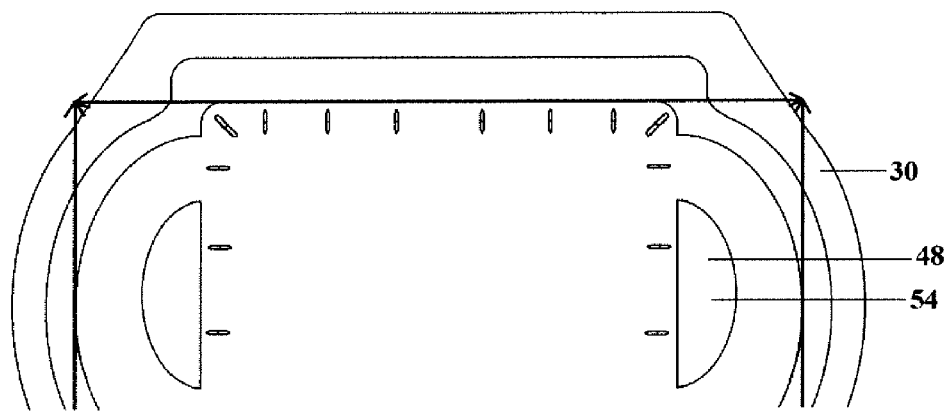
FIG. 56 is a fragmented top view showing a portion of the pan of FIG. 55 having the plurality of raised portions.
Figure 57:
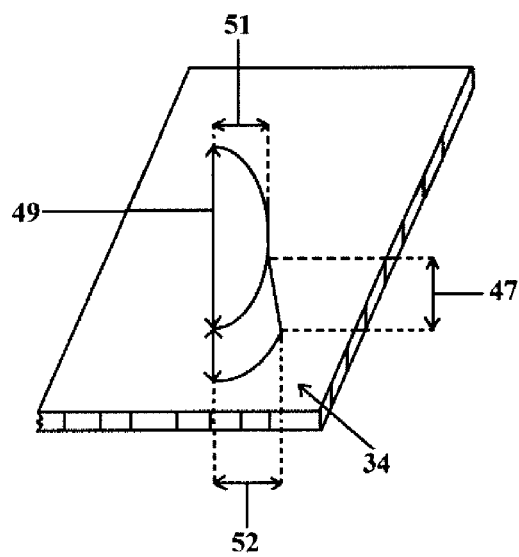
FIG. 57 is an enlarged, fragmented perspective view showing one of the raised areas of FIG. 56.
Figure 58:
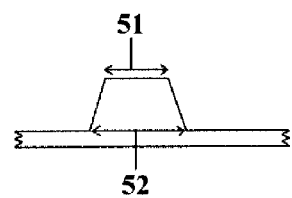
FIG. 58 is an elevational view of the raised area of FIG. 57 showing top and bottom minor axes (short axes) of the half-oval shaped raised area.
Figure 59:
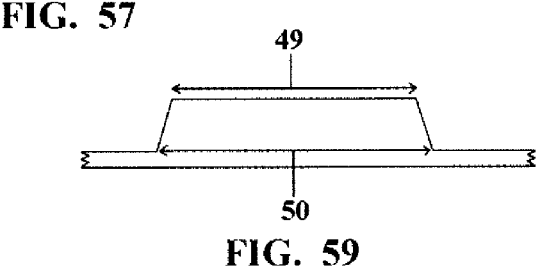
FIG. 59 is an elevational view of the raised area of FIGS. 57 and 58 showing top and bottom major axes (short axis) of the half-oval shaped raised area.
Figure 60:
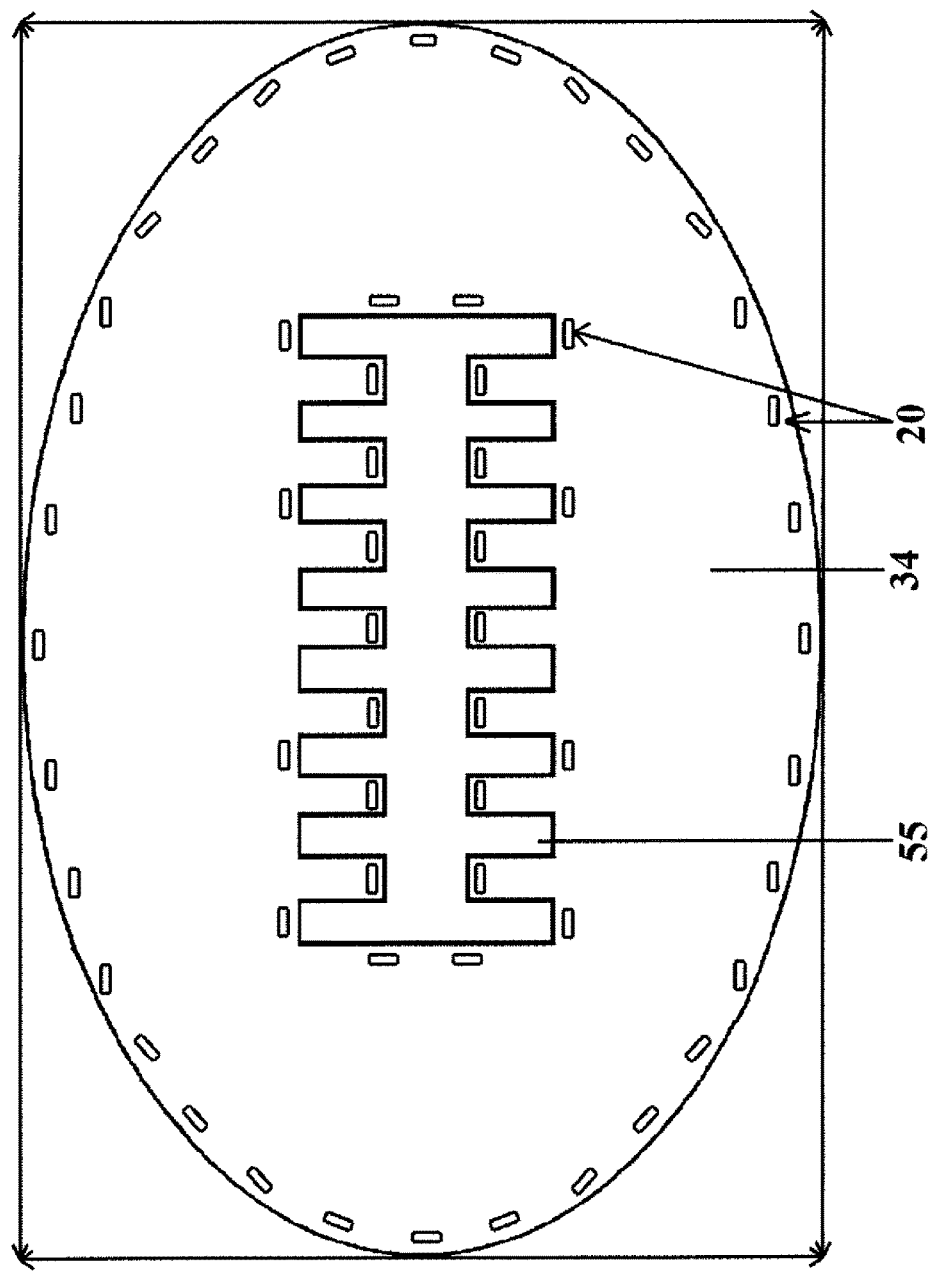
FIG. 60 is a top view of a removable bottom plate of a baking and/or cooking pan having a shape of a American football according to a fourteenth embodiment of the present invention, wherein the removable bottom plate forms a non-perforated support surface for food product and has holes for passage of holding elements therethrough and a hole for passage of a raised area therethrough.
Figure 61:
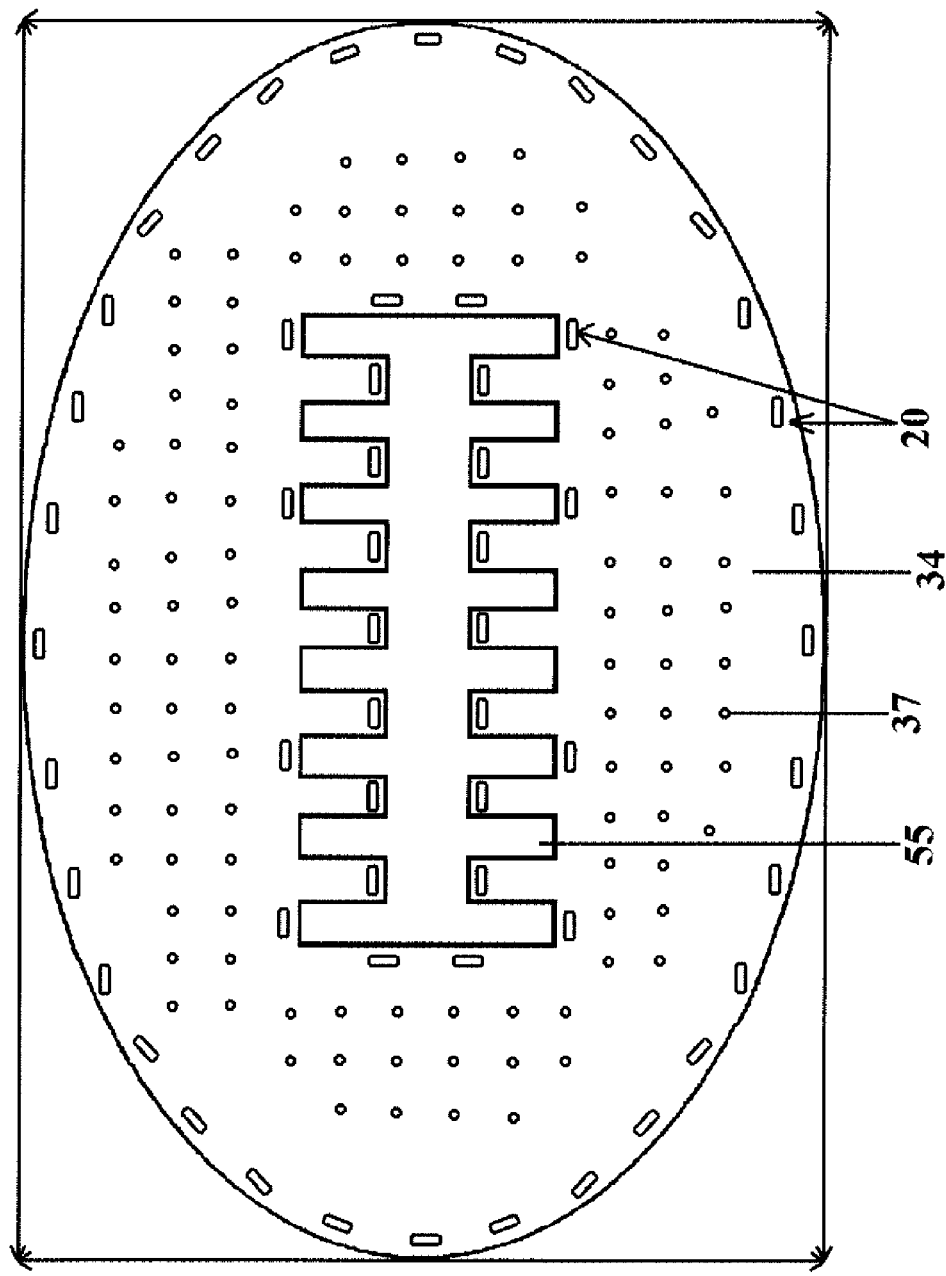
FIG. 61 is a top view of a frame for use with the removable bottom plate of FIG. 60, wherein the frame is perforated and has holes for passage of the holding elements therethrough and a hole for passage of a raised area therethrough
Figure 62:
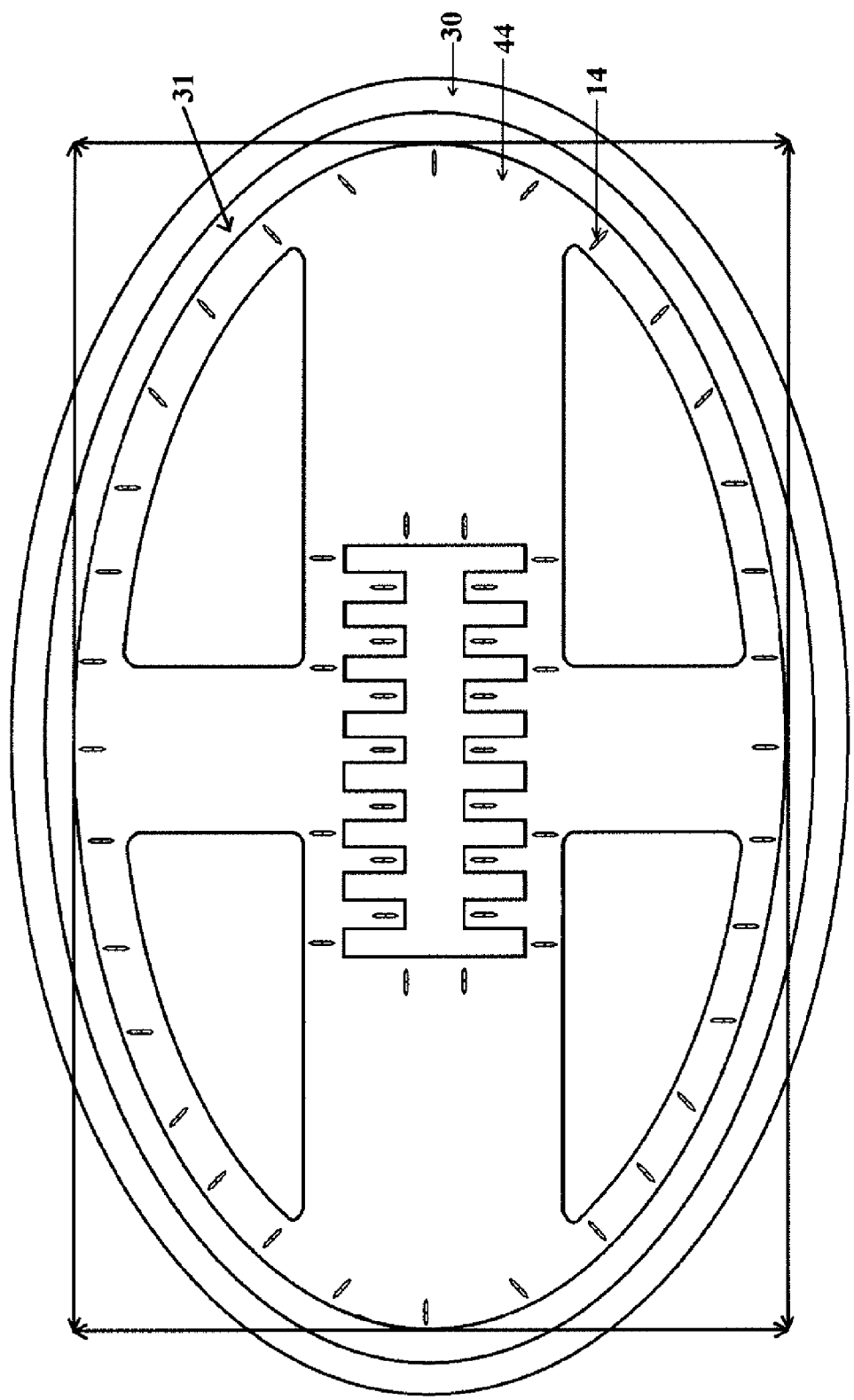
FIG. 62 is a top view of a removable holding element plate for use with the removable bottom plate of FIG. 60 and the frame of FIG. 61, wherein the removable holding plate has a plurality of holding elements and a raised area shaped like laces with holding elements adjacent the raised area.
Figure 63:
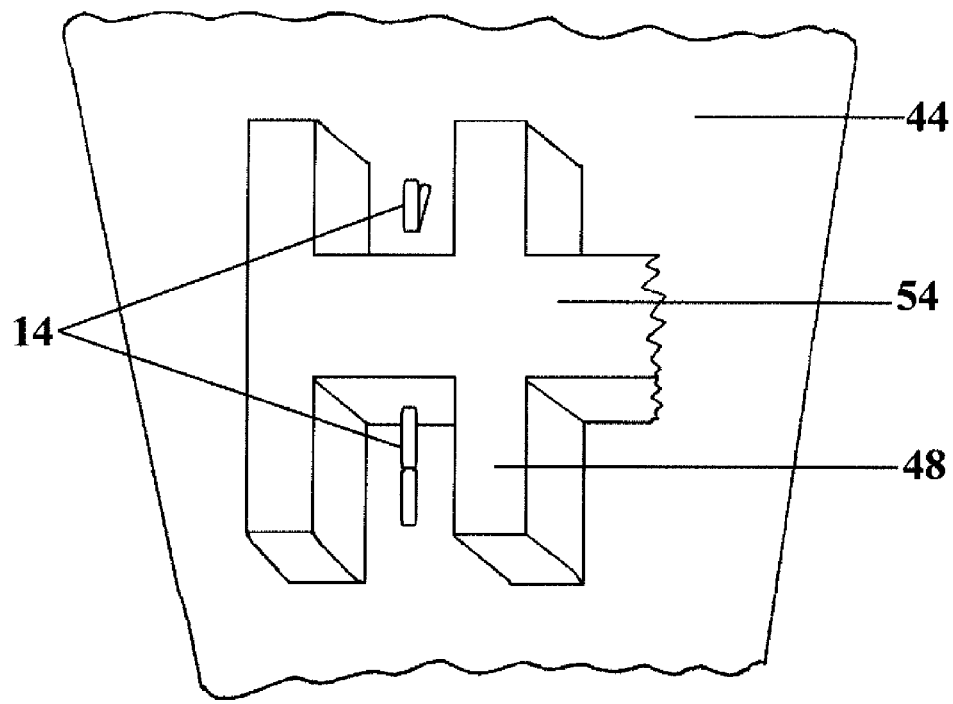
FIG. 63 is an enlarged, fragmented view showing a portion of the raised area and adjacent holding elements of the holding element plate of FIG. 62.
Figure 64:
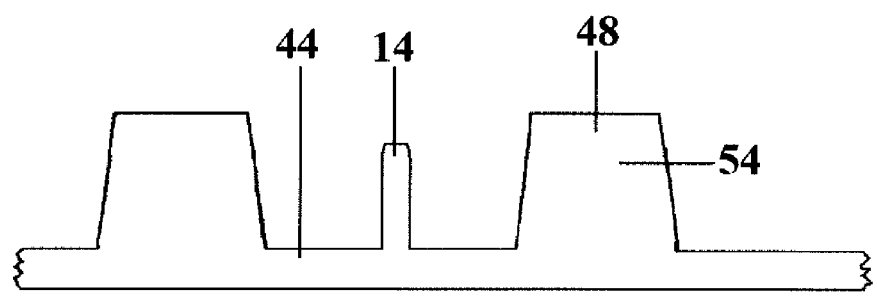
FIG. 64 is an enlarged elevational view of the portion of the raised area with holding elements of FIG. 63.
Figure 65:
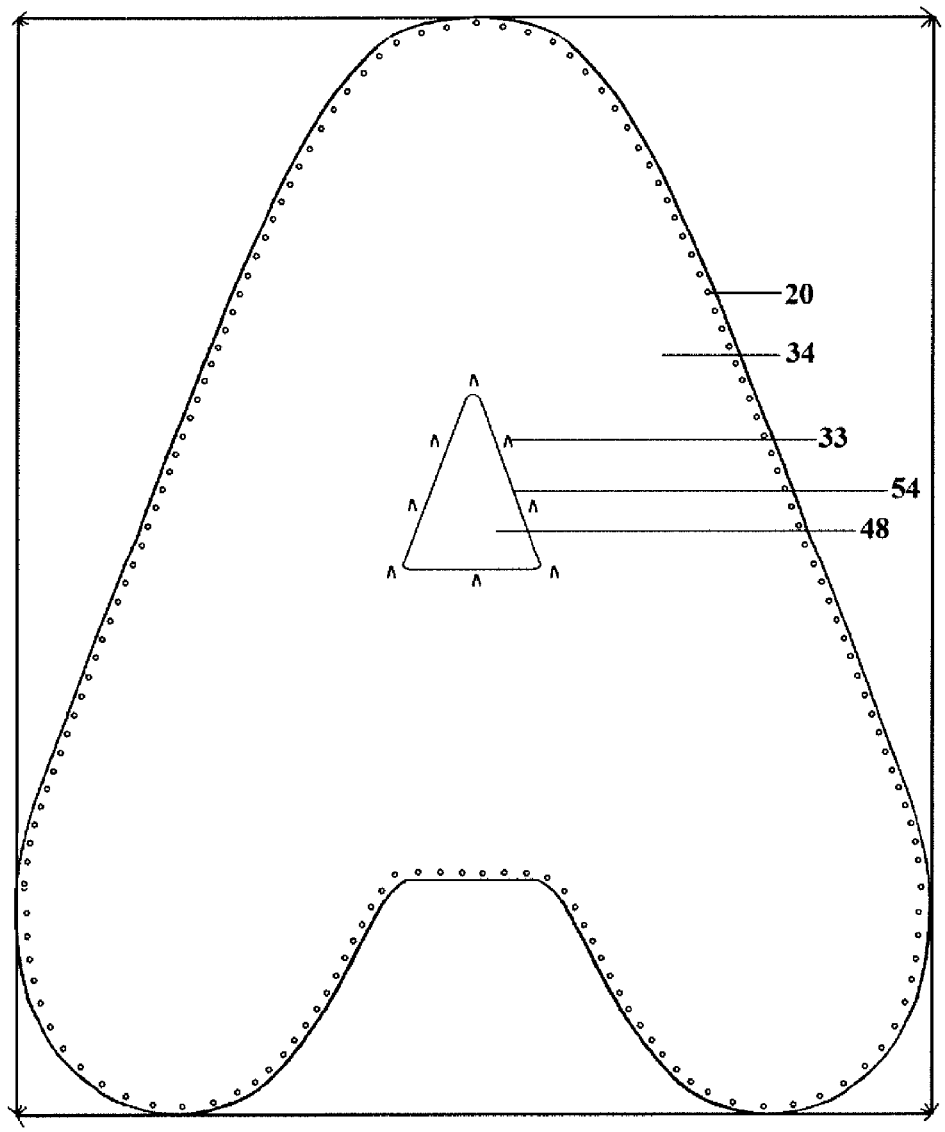
FIG. 65 is a top view of a removable bottom plate of a baking and/or cooking pan having a shape of a letter "A" according to a fifteenth embodiment of the present invention, wherein the removable bottom plate forms a non-perforated support surface for food product and has holes for passage of holding elements therethrough and a raised area with holding elements adjacent thereto.
Figure 66:
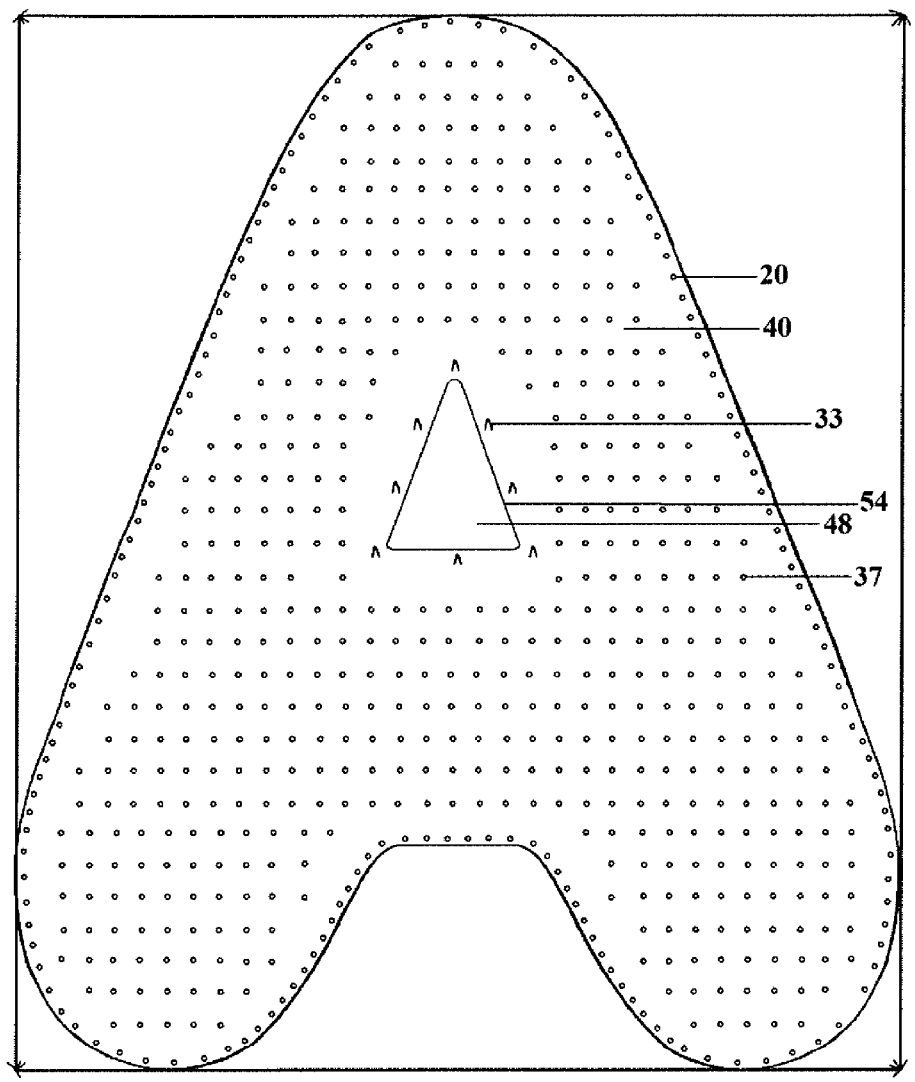
FIG. 66 is a top view of another removable bottom plate of the baking and/or cooking pan having a shape of a letter "A" according to a fifteenth embodiment of the present invention, wherein the removable bottom plate forms a perforated support surface for food product and has holes for passage of holding elements therethrough and a raised area with holding elements adjacent thereto.
Figure 67:
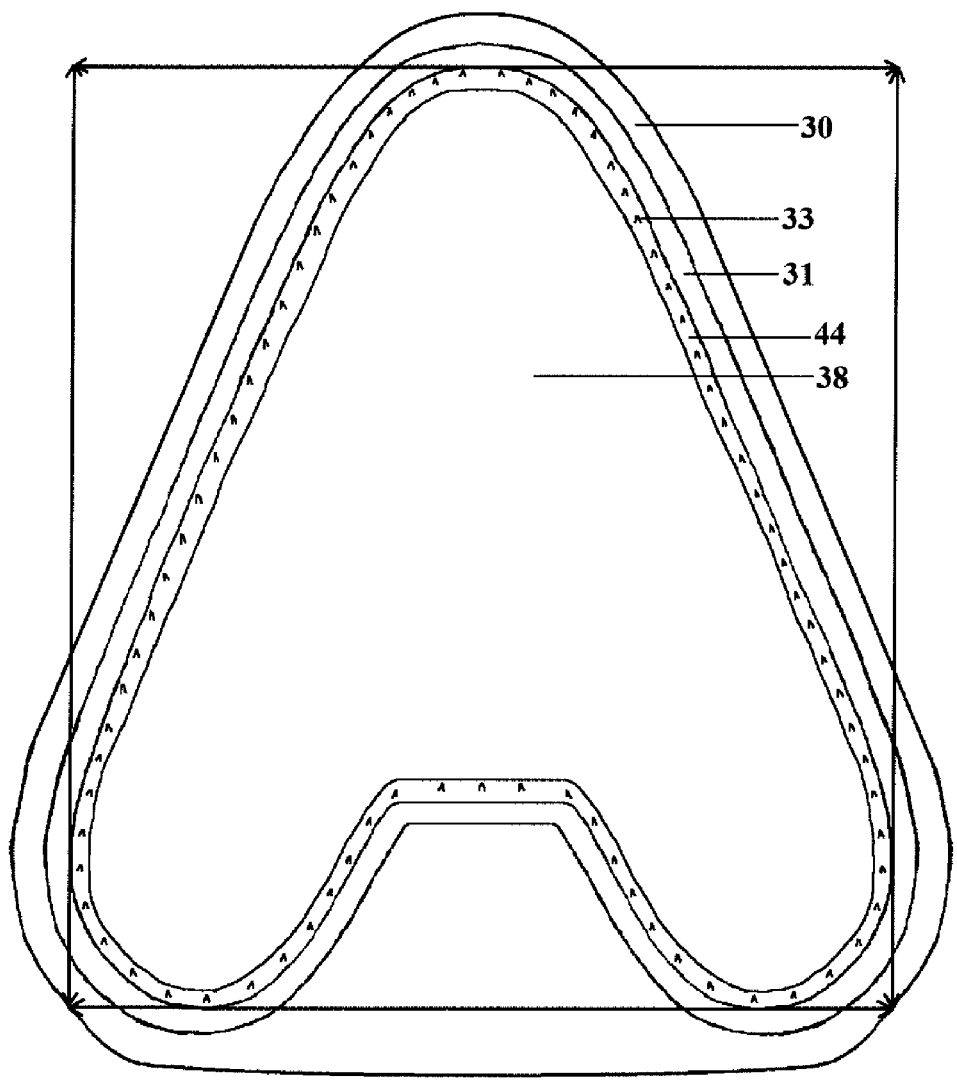
FIG. 67 is a top view of a frame for use with the removable bottom plate of FIG. 66 or the removable bottom plate of FIG. 67, wherein the frame has a plurality of holding elements and a central opening .
Figure 68:
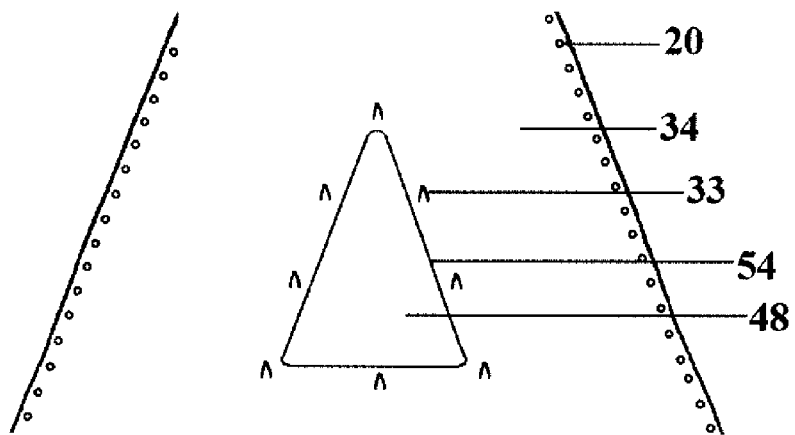
FIG. 68 is a fragmented top view of a portion of the removable bottom plate of FIG. 65 in the area of the raised area.
Figure 69:
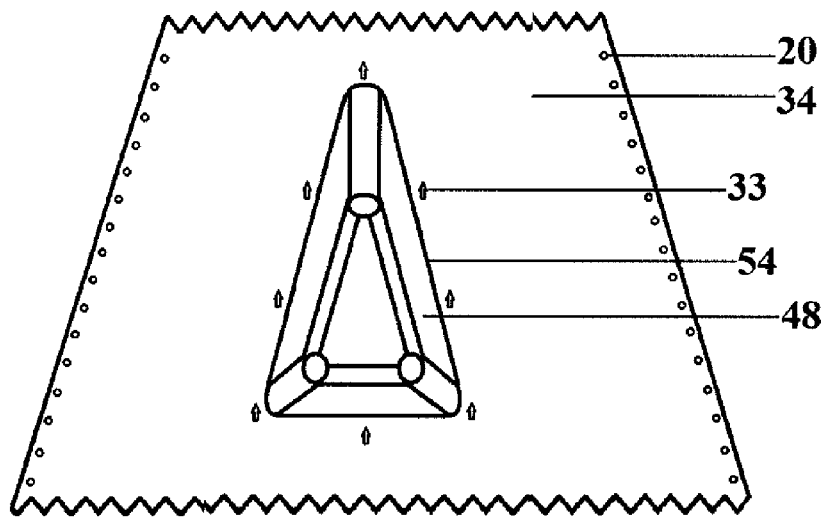
FIG. 69 is a perspective view of the portion of the removable bottom plate shown in FIG. 68.
Figure 70:
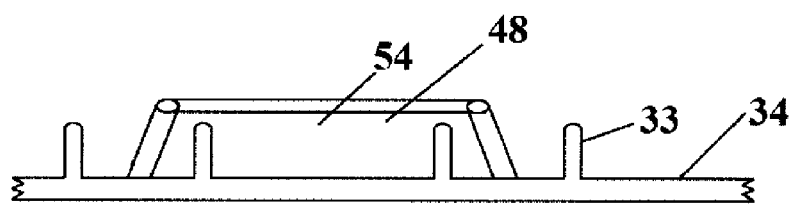
FIG. 70 is an elevational view of the portion of the removable bottom plate shown in FIGS. 68 and 69.
Figure 71:
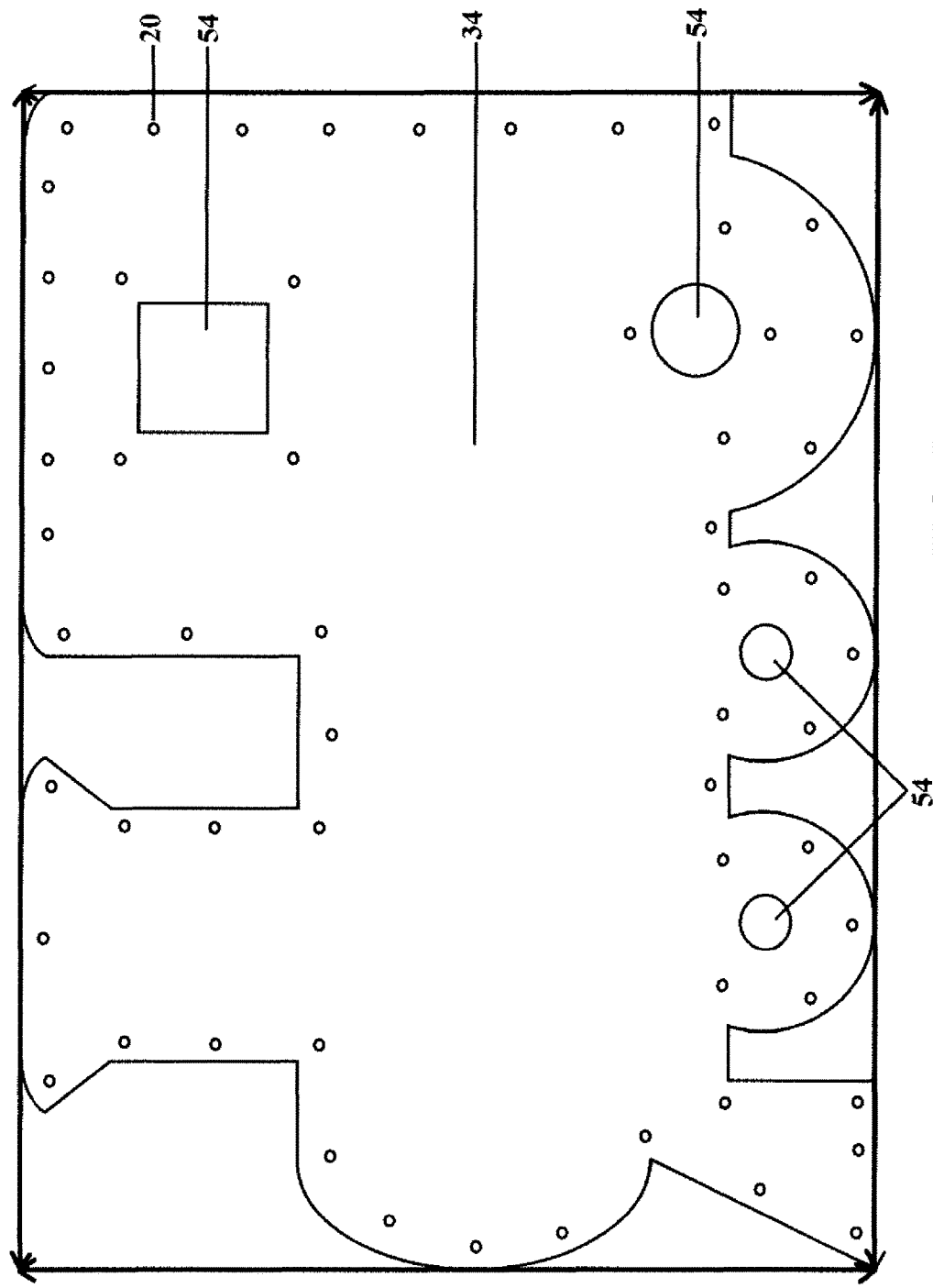
FIG. 71 is a top view of a removable bottom plate of a baking and/or cooking pan having a shape of a train engine or locomotive according to a sixteenth embodiment of the present invention, wherein the removable bottom plate forms a non-perforated support surface for food product and has holes for passage of holding elements therethrough and a raised areas with holding elements adjacent thereto.
Figure 72:
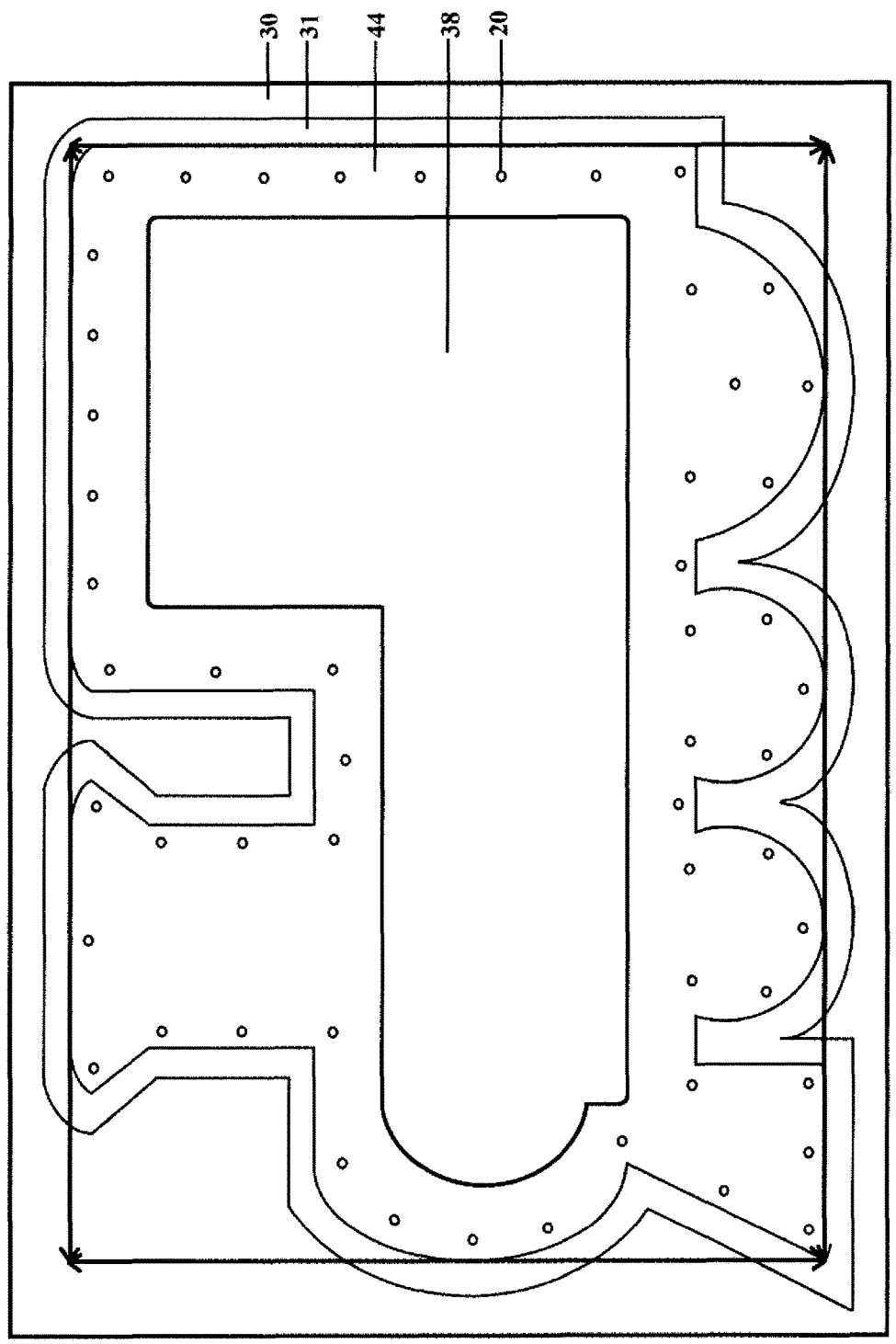
FIG. 72 is a top view of a frame for use with the removable bottom plate of FIG. 71, wherein the frame has holes for passage of the holding elements therethrough and a central opening.
Figure 73:
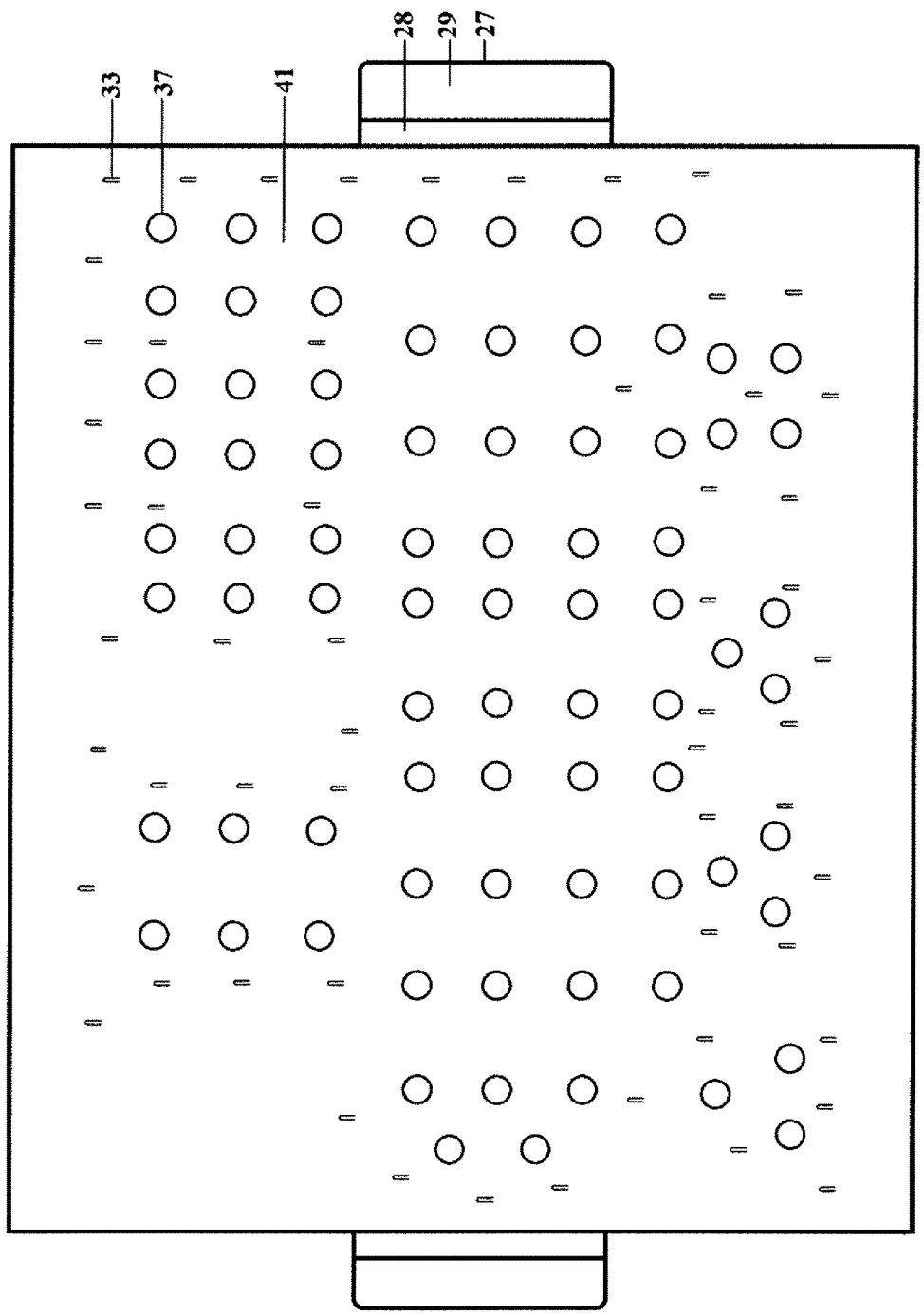
FIG. 73 is a top view a removable holding element plate for use with the removable bottom plate of FIG. 71 and the frame of FIG. 72, wherein the removable holding element plate has the holding elements and a plurality of openings.
Figure 74:
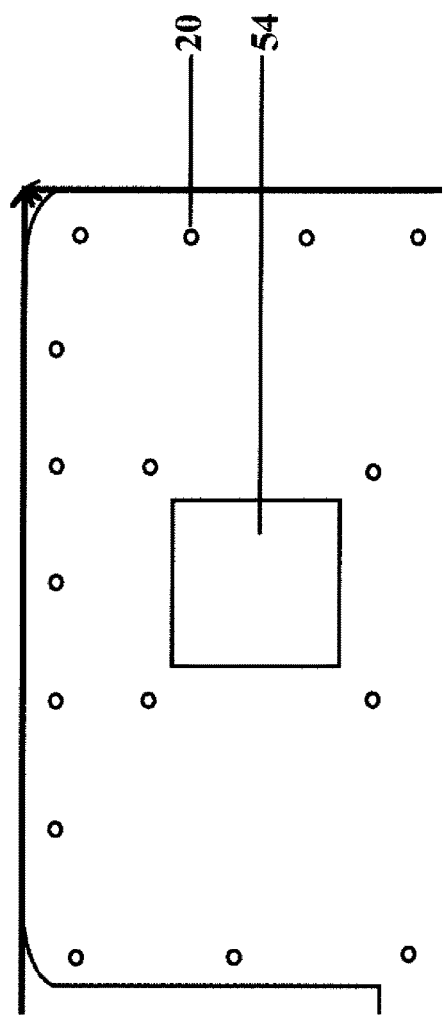
FIG. 74 is an enlarged, fragmented top view of a portion of the removable bottom plate of FIG. 71 in the area of one of the raised areas that forms a window of the train engine.
Figure 75:
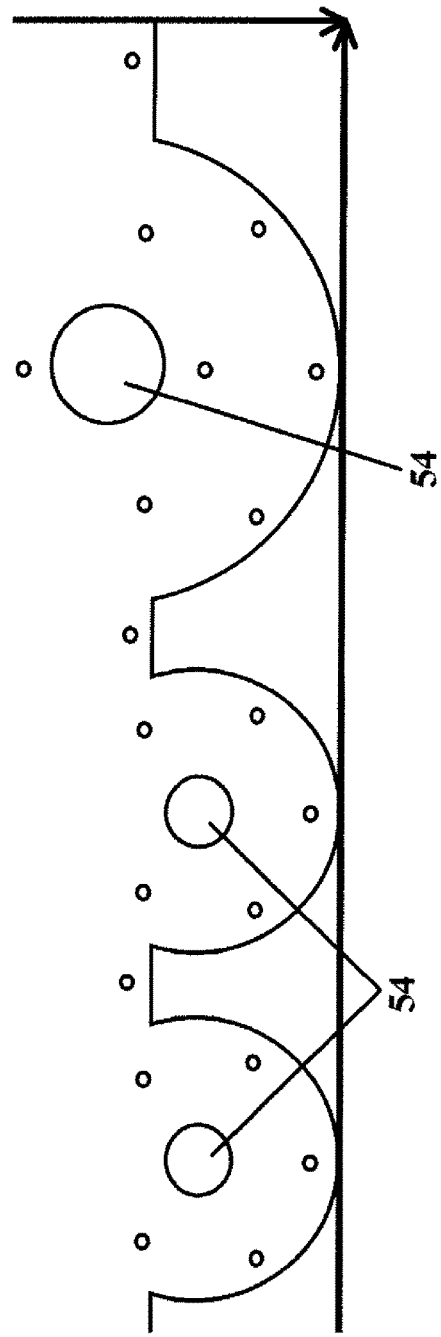
FIG. 75 is an enlarged, fragmented top view of a portion of the removable bottom plate of FIG. 71 in the area of others of the raised areas that form wheel circles of the train engine.
Figure 76:
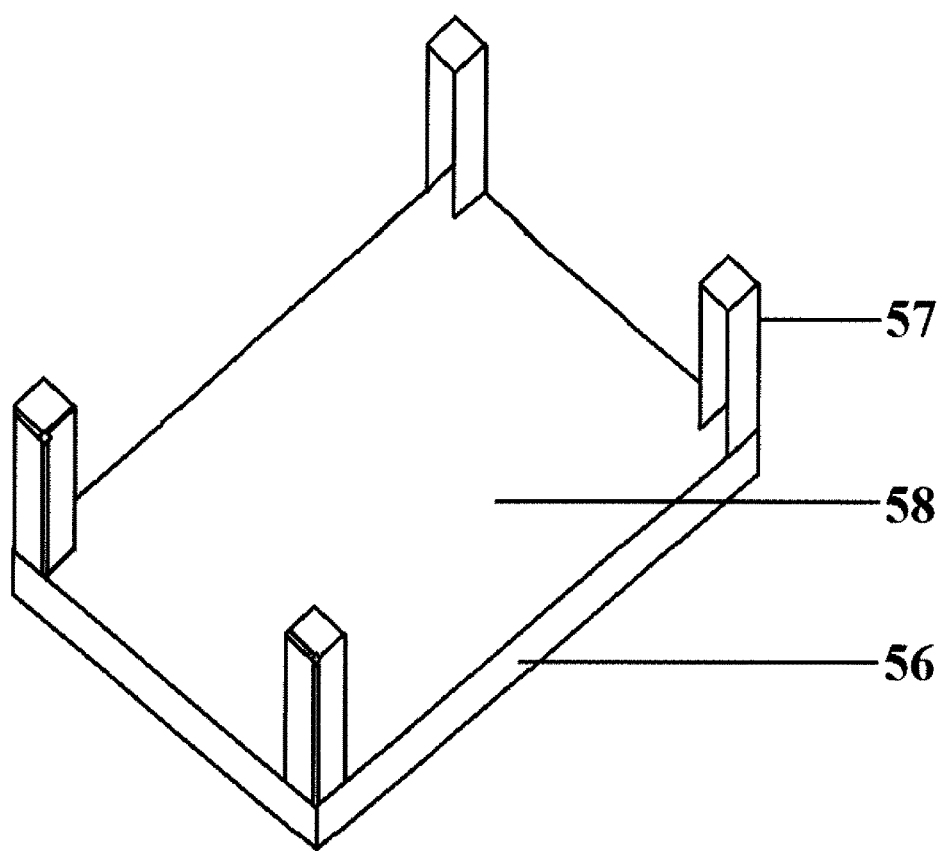
FIG. 76 is a perspective view of a bottom plate remover with a support four upwardly extending legs.

FIGS. 53 and 54 illustrate a sixteenth embodiment of the baking and/or cooking pans 21 according to the present invention that is substantially the same as the fifteenth embodiment described hereinabove except that a plurality of holding elements 33 are provided about the raised area 53. The illustrated raised area 53 has four holding elements 33 about the raised area 53, wherein one holding elements 33 is located along each side of the rectangular shaped raised area 53 but it is noted that any other suitable quantity and/or locations for the holding elements 33 can alternatively be utilized.

FIGS. 55 to 75 illustrate exemplary baking and/or cooking pans 21 incorporating the above described features of the present invention that have non-geometric shapes. FIGS. 55 to 59 illustrate a baking and/or cooking pan 21 in the shape of a trophy cup and having a one-piece configuration. A pair of raised areas 54 are provided to form two open areas which form handles of the trophy cup. The illustrated raised areas 54 are half-oval shaped having a top major axis (longer radius) 49, bottom major axis (longer radius) 50, top minor axis (shorter radius) 51, and bottom minor axis (shorter radius) 52. The angled sides of the raised areas 54 make it easier to remove the food from the pan 21 at the raised areas 54. The holding elements 33, 14 are in the form of the tabs or spikes 14 that are pulled out from the bottom wall 44 of the frame 25 and are provided adjacent the outer wall 31 of the frame 25 except at outer sides of the raised area 54 and are also provided at an inner side of the raised areas 54. The tabs or spikes 14 are not provided outside the raised areas 54 in this case because the raised areas 54 hold the food adjacent to the outer wall 31 outside the raised areas 54.

FIGS. 60 to 64 illustrate a baking and/or cooking pan 21 in the shape of a football and having a two-piece configuration with a frame and interchangeable un-perforated and perforated removable bottom plates 24. A raised area 54 is provided on the frame 25 to form laces of the football. The interchangeable removable bottom plates 24 are provided with openings 55 for passage of the raised area 54 therethrough. The holding elements 33, 14 are in the form of the tabs or spikes 14 that are pulled out from the bottom wall 44 of the frame 25 and are provided adjacent the outer wall 31 of the frame 25 and are also provided around the raised area 54. The interchangeable removable bottom plates 24 are also provided with openings 20 for passage of the tabs or spikes 14 therethrough.

FIGS. 65 to 70 illustrate a baking and/or cooking pan 21 in the shape of a letter "A" and having a two-piece configuration with a frame 25 interchangeable un-perforated and perforated removable bottom plates 24. A triangular-shaped raised area 54 is provided on the removable bottom plates 24 to form the opening in the letter "A". The holding elements 33, 14 are in the form of the unthreaded pins or studs 33 which extend from the bottom wall 44 of the frame 25 and are provided adjacent the outer wall 31 of the frame 25. The frame 25 is also provided with a central opening 38. The interchangeable removable bottom plates 24 are provided with openings for passage of the pins or studs 33 therethrough. The removable bottom plates 24 are also provided with additional holding elements 33, 14 located around the raised area 54 which are also in the form of the unthreaded pins or studs 33.

FIGS. 71 to 75 illustrate a baking and/or cooking pan 21 in the shape of a train engine and having a three-piece configuration. Three circular-shaped raised areas 54 are provided on the removable bottom plate 24 to form wheels and square-shaped raised area 54 is provided on the removable bottom plate 24 to form a cabin window. The holding elements 33, 14 are in the form of the unthreaded pins or studs 33 which extend from the bottom wall 41 of the removable holding element plate 26 and are located to be adjacent the outer wall 31 of the frame 25 and around the raised areas 54. The bottom wall of the removable holding element plate 26 is also provided with perforations 37 The removable bottom plate 24 and the frame 25 are each provided with openings 20 for passage of the pins or studs 33 therethrough. The frame 25 is also provided with a central opening 38.

FIGS. 76 to 79 illustrate a bottom plate remover 56 according to the present invention and the bottom plate remover 56 removing a removable bottom plate 24 from a frame 25. When the baking and/or cooking pan 21 has a removable bottom plate 24, there are at least two ways to take the removable bottom plate 24 and the baked (or cooked) food 59 thereon out from the frame 25. First, the removable bottom plate 24 can be taken it out by pushing the removable bottom plate 24 and the baked (or cooked) food 59 upward by hand from the bottom of the baking and/or cooking pan frame 25. Second, the removable bottom plate 24 can be taken out by using the bottom plate remover 56 which is designed specifically to remove the removable bottom plate 24 from the frame 25 in order to avoid getting burnt from the hot baking and/or cooking pan 21.

The illustrated bottom plate remover 56 has a support 58 configured to rest on a substantially horizontal support surface such as a table top and at least one holding object or leg 57 upwardly extending from the support 58 and configured to engage and support the removable bottom plate 24 thereon. The at least one leg 57 is configured to engage the bottom surface 40 of the removable bottom plate 24 through the at least one opening 38 in the bottom wall 44 of the frame 25 to selectively disengage the removable bottom plate 24 from the frame 25. The illustrated bottom plate remover 56 has four legs 57 but any other suitable quantity can be utilized. The illustrated legs 57 have fully covered tops and form a stable support surface for the removable bottom plate 24. It is noted that the bottom plate remover can alternatively have any other suitable configuration.

Figure 77:
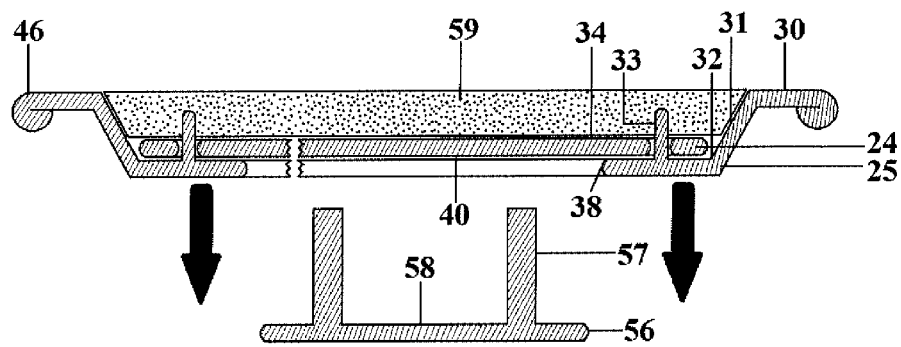
FIG. 77 is a cross-sectional view of a pan having a frame, and a removable bottom plate with baked (or cooked) food on top as it is being placed on to the legs of the bottom plate remover of FIG. 76.
Figure 78:
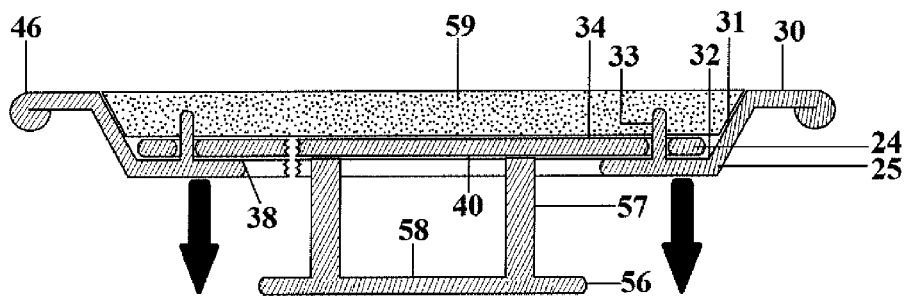
FIG. 78 is a cross sectional view of the pan of FIG. 77 with the removable bottom plate supported on to the legs of the bottom plate remover.
Figure 79:
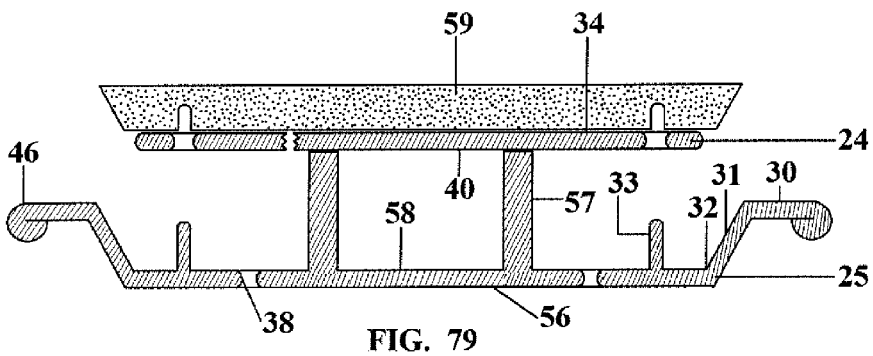
FIG. 79 is a cross sectional view of the pan of FIGS. 77 and 78 with the frame pulled down and separated from the removable bottom plate.

To remove the removable bottom plate 24 from the frame 25, the bottom plate remover 58 is placed onto a support surface such as a table top and the baking and/or cooking pan 21 with food 59 therein is positioned therein is held over the bottom plate remover 57 (best shown in FIG. 77). The baking and/or cooking pan 21 is then lowered until the at least one leg 57 of the bottom plate remover 56 extends through the at least one opening 38 in the bottom wall 44 of the frame 25 to engage the bottom surface 40 of the removable bottom plate 24 (best shown in FIG. 78). The frame 25 is continued to be lowered until it rests on the support surface so that the removable bottom plate 24 with the food 59 thereon is pushed out of the frame 25 and the removable bottom plate 24 with the food 59 thereon rests on top of the bottom plate remover 56.

It is noted that each of the features and variations of the above disclosed embodiments can be used in any combination with each of the other embodiments.

From the foregoing disclosure it is apparent that the improved baking and/or cooking pans, especially for baking or cooking products such as pizza pies, bread, other dough related products, and/or like food products, fulfill the objects and advantages sought therefore.

From the foregoing disclosure and detailed description of certain preferred embodiments, it is also apparent that various modifications, additions, and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A pan for baking and/or cooking a food product, the pan comprising:
   a substantially horizontal support surface configured to directly support the food product during baking and/or cooking and having a non-geometric shape;
   at least one wall upwardly extending from the support surface and including an outer wall at an outer periphery of the support surface;
   a plurality of spaced-apart holding elements upwardly extending from the support surface within the outer wall and configured to at least partially pierce and hold the food product engaging the support surface; and
   wherein the plurality of spaced-apart holding elements are located only adjacent to the at least one wall to hold the food product near the at least one wall against shrinkage away from the at least one wall during baking and/or cooking so that the food product engaging the cooking surface retains the non-geometric shape of the support surface.

2. The pan according to claim 1, further comprising a frame having a substantially horizontal bottom wall, the outer wall upwardly extending from an outer periphery of the bottom wall, and a rim outwardly extending from the outer wall, and wherein the support surface is formed by a top of the bottom wall of the frame.

3. The pan according to claim 2, wherein the bottom wall of the frame is non-perforated at the support surface.

4. The pan according to claim 2, wherein at least a portion of the bottom wall of the frame is perforated at the support surface.

5. The pan according to claim 2, wherein the plurality of spaced-apart holding elements are fixed to the frame.

6. The pan according to claim 1, further comprising:
   a frame having a substantially horizontal bottom wall, the outer wall upwardly extending from an outer periphery of the bottom wall, and a rim outwardly extending from the outer wall; and
   a removable bottom plate configured to be supported above the bottom wall of the frame and removable from the frame, wherein the support surface is formed by a top of the removable bottom plate, wherein the removable bottom plate has a plurality of spaced-apart openings for passage of the plurality of holding elements through the removable bottom plate, and wherein the bottom wall of the frame has at least one opening located below a central portion of the support surface.

7. The pan according to claim 6, wherein the removable bottom plate is non-perforated at the support surface.

8. The pan according to claim 6, wherein at least a portion of the removable bottom plate is perforated at the support surface.

9. The pan according to claim 6, further comprising a bottom plate remover having a support configured to rest on a substantially horizontal support surface and at least one leg upwardly extending from the support and configured to support the removable bottom plate thereon, wherein at least one leg is configured to engage the bottom plate through at least one opening in the bottom wall of the frame to selectively disengage the removable bottom plate from the frame, and wherein bottom plate remover is removable from both the bottom plate and the frame.

10. The pan according to claim 6, further comprising a removable holding element plate having a substantially horizontal main wall with handles and configured to support the frame above the top of the main wall of the removable holding element plate so that the frame is removable from the holding element plate, wherein the plurality of spaced-apart holding elements are fixed to the removable holding element plate, and wherein the bottom wall of the frame has a plurality of spaced-apart openings for passage of the plurality of spaced-apart holding elements through the bottom wall of the frame.

11. The pan according to claim 10, wherein the removable bottom plate is non-perforated at the support surface.

12. The pan according to claim 11, wherein the main wall of the removable holding element plate is non-perforated below the support surface.

13. The pan according to claim 11, wherein at least a portion of the main wall of the holding element plate is perforated below the support surface.

14. The pan according to claim 10, wherein at least a portion of the removable bottom plate is perforated at the support surface.

15. The pan according to claim 14, wherein the main wall of the removable holding element plate is non-perforated below the support surface.

16. The pan according to claim 14, wherein at least a portion of the main wall of the removable holding element plate is perforated below the support surface.

17. A pan for baking and/or cooking a food product, the pan comprising:
   a frame having a substantially horizontal bottom wall, an outer wall upwardly extending from an outer periphery of the bottom wall, and a rim outwardly extending from the outer wall;

a substantially horizontal support surface configured to support the food product within the outer wall of the frame and having an outer periphery at the outer wall;

a plurality of spaced-apart holding elements upwardly extending from the support surface within the outer wall and configured to at least partially pierce and hold the food product on the support surface;

wherein the plurality of spaced-apart holding elements are located near the outer periphery of the support surface and adjacent to the outer wall of the frame to hold the food product near the outer wall against shrinkage away from the outer wall during baking and/or cooking so that the food product on the cooking surface retains a shape of the outer periphery of the support surface; and wherein there is at least one raised area extending upward from the support surface within the outer wall so that the support surface has a non-geometric shape and the food product on the support surface extends about the raised area to form a hole through the food product having a shape of an outer periphery of the raised area and the food product obtains the non-geometric shape of the support surface.

18. The pan according to claim 17, wherein there is at least one additional holding element upwardly extending from the support surface adjacent the raised area and configured to at least partially pierce and hold the food product on the support surface near the raised area against shrinkage away from the raised area during baking and/or cooking so that the food product on the cooking surface retains the shape of the outer periphery of the raised area.

19. The pan according to claim 17, wherein the raised area has a higher height than the outer wall of the frame.

20. A pizza pan for baking and/or cooking a pizza pie, the pizza pan comprising:

a substantially horizontal support surface configured to directly support the pizza pie during baking and/or cooking and having a non-geometric shape;

at least one wall upwardly extending from the support surface and including an outer wall at the outer periphery of the support surface;

a plurality of spaced-apart holding elements upwardly extending from the support surface within the outer wall and configured to at least partially pierce and hold the pizza pie engaging the support surface; and wherein the plurality of spaced-apart holding elements are located only adjacent to the at least one wall to hold the pizza near the at least one wall against shrinkage away from the at least one wall during baking and/or cooking so that the pizza pie engaging the cooking surface retains the non-geometric shape of the support surface.

* * * * *